(12) United States Patent
Zeng et al.

(10) Patent No.: US 12,542,458 B2
(45) Date of Patent: Feb. 3, 2026

(54) FREQUENCY LOCKING METHOD, WIRELESS CHARGING SYSTEM, RECEIVING DEVICE, AND TRANSMITTING DEVICE

(71) Applicant: Huawei Technologies Co., Ltd., Guangdong (CN)

(72) Inventors: Xiaosheng Zeng, Dongguan (CN); Zhixian Wu, Dongguan (CN); Yunhe Mao, Shenzhen (CN); Shuangquan Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 837 days.

(21) Appl. No.: 17/853,424

(22) Filed: Jun. 29, 2022

(65) Prior Publication Data

US 2022/0337100 A1    Oct. 20, 2022

Related U.S. Application Data

(63) Continuation of application No. PCT/CN2020/095546, filed on Jun. 11, 2020.

(30) Foreign Application Priority Data

Dec. 31, 2019  (CN) .......................... 201911423486.9

(51) Int. Cl.
*H02J 7/00* (2006.01)
*B60L 53/126* (2019.01)
(Continued)

(52) U.S. Cl.
CPC ............ *H02J 50/80* (2016.02); *B60L 53/126* (2019.02); *B60L 55/00* (2019.02); *H02J 7/00032* (2020.01); *H02J 50/10* (2016.02)

(58) Field of Classification Search
CPC ........ H02J 50/10; H02J 50/80; H02J 7/00032; B60L 55/00
See application file for complete search history.

(56) References Cited

U.S. PATENT DOCUMENTS

2015/0008736 A1    1/2015  Uchida et al.
2015/0280453 A1    10/2015 Ikefuji
(Continued)

FOREIGN PATENT DOCUMENTS

CN    102142697 A    8/2011
CN    104393623 A    3/2015
(Continued)

OTHER PUBLICATIONS

Ruikun Mai et al, An Active Rectifier Based MEPT Method Using an Additional Measurement Coil for Wireless Power Transfer, 2016, 13 pages.
(Continued)

*Primary Examiner* — Robert Grant
(74) *Attorney, Agent, or Firm* — WOMBLE BOND DICKINSON (US) LLP

(57) ABSTRACT

This application provides a frequency locking method, a wireless charging system, a receiving device, and a transmitting device for determining, through interaction between the receiving device and the transmitting device in a wireless charging scenario, whether a frequency locking procedure can be performed between the transmitting device and the receiving device. The receiving device includes: a controller, configured to control short-circuiting of an input terminal of a rectifier; a transceiver, configured to transmit a frequency locking request to the transmitting device, where the frequency locking request carries information about a first preset range, and the frequency locking request requests the transmitting device to generate an emission current whose frequency is within the first preset range; a receiving mod-
(Continued)

ule, configured to obtain an input current of the rectifier based on the emission current; and a detector, configured to detect a frequency of the input current.

20 Claims, 17 Drawing Sheets

(51) Int. Cl.
*B60L 55/00* (2019.01)
*H02J 50/10* (2016.01)
*H02J 50/80* (2016.01)

(56) References Cited

U.S. PATENT DOCUMENTS

| | | | |
|---|---|---|---|
| 2018/0304755 A1* | 10/2018 | Beaver | B60L 53/305 |
| 2019/0168625 A1 | 6/2019 | Maiwald et al. | |

FOREIGN PATENT DOCUMENTS

| | | |
|---|---|---|
| CN | 106787249 A | 5/2017 |
| CN | 107839504 A | 3/2018 |
| CN | 108337921 A | 7/2018 |
| CN | 108923498 A | 11/2018 |
| CN | 109334478 A | 2/2019 |
| CN | 109818431 A | 5/2019 |
| CN | 109890649 A | 6/2019 |
| CN | 110212649 A | 9/2019 |
| EP | 3364521 A1 | 8/2018 |

OTHER PUBLICATIONS

IEC TS 61980-2, Technicalspecification, Edition 1.0, Electric vehicle wireless power transfer (WPT) systems Part 2: Specific requirements for communication between electric road vehicle(EV) and infrastructure, Jun. 2019, 11 pages.

* cited by examiner

FREQUENCY LOCKING METHOD, WIRELESS CHARGING SYSTEM, RECEIVING DEVICE, AND TRANSMITTING DEVICE

CROSS-REFERENCE TO RELATED APPLICATIONS

This application is a continuation of International Application No. PCT/CN2020/095546 filed on Jun. 11, 2020, which claims priority to Chinese Patent Application No. 201911423486.9 filed on Dec. 31, 2019. The disclosures of the aforementioned applications are hereby incorporated by reference in their entireties.

TECHNICAL FIELD

This application relates to the field of power electronics technologies, and in particular, to a frequency locking method, a wireless charging system, a receiving device, and a transmitting device.

BACKGROUND

As problems of energy shortage and environmental pollution increasingly deteriorate in modern society, electricity gradually becomes a main energy source. Usually, electricity may be stored by using a battery. A battery charging method may include contact charging and wireless charging. Wireless charging implements power transfer by using a coupled electromagnetic field as a medium. A wireless charging system includes a receiving device and a transmitting device. Usually, there is no electrical contact between the transmitting device and the receiving device.

During implementation of wireless charging, the transmitting device generates an alternating magnetic field by using a transmitting module, to emit electromagnetic energy to the receiving device. The receiving device receives the energy of the alternating magnetic field by using a receiving module, and converts, by using a rectifier, an alternating current signal into a direct current signal required by a load. A frequency in wireless charging is determined by a switching frequency of an inverter of the transmitting device. If the rectifier of the receiving device is an uncontrolled rectifier including only a diode, a frequency of the rectifier can be automatically consistent with a working frequency of a transmit end. However, when the rectifier of the receiving device includes a controllable switch, it cannot be ensured that a working frequency of the receiving device is completely consistent with a working frequency of the transmitting device. Frequency locking refers to that the working frequency of the receiving device keeps matched with the working frequency of the transmitting device. If frequency locking cannot be implemented, a frequency difference between the working frequency of the transmitting device and the working frequency of the receiving device causes oscillation of the wireless charging system. In particular, when the receiving device and the transmitting device are from different manufacturers, the working frequency of the receiving device cannot match the working frequency of the transmitting device due to a great frequency difference between the working frequencies of the receiving device and the transmitting device. Therefore, how to implement frequency matching between the transmitting device and the receiving device becomes a problem urgently to be resolved.

SUMMARY

This application provides a frequency locking method, a wireless charging system, a receiving device, and a transmitting device, to determine, through interaction between the receiving device and the transmitting device in a wireless charging scenario, whether a frequency locking procedure can be performed between the transmitting device and the receiving device. This improves system stability.

According to a first aspect, this application provides a receiving device, including a transceiver and a controller, where the transceiver is configured to transmit a parameter related to frequency locking to a transmitting device, where the parameter related to frequency locking includes information about a first preset range and a second preset range, the first preset range is a working frequency range of the receiving device, and the second preset range is a current value range of an emission current during frequency locking of the receiving device;

the transceiver is further configured to receive frequency locking capability information transmitted by the transmitting device; and the controller is configured to determine, based on the frequency locking capability information, whether the transmitting device has a frequency locking function and whether the transmitting device supports a frequency within the first preset range and a current value within the second preset range.

In this embodiment, the receiving device may determine, by interacting with the transmitting device, whether the transmitting device can supply charging power to the receiving device, or determine, before being charged, whether frequency locking is required. Frequency locking adjusts a frequency of the receiving device by interacting with the transmitting device, so that working frequencies of the receiving device and the transmitting device keep consistent. Therefore, before the receiving device is charged, the receiving device may determine, based on the frequency locking capability information of the transmitting device, whether the frequency of the receiving device matches that of the transmitting device, and further select the receiving device for charging, or add a frequency locking procedure, to avoid oscillation of a wireless charging system caused by a frequency difference between the working frequencies of the transmitting device and the receiving device.

In an embodiment, the transceiver is further configured to receive a first query message transmitted by the transmitting device;

the controller is further configured to determine, based on the first query message, whether frequency locking is required, and generate a first response message based on a determining result, where frequency locking adjusts the working frequency of the receiving device to be the same as that of the transmitting device; and the transceiver is further configured to transmit the first response message to the transmitting device, and receive a second query message transmitted by the transmitting device, where the second query message is used to request the parameter related to frequency locking.

In this embodiment, the transmitting device may actively initiate a query to the receiving device, to query whether the receiving device requires frequency locking. If the receiving device requires frequency locking, the transmitting device further transmits the second query message to the receiving device, where the second query message is used to query the receiving device for the related parameter required for performing frequency locking. This provides a manner of interaction between the transmitting device and the receiving device.

In an embodiment, the receiving device may further include a receiving module and a detector, where after the controller determines that the transmitting device has the frequency locking function and that the transmitting device supports the frequency within the first preset range and the current value within the second preset range, the transceiver is further configured to transmit a frequency locking request to the transmitting device, where the frequency locking request is used to request the transmitting device to start a frequency locking procedure;

the receiving module is configured to obtain an input current through induction based on an emission current, where the emission current is generated by the transmitting device based on the frequency locking request, and a frequency of the emission current is within the first preset range;

the detector is configured to detect the input current to obtain an input frequency; and the controller is further configured to generate an adjustment signal, where the adjustment signal is used to adjust a frequency of a rectifier to the input frequency.

In this embodiment, after determining that the transmitting device has the frequency locking function and that the transmitting device supports the frequency within the first preset range and the current value within the second preset range, the receiving device transmits the frequency locking request to the transmitting device, to request the transmitting device to start the frequency locking procedure. In addition, the receiving device performs induction based on the transmitting circuit generated by the transmitting device to obtain the input current, and adjusts the frequency of the rectifier based on the input frequency of the input current, so that the working frequencies of the receiving device and the transmitting device keep consistent.

In an embodiment, after the transmitting device receives the frequency locking request transmitted by the receiving device and generates the emission current, the transmitting device further transmits a frequency locking start response message to the receiving device, where the frequency locking start response message is used to notify the receiving device that the transmitting device has started the frequency locking procedure. The frequency locking start response message may further carry the frequency and a current value of the emission current, so that the receiving device learns the frequency and current value of the emission current based on the frequency locking start response message.

In an embodiment, the controller is further configured to determine whether a current value of the input current is within a third preset range;

the transceiver is further configured to transmit at least one piece of indication information to the transmitting device when the current value of the input current is beyond the third preset range, where the at least one piece of indication information is used to indicate the transmitting device to adjust the current value of the emission current to change the input current; and the detector is configured to detect a changed input current, and when a current value of the changed input current is within the third preset range, detect the changed input current to obtain an input frequency.

In this embodiment, when the current value of the input current is beyond the third preset range, the at least one piece of indication information may be transmitted to the transmitting device, to adjust the current value of the emission current of the transmitting device to change the input current. Further, the current value of the input current is adjusted to be within the third preset range, so that the receiving device can more accurately detect the input frequency of the input current.

In an embodiment, after the controller generates the adjustment signal, the transceiver is further configured to transmit frequency locking success information to the transmitting device, where the frequency locking success information is used to indicate the transmitting device to end the frequency locking procedure and maintain the emission current.

In this embodiment, after the receiving device completes frequency locking, the receiving device transmits the frequency locking success information to the transmitting device, so that the transmitting device ends the frequency locking procedure and that the transmitting device maintains the emission current.

In an embodiment, the transceiver is further configured to receive a frequency locking end response message transmitted by the transmitting device in response to the frequency locking success information; and the controller is further configured to determine, based on the frequency locking end response message, that the transmitting device has ended the frequency locking procedure, and obtain the current value of the emission current maintained by the transmitting device.

In this embodiment, after the transmitting device receives the frequency locking success information and maintains the emission current, the transmitting device further transmits the frequency locking end response message to the receiving device in response to the frequency locking success information, so that the receiving device can determine, based on the frequency locking end response message, that the transmitting device has ended the frequency locking procedure, and obtain the current value of the emission current maintained by the transmitting device.

In an embodiment, the transceiver is specifically configured to transmit the frequency locking request to the transmitting device after the controller generates the adjustment signal; and after transmitting the frequency locking success information to the transmitting device, the transceiver is further configured to transmit a charging request to the transmitting device, and terminate short-circuiting of an input terminal of the rectifier, where the charging request is used to indicate the transmitting device to supply charging power to the receiving device.

In this embodiment, after the input terminal of the rectifier is short-circuited, the receiving device transmits the frequency locking request to the transmitting device, to avoid oscillation of the rectifier caused by frequency inconsistency between the transmitting device and the receiving device. In addition, after frequency locking of the transmitting device succeeds and the frequencies of the receiving device and the transmitting device keep consistent, the receiving device stops a short-circuited state of the input terminal of the rectifier, so that the receiving device can be charged by using the rectifier.

In an embodiment, the controller is further configured to generate a first control signal, where the first control signal is used to adjust a phase of an input voltage of the rectifier, so that a difference between the phase of the input voltage of the rectifier and a phase of the input current is adjusted to a preset value, where the preset value is a phase difference when a switch of the rectifier works in a soft switching state.

In this embodiment, the difference between the phase of the input voltage of the rectifier and the phase of the input current is adjusted to the preset value, so that the switch of the rectifier works in the soft switching state. This reduces a switching loss of the rectifier.

According to a second aspect, this application provides a wireless charging system, where the wireless charging system includes a receiving device and a transmitting device, where the receiving device is configured to transmit a parameter related to frequency locking to the transmitting device, where the parameter related to frequency locking includes information about a first preset range and a second preset range, the first preset range is a working frequency range of the receiving device, and the second preset range is a current value range of an emission current during frequency locking of the receiving device;

the transmitting device is configured to transmit frequency locking capability information to the receiving device based on the parameter related to frequency locking; and the receiving device is further configured to determine, based on the frequency locking capability information, whether the transmitting device has a frequency locking function and whether the transmitting device supports a frequency within the first preset range and a current value within the second preset range.

In this embodiment, the receiving device may determine, by interacting with the transmitting device, whether the transmitting device can supply charging power to the receiving device, or determine, before being charged, whether frequency locking is required. Frequency locking adjusts a frequency of the receiving device by interacting with the transmitting device, so that working frequencies of the receiving device and the transmitting device keep consistent.

In an embodiment, the transmitting device is further configured to transmit a first query message to the receiving device, where the first query message is used to query whether the receiving device requires frequency locking, and frequency locking adjusts the working frequency of the receiving device to be the same as the frequency of the transmitting device;

the receiving device is further configured to determine, based on the first query message, whether frequency locking is required, and return a first response message based on a determining result; and when determining, based on the first response message, that the receiving device requires frequency locking, the transmitting device is further configured to transmit a second query message to the receiving device, where the second query message is used to request the receiving device for the parameter related to frequency locking.

In this embodiment, the transmitting device may actively initiate a query to the receiving device, to query whether the receiving device requires frequency locking. If the receiving device requires frequency locking, the transmitting device further transmits the second query message to the receiving device, where the second query message is used to query the receiving device for the related parameter required for performing frequency locking. This provides a manner of interaction between the transmitting device and the receiving device.

In an embodiment, after determining that the transmitting device has the frequency locking function and that the transmitting device supports the frequency within the first preset range and the current value within the second preset range, the receiving device is further configured to transmit a frequency locking request to the transmitting device, where the frequency locking request is used to request the transmitting device to start a frequency locking procedure;

the transmitting device is further configured to generate an emission current based on the frequency locking request, where a frequency of the emission current is within the first preset range; and the receiving device is further configured to obtain an input current through induction based on the emission current, detect the input current to obtain an input frequency, and adjust a frequency of a rectifier of the receiving device to the input frequency.

In this embodiment, after determining that the transmitting device has the frequency locking function and that the transmitting device supports the frequency within the first preset range and the current value within the second preset range, the receiving device transmits the frequency locking request to the transmitting device, to request the transmitting device to start the frequency locking procedure. In addition, the receiving device performs induction based on the transmitting circuit generated by the transmitting device to obtain the input current, and adjusts the frequency of the rectifier based on the input frequency of the input current, so that the working frequencies of the receiving device and the transmitting device keep consistent.

In an embodiment, after the transmitting device receives the frequency locking request transmitted by the receiving device and generates the emission current, the transmitting device further transmits a frequency locking start response message to the receiving device, where the frequency locking start response message is used to notify the receiving device that the transmitting device has started the frequency locking procedure. The frequency locking start response message may further carry the frequency and a current value of the emission current, so that the receiving device learns the frequency and current value of the emission current based on the frequency locking start response message.

In an embodiment, the receiving device is further configured to transmit at least one piece of indication information to the transmitting device when a current value of the input current is beyond a third preset range;

the transmitting device is further configured to adjust the current value of the emission current based on the at least one piece of indication information to change the input current; and the receiving device is specifically configured to detect a changed input current, and when a current value of the changed input current is within the third preset range, detect the changed input current to obtain an input frequency.

In this embodiment, when the current value of the input current is beyond the third preset range, the at least one piece of indication information may be transmitted to the transmitting device, to adjust the current value of the emission current of the transmitting device to change the input current. Further, the current value of the input current is adjusted to be within the third preset range, so that the receiving device can more accurately detect the input frequency of the input current.

In an embodiment,
after adjusting the frequency of the rectifier to the input frequency, the receiving device is further configured to transmit frequency locking success information to the transmitting device; and
the transmitting device is further configured to end the frequency locking procedure based on the frequency locking success information, and maintain the emission current.

In this embodiment, after the receiving device completes frequency locking, the receiving device transmits the frequency locking success information to the transmitting device, so that the transmitting device ends the frequency locking procedure and that the transmitting device maintains the emission current.

In an embodiment,
the transmitting device is further configured to transmit a frequency locking end response message to the receiving device in response to the frequency locking success information; and
the receiving device is further configured to determine, based on the frequency locking end response message, that the transmitting device has ended the frequency locking procedure, and obtain the current value of the emission current maintained by the transmitting device.

In this embodiment, after the transmitting device receives the frequency locking success information and maintains the emission current, the transmitting device further transmits the frequency locking end response message to the receiving device in response to the frequency locking success information, so that the receiving device can determine, based on the frequency locking end response message, that the transmitting device has ended the frequency locking procedure, and obtain the current value of the emission current maintained by the transmitting device.

In an embodiment,
the receiving device is specifically configured to transmit the frequency locking request to the transmitting device after an input terminal of the rectifier is short-circuited;
after transmitting the frequency locking success information to the transmitting device, the receiving device is further configured to transmit a charging request to the transmitting device, and terminate short-circuiting of the input terminal of the rectifier; and
the transmitting device is further configured to supply charging power to the receiving device based on the charging request.

In this embodiment, after the input terminal of the rectifier is short-circuited, the receiving device transmits the frequency locking request to the transmitting device, to avoid oscillation of the rectifier caused by frequency inconsistency between the transmitting device and the receiving device. In addition, after frequency locking of the transmitting device succeeds and the frequencies of the receiving device and the transmitting device keep consistent, the receiving device stops a short-circuited state of the input terminal of the rectifier, so that the receiving device can be charged by using the rectifier.

In an embodiment,
the receiving device is further configured to adjust a difference between a phase of an input voltage of the rectifier and a phase of the input current to a preset value, so that a switching transistor of the rectifier works in a soft switching state.

In this embodiment, the difference between the phase of the input voltage of the rectifier and the phase of the input current is adjusted to the preset value, so that the switch of the rectifier works in the soft switching state. This reduces a switching loss of the rectifier.

According to a third aspect, this application provides a transmitting device, where the transmitting device includes a transceiver and a controller, where
the transceiver is configured to receive a parameter related to frequency locking, where the parameter related to frequency locking is transmitted by a receiving device and includes information about a first preset range and a second preset range, the first preset range is a working frequency range of the receiving device, and the second preset range is a current value range of an emission current during frequency locking of the receiving device;
the controller is configured to obtain whether the transmitting device has a frequency locking function, and when the transmitting device has the frequency locking function, determine whether the transmitting device supports a frequency within the first preset range and a current value within the second preset range, and generate frequency locking capability information; and
the transceiver is further configured to transmit the frequency locking capability information to the receiving device, so that the receiving device determines, based on the frequency locking capability information, whether the transmitting device has the frequency locking function and whether the transmitting device supports the frequency within the first preset range and the current value within the second preset range, and after determining that the transmitting device has the frequency locking function and before being charged by the transmitting device, adjusts a frequency of a rectifier to be the same as a frequency of the transmitting device.

In this embodiment, the receiving device may determine, by interacting with the transmitting device, whether the transmitting device can supply charging power to the receiving device, or determine, before being charged, whether frequency locking is required. Frequency locking adjusts a frequency of the receiving device by interacting with the transmitting device, so that working frequencies of the receiving device and the transmitting device keep consistent.

In an embodiment,
the transceiver is further configured to transmit a first query message to the receiving device, where the first query message is used to query whether the receiving device requires frequency locking;
the transceiver is further configured to receive a first response message returned in response to the first query message;
the controller is further configured to determine, based on the first response message, whether the receiving device requires frequency locking; and
when the receiving device requires frequency locking, the transceiver is further configured to transmit a second query message to the receiving device, where the second query message is used to request the receiving device for the parameter related to frequency locking.

In this embodiment, the transmitting device may actively initiate a query to the receiving device, to query whether the receiving device requires frequency locking. If the receiving device requires frequency locking, the transmitting device further transmits the second query message to the receiving device, where the second query message is used to query the receiving device for the related parameter required for performing frequency locking. This provides a manner of interaction between the transmitting device and the receiving device.

In an embodiment, the transmitting device further includes a transmitting module, where
the transceiver is further configured to receive a frequency locking request transmitted by the receiving device, where the frequency locking request is used to request to start a frequency locking procedure; and
the controller is configured to generate a second control signal based on the frequency locking request, where the second control signal is used to control the transmitting module to generate an emission current, and a frequency of the emission current is within the first preset range, so that the receiving device obtains an input current through induction based on the emission current, detects the input current to obtain an input frequency, and adjusts a frequency of a rectifier to the input frequency.

In this embodiment, after determining that the transmitting device has the frequency locking function and that the transmitting device supports the frequency within the first preset range and the current value within the second preset range, the receiving device transmits the frequency locking request to the transmitting device, to request the transmitting device to start the frequency locking procedure. In addition, the receiving device performs induction based on the transmitting circuit generated by the transmitting device to obtain the input current, and adjusts the frequency of the rectifier based on the input frequency of the input current, so that the working frequencies of the receiving device and the transmitting device keep consistent.

In an embodiment, after the frequency locking request transmitted by the receiving device is received and the emission current is generated, the transceiver further transmits a frequency locking start response message to the receiving device, where the frequency locking start response message is used to notify the receiving device that the transmitting device has started the frequency locking procedure. The frequency locking start response message may further carry the frequency and a current value of the emission current, so that the receiving device learns the frequency and current value of the emission current based on the frequency locking start response message.

In an embodiment,
the transceiver is further configured to receive at least one piece of indication information transmitted by the receiving device, where the at least one piece of indication information is transmitted by the receiving device when a current value of the input current is beyond a third preset range; and
the controller is further configured to generate, based on the at least one piece of indication information, at least one piece of second control information corresponding to the at least one piece of indication information on a one-to-one basis, where the at least one piece of second control information is used to adjust the current value of the emission current generated by the transmitting module to change the input current.

In this embodiment, when the current value of the input current is beyond the third preset range, the at least one piece of indication information may be transmitted to the transmitting device, to adjust the current value of the emission current of the transmitting device to change the input current. Further, the current value of the input current is adjusted to be within the third preset range, so that the receiving device can detect the input frequency of the input current more accurately.

In an embodiment,
the transceiver is further configured to receive frequency locking success information transmitted by the receiving device, where the frequency locking success information is transmitted after the receiving device adjusts the frequency of the rectifier to the input frequency; and
the controller is further configured to end the frequency locking procedure based on the frequency locking success information, and maintain the emission current.

In this embodiment, after the receiving device completes frequency locking, the receiving device transmits the frequency locking success information to the transmitting device, so that the transmitting device ends the frequency locking procedure and that the transmitting device maintains the emission current.

In an embodiment,
the transceiver is further configured to transmit a frequency locking end response message to the receiving device in response to the frequency locking success information, so that the receiving device determines, based on the frequency locking end response message, that the transmitting device has ended the frequency locking procedure, and obtains the current value of the emission current maintained by the transmitting device.

In this embodiment, after the transmitting device receives the frequency locking success information and maintains the emission current, the transmitting device further transmits the frequency locking end response message to the receiving device in response to the frequency locking success information, so that the receiving device can determine, based on the frequency locking end response message, that the transmitting device has ended the frequency locking procedure, and obtain the current value of the emission current maintained by the transmitting device.

In an embodiment,
the transceiver is further configured to receive a charging request transmitted by the receiving device;
the controller is configured to generate a second control signal based on the charging request; and
the transmitting module is configured to supply charging power to the receiving device based on the second control signal.

In this embodiment, the transmitting device further receives a charging status transmitted by the receiving device, generates the second control signal based on the charging status, and controls the transmitting module to supply charging power to the receiving device.

According to a fourth aspect, this application provides a wireless charging system, where the wireless charging system includes a receiving device and a transmitting device, where
the receiving device is configured to transmit a parameter related to frequency locking to the transmitting device, where the parameter related to frequency locking includes information about a first preset range;
the transmitting device is configured to transmit frequency locking capability information to the receiving device based on the parameter related to frequency locking;
the receiving device is further configured to transmit a frequency locking request to the transmitting device when determining, based on the frequency locking capability information, that the transmitting device supports generation of an emission current whose frequency is within the first preset range;

the transmitting device is configured to generate the emission current based on the frequency locking request;

the receiving device is further configured to obtain an input current through induction based on the emission current, where the frequency of the emission current is within the first preset range;

the receiving device is further configured to detect the input current to obtain an input frequency; and the receiving device is further configured to adjust a frequency of a rectifier of the receiving device to the input frequency.

In this embodiment, the receiving device may interact with the transmitting device. The receiving device may learn, by interacting with the transmitting device, whether the transmitting device supports a working frequency of the receiving device. If the transmitting device supports the working frequency of the receiving device, the receiving device may transmit the frequency locking request to the transmitting device, to notify the transmitting device to generate the emission current, where the frequency of the emission current is within the first preset range. The frequency of the input current detected by the receiving device is also within the first preset range. The receiving device adjusts the frequency of the rectifier to be consistent with the frequency of the input current, so that the frequency of the rectifier of the receiving device keeps consistent with that of the transmitting device. Therefore, in this embodiment, after determining that the transmitting device supports the working frequency of the receiving device, the receiving device performs a frequency adjustment, so that the frequency of the receiving device keeps matched with that of the transmitting device. This can avoid oscillation of the wireless charging system caused by a frequency difference between working frequencies of the receiving device and the transmitting device, ensure stable charging of the receiving device, and improve stability of the wireless charging system.

In an embodiment, the receiving device is further configured to transmit at least one piece of indication information to the transmitting device when a current value of the input current is beyond a third preset range;

the transmitting device is further configured to adjust a current value of the emission current based on the at least one piece of indication information to change the input current; and the receiving device is specifically configured to detect a changed input current, and when a current value of the changed input current is within the third preset range, detect the changed input current to obtain an input frequency.

In this embodiment, when the current value of the input current is beyond the third preset range, the receiving device further transmits the at least one piece of indication information to the transmitting device. The current value of the emission current is adjusted based on the at least one piece of indication information, so that the current value of the input current is changed. The current value of the input current may be adjusted to be within the third preset range, and the third preset range is a range within which the receiving device can accurately detect the frequency of the input current. This improves accuracy of the input frequency detected by the receiving device.

According to a fifth aspect, this application provides a wireless charging system, where the wireless charging system includes a receiving device and a transmitting device, where the receiving device is configured to transmit a frequency locking request to the transmitting device;

the transmitting device is configured to generate an emission current based on the frequency locking request;

the receiving device is further configured to obtain an input current through induction based on the emission current;

the receiving device is further configured to transmit at least one piece of indication information to the transmitting device when a current value of the input current is beyond a third preset range;

the transmitting device is further configured to adjust a current value of the emission current based on the at least one piece of indication information to change the input current;

the receiving device is further configured to detect a changed input current, and when a current value of the changed input current is within the third preset range, detect the input current to obtain an input frequency; and the receiving device is further configured to adjust a frequency of a rectifier of the receiving device to the input frequency.

In this embodiment, before the receiving device adjusts the frequency of the rectifier, the current value of the input current is changed by adjusting the current value of the emission current, so that the current value of the input current is within the third preset range, that is, the current value of the input current is within the third preset range within which the receiving device can accurately detect the frequency. Therefore, the receiving device can accurately detect the frequency of the input current, and adjust the frequency of the rectifier of the receiving device more accurately. This can avoid oscillation of the wireless charging system caused by a frequency difference between working frequencies of the receiving device and the transmitting device, ensure stable charging of the receiving device, and improve stability of the wireless charging system.

In an embodiment, before transmitting the frequency locking request to the transmitting device, the receiving device is further configured to transmit a parameter related to frequency locking to the transmitting device, where the parameter related to frequency locking includes information about a first preset range;

the transmitting device is further configured to transmit frequency locking capability information to the receiving device based on the parameter related to frequency locking;

the receiving device is further configured to determine, based on the frequency locking capability information, that the transmitting device supports generation of an emission current whose frequency is within the first preset range; and the receiving device is specifically configured to transmit the frequency locking request to the transmitting device if it is determined that the transmitting device supports generation of the emission current whose frequency is within the first preset range.

In this embodiment, the receiving device may learn, by interacting with the transmitting device, whether the transmitting device supports the working frequency of the receiving device, and the receiving device transmits the frequency locking request to the transmitting device only when the transmitting device supports the working frequency of the receiving device. This further ensures matching between the frequencies of the receiving device and the transmitting device, and improves stability of the wireless charging system.

The following describes some embodiments of the fourth aspect or the fifth aspect of this application.

In an embodiment, after the transmitting device receives the frequency locking request transmitted by the receiving device and generates the emission current, the transmitting device further transmits a frequency locking start response message to the receiving device, where the frequency locking start response message is used to notify the receiving device that the transmitting device has started a frequency locking procedure. The frequency locking start response message may further carry the frequency and current value of the emission current, so that the receiving device learns the frequency and current value of the emission current based on the frequency locking start response message.

In an embodiment, any one of the at least one piece of indication information includes a current value indication value or an adjustment value. The current indication value is used to indicate that the transmitting device is to adjust the current value of the emission current to the current indication value. The adjustment value is used to indicate that the current value of the emission current is to be increased or decreased by the adjustment value.

Therefore, in this embodiment, a plurality of different emission current adjustment manners are provided, and the receiving device can flexibly select an emission current adjustment manner.

In an embodiment,
the transmitting device is further configured to return a response message in response to each of the received at least one piece of indication information, where the response message includes a current value of the emission current after the transmitting device adjusts the emission current each time; therefore, the receiving device accurately determines an adjustment granularity of the emission current based on the adjusted current value of the emission current, so that the emission current is more accurately and effectively adjusted.

In an embodiment,
the transmitting device is further configured to transmit a query message to the receiving device, where the query message is used to request the parameter related to frequency locking of the receiving device; and
after receiving the query message, the receiving device is specifically configured to return, in response to the query message, the parameter related to frequency locking; or
the receiving device may actively transmit the parameter related to frequency locking to the transmitting device, for example, may transmit the parameter related to frequency locking to the transmitting device through an operation of a user, or may transmit the parameter related to frequency locking to the transmitting device after detecting the transmitting device within a preset range around the receiving device.

Therefore, in this embodiment, the receiving device may return, in response to the query message of the transmitting device, the parameter related to frequency locking, or the receiving device may actively transmit the parameter related to frequency locking to the transmitting device. This embodiment is applicable to a plurality of scenarios, and whether the frequency of the receiving device matches that of the transmitting device can be flexibly confirmed.

In an embodiment, the parameter related to frequency locking further includes information about a second preset range; and
the receiving device is specifically configured to transmit the frequency locking request to the transmitting device when determining, based on the frequency locking capability information, that the transmitting device supports generation of an emission current whose frequency is within the first preset range and whose current value is within the second preset range.

In this embodiment, the receiving device transmits the frequency locking request to the transmitting device and performs a subsequent frequency synchronization operation, only when the receiving device determines that the transmitting device supports generation of the emission current whose frequency is within the first preset range and whose current value is within the second preset range. This can ensure that both the frequency and current of the receiving device match those of the transmitting device, improve stability of the wireless charging system, and improve charging efficiency.

In an embodiment,
after adjusting the frequency of the rectifier of the receiving device to the input frequency, the receiving device is further configured to transmit frequency locking success information to the transmitting device; and
the transmitting device is further configured to maintain the emission current based on an instruction.

In this embodiment, after the receiving device adjusts the frequency of the rectifier to the input frequency, the receiving device further transmits the frequency locking success information to the transmitting device, so that the transmitting device maintains the emission current based on the frequency locking success information, where the maintaining specifically includes maintaining the frequency of the emission current, and may further include maintaining the current value of the emission current. This achieves frequency consistency between the transmitting device and the receiving device, implements frequency locking, reduces the frequency difference between the receiving device and the transmitting device, and improves stability of the wireless charging system.

In an embodiment,
the transmitting device is further configured to transmit a frequency locking end response message to the receiving device after the transmitting device maintains the emission current based on the emission instruction, where the frequency locking end response message carries the frequency and current value of the emission current maintained by the transmitting device; and
the receiving device is further configured to determine, based on the frequency locking end response message, the frequency and current value of the emission current maintained by the transmitting device.

In this embodiment, after the transmitting device receives the frequency locking success information, the transmitting device further transmits the frequency locking end response message to the receiving device, where the frequency locking end response message carries the frequency and current value of the emission current maintained by the transmitting device, so that the receiving device determines, based on the frequency locking end response message, the frequency and current value of the emission current maintained by the transmitting device.

In an embodiment, after adjusting the frequency of the rectifier to the input frequency, the receiving device is further configured to transmit the frequency locking success information to the transmitting device, to notify the transmitting device that the receiving device has adjusted the working frequency to match that of the transmitting device.

In an embodiment, after adjusting the frequency of the rectifier of the receiving device to the input frequency, the receiving device is further configured to transmit a charging request to the transmitting device; and the transmitting device is further configured to supply charging power to the receiving device based on the charging request.

In this embodiment, after the receiving device adjusts the working frequency to match that of the receiving device, the receiving device further transmits the charging request to the transmitting device, so that the transmitting device can supply charging energy to the receiving device and that the receiving device can be successfully charged.

In an embodiment, the receiving device is further configured to transmit a charging indication value to the transmitting device, where the charging indication value is used to indicate that the transmitting device is to generate an emission current whose current value is the charging indication value, so that the receiving device can be successfully charged based on the emission current.

In an embodiment, before the receiving device transmits the frequency locking request to the transmitting device, the receiving device further short-circuits the rectifier of the receiving device to avoid a frequency difference between the frequency of the rectifier and the frequency of the transmitting device before the frequency adjustment is completed and avoid oscillation of the wireless charging system.

In an embodiment, after adjusting the frequency of the rectifier to the input frequency, the receiving device further stops short-circuiting of the rectifier, so that the receiving device can convert an alternating input current into a direct current by using the rectifier.

In an embodiment, if the receiving device determines, based on the frequency locking capability information, that the transmitting device does not support any frequency within the first preset range, the receiving device is further configured to generate first prompt information, where the first prompt information is used to indicate that the transmitting device does not match the receiving device.

In this embodiment, when the transmitting device does not support any frequency within the first preset range, the receiving device may generate and output the first prompt information, to remind the user to replace the transmitting device in time. This improves user experience.

According to a sixth aspect, this application provides a receiving device, including a receiving module, a rectifier, a detector, a transceiver, and a controller, where an input terminal of the receiving module is coupled to a transmitting module of a transmitting device, an output terminal of the receiving module is connected to an input terminal of the rectifier, the output terminal of the receiving module is further connected to an input terminal of the detector, an output terminal of the detector is connected to the controller, an output terminal of the rectifier is connected to a load or a filter or the like, the rectifier is further connected to the controller, and the controller is further connected to the transceiver;

the transceiver is configured to transmit a parameter related to frequency locking to the transmitting device, and receive frequency locking capability information transmitted by the transmitting device, where the parameter related to frequency locking includes information about a first preset range;

the controller is configured to determine, based on the frequency locking capability information, whether the transmitting device supports generation of an emission current whose frequency is within the first preset range;

when the controller determines that the transmitting device supports generation of the emission current whose frequency is within the first preset range, the transceiver is further configured to transmit a frequency locking request to the transmitting device, so that the transmitting device generates the emission current based on the frequency locking request;

the receiving module is configured to receive electromagnetic energy generated by the transmitting module based on the emission current, and output an input current;

the detector is configured to detect a frequency of the input current to obtain an input frequency;

the controller is further configured to generate an adjustment signal, where the adjustment signal is used to adjust a frequency of the rectifier to the input frequency; and the rectifier is configured to convert an alternating current output by the receiving module into a direct current when the receiving device is charged.

In this embodiment, the receiving device may interact with the transmitting device by using the transceiver, and may learn, by interacting with the transmitting device, whether the transmitting device supports a working frequency of the receiving device. If the transmitting device supports the working frequency of the receiving device, the receiving device may transmit the frequency locking request to the transmitting device, to notify the transmitting device to generate the emission current, where the frequency of the emission current is within the first preset range. The frequency of the input current detected by the receiving device is also within the first preset range. The receiving device adjusts the frequency of the rectifier to be consistent with the frequency of the input current, so that the frequency of the rectifier of the receiving device keeps consistent with that of the transmitting device. Therefore, in this embodiment, the receiving device performs a frequency adjustment after determining that the transmitting device supports the working frequency of the receiving device. This can avoid oscillation of a wireless charging system caused by a frequency difference between working frequencies of the receiving device and the transmitting device, ensure stable charging of the receiving device, and improve stability of the wireless charging system.

In an embodiment, the transceiver is further configured to transmit at least one piece of indication information to the transmitting device when a current value of the input current is beyond a third preset range, where the at least one piece of indication information is used to indicate the transmitting device to adjust a current value of the emission current to change the input current;

the receiving module is specifically configured to induce a changed emission current to obtain a changed input current; and when detecting that a current value of the changed input current is within the third preset range, the detector is specifically configured to detect the changed input current to obtain an input frequency.

In this embodiment, when the current value of the input current is beyond the third preset range, the receiving device further transmits the at least one piece of indication information to the transmitting device. The current value of the emission current is adjusted based on the at least one piece of indication information, so that the current value of the input current is changed. The current value of the input current may be adjusted to be within the third preset range, and the third preset range is a range within which the receiving device can accurately detect the frequency of the input current. This improves accuracy of the input frequency detected by the receiving device.

According to a seventh aspect, this application provides a receiving device, including a receiving module, a rectifier, a detector, a transceiver, and a controller, where an input terminal of the receiving module is coupled to a transmitting module of a transmitting device, an output terminal of the receiving module is connected to an input terminal of the rectifier, the output terminal of the receiving module is further connected to an input terminal of the detector, an output terminal of the detector is connected to the controller, an output terminal of the rectifier is connected to a load or a filter or the like, the rectifier is further connected to the controller, and the controller is further connected to the transceiver;

the transceiver is configured to transmit a frequency locking request to a transmitting device, where the frequency locking request is used to indicate the transmitting device to generate an emission current, and a frequency of the emission current is within a first preset range;

the receiving module is configured to induce a changed emission current based on the emission current to obtain an input current;

the transceiver is further configured to transmit at least one piece of indication information to the transmitting device if a current value of the input current is beyond a third preset range, where the at least one piece of indication information is used to indicate the transmitting device to adjust the emission current to change the input current;

the detector is configured to detect a changed input current, and when detecting that a current value of the changed input current is within the third preset range, detect the input current to obtain an input frequency; and the controller is configured to generate an adjustment signal, where the adjustment signal is used to control a controllable switching transistor of the rectifier to adjust a frequency of the rectifier to the input frequency.

In this embodiment, before the receiving device adjusts the frequency of the rectifier, the current value of the input current is changed by adjusting a current value of the emission current, so that the current value of the input current is within the third preset range, that is, the current value of the input current is within the third preset range within which the receiving device can accurately detect the frequency. Therefore, the receiving device can accurately detect the frequency of the input current, and adjust the frequency of the rectifier of the receiving device more accurately. This can avoid oscillation of a wireless charging system caused by a frequency difference between working frequencies of the receiving device and the transmitting device, ensure stable charging of the receiving device, and improve stability of the wireless charging system.

In an embodiment, before transmitting the frequency locking request to the transmitting device, the transceiver is further configured to transmit a parameter related to frequency locking to the transmitting device, where the parameter related to frequency locking includes information about the first preset range of the working frequency of the receiving device;

the transceiver is further configured to receive frequency locking capability information transmitted by the transmitting device;

the controller is further configured to determine, based on the frequency locking capability information, that the transmitting device supports generation of the emission current whose frequency is within the first preset range; and the transceiver is specifically configured to transmit the frequency locking request to the transmitting device when it is determined that the transmitting device supports generation of the emission current whose frequency is within the first preset range, where the frequency locking request is used to indicate the transmitting device to generate the emission current whose frequency is within the first preset range.

In this embodiment, the receiving device may learn, by interacting with the transmitting device, whether the transmitting device supports the working frequency of the receiving device, and the receiving device transmits the frequency locking request to the transmitting device only when the transmitting device supports the working frequency of the receiving device. This further ensures matching between the frequencies of the receiving device and the transmitting device, and improves stability of the wireless charging system.

The following describes embodiments of the sixth aspect or the seventh aspect of this application.

In an embodiment, after the transmitting device receives the frequency locking request transmitted by the receiving device and generates the emission current, the transmitting device further transmits a frequency locking start response message to the receiving device, and the transceiver of the receiving device is further configured to receive the frequency locking start response message; and the controller is further configured to learn, based on the frequency locking start response message, that the transmitting device has started a frequency locking procedure, and the frequency and current value of the emission current.

In an embodiment, the parameter related to frequency locking further includes information about a second preset range;

the controller is further configured to determine, based on the frequency locking capability information, whether the transmitting device supports generation of an emission current whose current value is within the second preset range; and the transceiver is specifically configured to transmit the frequency locking request to the transmitting device when the controller determines that the transmitting device supports generation of an emission current whose frequency is within the first preset range and whose current value is within the second preset range.

In this embodiment, the receiving device transmits the frequency locking request to the transmitting device and performs a subsequent frequency synchronization operation, only when the receiving device determines that the transmitting device supports generation of the emission current whose frequency is within the first preset range and whose current value is within the second preset range. This can ensure that both the frequency and current of the receiving device match those of the transmitting device, improve stability of the wireless charging system, and improve charging efficiency.

In an embodiment, any one of the at least one piece of indication information includes a current value indication value or an adjustment value. The current indication value is used to indicate that the transmitting device is to adjust the current value of the emission current to the current indication value. The adjustment value is used to indicate that the current value of the emission current is to be increased or decreased by the adjustment value.

Therefore, in this embodiment, a plurality of different emission current adjustment manners are provided, and the receiving device can flexibly select an emission current adjustment manner.

In an embodiment,
the transceiver is further configured to receive a query message transmitted by the transmitting device; and
the transceiver is specifically configured to return, in response to the query message, the parameter related to frequency locking; or
the transceiver is configured to actively transmit the parameter related to frequency locking to the transmitting device, for example, may transmit the parameter related to frequency locking to the transmitting device through an operation of a user, or may transmit the parameter related to frequency locking to the transmitting device after the transmitting device is detected within a preset range.

Therefore, in this embodiment, the receiving device may return, in response to the query message of the transmitting device, the parameter related to frequency locking, or the receiving device may actively transmit the parameter related to frequency locking to the transmitting device. This embodiment is applicable to a plurality of scenarios, and whether the frequency of the receiving device matches that of the transmitting device can be confirmed flexibly.

In an embodiment,
after the frequency of the rectifier is adjusted to the input frequency, the transceiver is further configured to transmit frequency locking success information to the transmitting device, where the frequency locking success information is used to indicate the transmitting device to maintain the emission current.

In this embodiment, after the receiving device adjusts the frequency of the rectifier to the input frequency, the receiving device further transmits the frequency locking success information to the transmitting device, so that the transmitting device maintains the emission current based on the frequency locking success information, where the maintaining specifically includes maintaining the frequency of the emission current, and may further include maintaining the current value of the emission current. This achieves frequency consistency between the transmitting device and the receiving device, implements frequency locking, reduces the frequency difference between the receiving device and the transmitting device, and improves stability of the wireless charging system.

In an embodiment,
after the frequency of the rectifier is adjusted to the input frequency, the transceiver is further configured to transmit a charging request to the transmitting device, where the charging request is used to indicate the transmitting device to supply charging power to the receiving device.

In this embodiment, after the receiving device adjusts the working frequency to match that of the receiving device, the receiving device further transmits the charging request to the transmitting device, so that the transmitting device can supply charging energy to the receiving device and that the receiving device can be successfully charged.

In an embodiment,
the transceiver is further configured to transmit a charging indication value to the transmitting device, where the charging indication value is used to indicate that the transmitting device is to generate an emission current whose current value is the charging indication value.

In an embodiment,
before the transceiver transmits the frequency locking request to the transmitting device, the controller is further configured to generate a short-circuit signal, and transmit the short-circuit signal to the rectifier, so that the rectifier is short-circuited, to avoid a frequency difference between the frequency of the rectifier and the frequency of the transmitting device before the frequency adjustment is completed and avoid oscillation of the wireless charging system.

In an embodiment,
after the controller adjusts the frequency of the rectifier to the input frequency based on the adjustment signal, the receiving device further cancels short-circuiting of the rectifier, so that the receiving device can convert an alternating input current into a direct current by using the rectifier.

According to an eighth aspect, this application provides a transmitting device, including a transmitting module, a transceiver, and a controller, where
the transceiver is configured to receive a parameter related to frequency locking, where the parameter related to frequency locking is transmitted by a receiving device and includes information about a first preset range;
the controller is configured to generate frequency locking capability information, where the frequency locking capability information is used to indicate whether generation of an emission current whose frequency is within the first preset range is supported;
the transceiver is further configured to transmit the frequency locking capability information to the receiving device;
the transceiver is further configured to receive a frequency locking request transmitted by the receiving device, where the frequency locking request is transmitted when the receiving device determines that the transmitting device supports generation of the emission current whose frequency is within the first preset range; and
the transmitting module is configured to generate the emission current based on the frequency locking request, so that the receiving device obtains an input current based on the emission current and adjusts a frequency of a rectifier of the receiving device based on an input frequency of the input current.

In this embodiment, the transmitting device may return the frequency locking capability information in response to the parameter related to frequency locking that is transmitted by the receiving device, so that the receiving device determines, based on the frequency locking capability information, whether the transmitting device supports the working frequency of the receiving device; and when the transmitting device supports the working frequency of the receiving device, the receiving device transmits the frequency locking request to the transmitting device to complete the frequency adjustment, so that the frequency of the receiving device matches the frequency of the transmitting device. Therefore, in this embodiment of this application, the interaction between the transmitting device and the receiving device and the frequency adjustment of the receiving device ensure that the frequency of the transmitting device matches the frequency of the receiving device. Therefore, stability of the wireless charging system is improved.

In an embodiment, after the frequency locking request transmitted by the receiving device is received and the emission current is generated, the transceiver further transmits a frequency locking start response message to the receiving device, so that the receiving device learns, based on the frequency locking start response message, that the transmitting device has started a frequency locking procedure, and the frequency and a current value of the emission current.

In an embodiment, the transceiver is further configured to receive at least one piece of indication information, where the at least one piece of indication information is transmitted by the receiving device when a current value of the input current is beyond a third preset range; and the controller is configured to generate a second control signal, and use the control signal to adjust the emission current generated by the transmitting module, to change the input current, so that a current value of the input current is within the third preset range.

In this embodiment, the transmitting device further receives the at least one piece of indication information transmitted by the receiving device, and adjusts the current value of the emission current based on the at least one piece of indication information, to change the current value of the input current, so that the current value of the changed input current is within the third preset range. Therefore, the receiving device can accurately detect an input frequency based on the input current whose current value is within the third preset range.

In an embodiment, any one of the at least one piece of indication information includes a current value indication value or an adjustment value. The current indication value is used to indicate that the transmitting device is to adjust the current value of the emission current to the current indication value. The adjustment value is used to indicate that the current value of the emission current is to be increased or decreased by the adjustment value.

Therefore, in this embodiment, a plurality of different emission current adjustment manners are provided, and the receiving device can flexibly select an emission current adjustment manner.

In an embodiment, the transceiver is further configured to transmit a query message to the receiving device, where the query message is used to request the parameter related to frequency locking of the receiving device, so that the receiving device returns, in response to the query message, the parameter related to frequency locking after the receiving device receives the query message. This embodiment provides a manner of obtaining the parameter related to frequency locking.

In an embodiment, the parameter related to frequency locking further includes information about a second preset range; and the frequency locking capability information is further used to indicate whether generation of an emission current whose current value is within the second preset range is supported, so that the receiving device determines, based on the frequency locking capability information, whether the transmitting device supports generation of an emission current whose frequency is within the first preset range and whose current value is within the second preset range, and that the receiving device determines, based on the frequency locking capability information, whether the transmitting device can be used to charge the receiving device. This improves stability of the wireless charging system and user experience.

In this embodiment, the receiving device transmits the frequency locking request to the transmitting device and performs a subsequent frequency synchronization operation, only when the receiving device determines that the transmitting device supports generation of the emission current whose frequency is within the first preset range and whose current value is within the second preset range. This can ensure that both the frequency and current of the receiving device match those of the transmitting device, improve stability of the wireless charging system, and improve charging efficiency.

In an embodiment, the transceiver is further configured to receive frequency locking success information, where the frequency locking success information is transmitted after the receiving device adjusts the frequency of the rectifier of the receiving device to the input frequency; and the controller is further configured to generate a third control signal based on the frequency locking success information, and use the third control signal to control the transmitting module to maintain the emission current.

In this embodiment, after the receiving device adjusts the frequency of the rectifier to the input frequency, the receiving device further transmits the frequency locking success information to the transmitting device, so that the transmitting device maintains the emission current based on the frequency locking success information, where the maintaining specifically includes maintaining the frequency of the emission current, and may further include maintaining the current value of the emission current. This achieves frequency consistency between the transmitting device and the receiving device, implements frequency locking, reduces the frequency difference between the receiving device and the transmitting device, and improves stability of the wireless charging system.

In an embodiment, after the frequency of the rectifier of the receiving device is adjusted to the input frequency, the transceiver is further configured to receive a charging request transmitted by the receiving device; and the controller is further configured to supply charging power to the receiving device based on the charging request.

In this embodiment, after the receiving device adjusts the working frequency to match that of the receiving device, the receiving device further transmits the charging request to the transmitting device, so that the transmitting device can supply charging energy to the receiving device and that the receiving device can be successfully charged.

According to a ninth aspect, this application provides a frequency locking method, applied to a wireless charging system, where the wireless charging system includes a transmitting device and a receiving device, the transmitting device is configured to supply power to the receiving device, and the method includes:

the receiving device transmits a frequency locking request to the transmitting device, where the frequency locking request is used to indicate the transmitting device to generate an emission current, and a frequency of the emission current is within a first preset range; the receiving device obtains an input current through induction based on the emission current; if a current value of the input current is beyond a third preset range, the receiving device transmits at least one piece of indication information to the transmitting device, where the at least one piece of indication information is used to indicate the transmitting device to adjust the emission current to change the input current; the receiving device detects a changed input current, and when a current value of the changed input current is within the third preset range, detects the input current to obtain an input frequency; and the receiving device adjusts a frequency of a rectifier of the receiving device to the input frequency.

In this embodiment, before the receiving device adjusts the frequency of the rectifier, the current value of the input current is changed by adjusting a current value of the emission current, so that the current value of the input current is within the third preset range, that is, the current value of the input current is within the third preset range within which the receiving device can accurately detect the frequency. Therefore, the receiving device can accurately detect the frequency of the input current, and adjust the frequency of the rectifier of the receiving device more accurately. This can avoid oscillation of the wireless charging system caused by a frequency difference between working frequencies of the receiving device and the transmitting device, ensure stable charging of the receiving device, and improve stability of the wireless charging system.

In an embodiment, any one of the at least one piece of indication information includes a second current indication value or an adjustment value, where the second current indication value is used to indicate that the transmitting device is to adjust the emission current to the second current indication value, and the adjustment value is used to indicate that the transmitting device is to increase or decrease the emission current by the adjustment value. Therefore, in this embodiment, a plurality of different emission current adjustment manners are provided, and the receiving device can flexibly select an emission current adjustment manner.

In an embodiment, before the receiving device transmits the frequency locking request to the transmitting device, the method further includes:

the receiving device transmits a parameter related to frequency locking to the transmitting device, where the parameter related to frequency locking includes information about a first preset range; the receiving device receives frequency locking capability information transmitted by the transmitting device; and the receiving device determines, based on the frequency locking capability information, whether the transmitting device supports generation of an emission current whose frequency is within the first preset range; and that the receiving device transmits a frequency locking request to the transmitting device includes: when determining that the transmitting device supports generation of the emission current whose frequency is within the first preset range, the receiving device transmits the frequency locking request to the transmitting device, where the frequency locking request is used to indicate the transmitting device to generate the emission current whose frequency is within the first preset range.

In this embodiment, the receiving device may learn, by interacting with the transmitting device, whether the transmitting device supports the working frequency of the receiving device, and the receiving device transmits the frequency locking request to the transmitting device only when the transmitting device supports the working frequency of the receiving device. This further ensures matching between the frequencies of the receiving device and the transmitting device, and improves stability of the wireless charging system.

In an embodiment, after receiving a query message, the receiving device may return, in response to the query message, the parameter related to frequency locking; or the receiving device may actively transmit the parameter related to frequency locking to the transmitting device, for example, may transmit the parameter related to frequency locking to the transmitting device through an operation of a user, or may transmit the parameter related to frequency locking to the transmitting device after detecting the transmitting device within a preset range.

Therefore, in this embodiment, the receiving device may return, in response to the query message of the transmitting device, the parameter related to frequency locking, or the receiving device may actively transmit the parameter related to frequency locking to the transmitting device. This embodiment is applicable to a plurality of scenarios, and whether the frequency of the receiving device matches that of the transmitting device can be confirmed flexibly.

In an embodiment, the parameter related to frequency locking further includes information about a second preset range; and the method further includes:

the receiving device determines, based on the frequency locking capability information, whether the transmitting device supports generation of an emission current whose current value is within the second preset range; and that the receiving device transmits a frequency locking request to the transmitting device includes: when determining that the transmitting device supports generation of an emission current whose frequency is within the first preset range and whose current value is within the second preset range, the receiving device transmits the frequency locking request to the transmitting device, where the frequency locking request is used to indicate the transmitting device to generate the emission current whose frequency is within the first preset range and whose current value is within the second preset range.

In this embodiment, the receiving device transmits the frequency locking request to the transmitting device and performs a subsequent frequency synchronization operation, only when the receiving device determines that the transmitting device supports generation of the emission current whose frequency is within the first preset range and whose current value is within the second preset range. This can ensure that both the frequency and current of the receiving device match those of the transmitting device, improve stability of the wireless charging system, and improve charging efficiency.

In an embodiment, after the receiving device adjusts the frequency of the rectifier of the receiving device to the input frequency, the method further includes: the receiving device transmits frequency locking success information to the transmitting device, where the frequency locking success information is used to indicate the transmitting device to maintain the emission current.

In this embodiment, after the receiving device adjusts the frequency of the rectifier to the input frequency, the receiving device further transmits the frequency locking success information to the transmitting device, so that the transmitting device maintains the emission current based on the frequency locking success information, where the maintaining specifically includes maintaining the frequency of the emission current, and may further include maintaining the current value of the emission current. This achieves frequency consistency between the transmitting device and the receiving device, implements frequency locking, reduces the frequency difference between the receiving device and the transmitting device, and improves stability of the wireless charging system.

In an embodiment,
the receiving device is further configured to transmit a charging request to the transmitting device, where the charging request is used to indicate the transmitting device to supply charging power to the receiving device.

In this embodiment, after the receiving device adjusts the working frequency to match that of the receiving device, the receiving device further transmits the charging request to the transmitting device, so that the transmitting device can supply charging energy to the receiving device and that the receiving device can be successfully charged.

In an embodiment, the receiving device may further transmit a charging indication value to the transmitting device, where the charging indication value is used to indicate that the transmitting device is to generate an emission current whose current value is the charging indication value, so that the receiving device can be successfully charged based on the emission current.

In an embodiment, before the receiving device transmits the frequency locking request to the transmitting device, the receiving device may further short-circuit the rectifier of the receiving device to avoid a frequency difference between the frequency of the rectifier and the frequency of the transmitting device before the frequency adjustment is completed and avoid oscillation of the wireless charging system.

In an embodiment, after adjusting the frequency of the rectifier to the input frequency, the receiving device may further cancel short-circuiting of the rectifier, so that the receiving device can convert an alternating input current into a direct current by using the rectifier.

According to a tenth aspect, this application provides a wireless charging system, where the wireless charging system includes a receiving device and a transmitting device, and the receiving device includes a rectifier, where
the receiving device is configured to short-circuit an input terminal of the rectifier, and transmit a frequency locking request to the transmitting device, where the frequency locking request carries information about a first preset range;
the transmitting device is configured to generate an emission current based on the frequency locking request, where a frequency of the emission current is within the first preset range;
the receiving device is configured to obtain an input current of the rectifier based on the emission current;
the receiving device is further configured to transmit frequency locking success information to the transmitting device when it is detected that a frequency of the input current is within the first preset range; and
the transmitting device is further configured to maintain the emission current based on the frequency locking success information.

In this embodiment, the receiving device may complete frequency locking by interacting with the transmitting device, so that working frequencies of the receiving device and the transmitting device keep consistent, to avoid oscillation of the system caused by inconsistency between the working frequencies of the receiving device and the transmitting device.

In an embodiment, the receiving device is specifically configured to detect the frequency of the input current when a current value of the input current is within a third preset range.

In an embodiment,
the receiving device is further configured to transmit at least one piece of indication information to the transmitting device when the current value of the input current is beyond the third preset range; and
after receiving each of the at least one piece of indication information, the transmitting device is further configured to adjust a current value of the emission current to change the input current.

Therefore, when the current value of the input current is beyond the third preset range, the receiving device cannot detect the frequency of the input current, or when a frequency error of the input current is relatively large, the current value of the input current needs to be adjusted to be within an appropriate range. Therefore, indication information may be transmitted to the transmitting device to adjust the current value of the input current, so that the detected frequency of the input current is more accurate.

In an embodiment, the receiving device is further configured to adjust a control frequency of the rectifier to be consistent with the frequency of the input current.

In this embodiment, the receiving device may adjust the control frequency of the rectifier to be consistent with the frequency of the input current, so that the working frequencies of the receiving device and the transmitting device keep consistent, to avoid oscillation of the system caused by inconsistency between the working frequencies of the receiving device and the transmitting device.

In an embodiment, the transmitting device is further configured to transmit a frequency locking request response message to the receiving device in response to the frequency locking request.

In this embodiment, the transmitting device may further respond to the frequency locking request transmitted by the receiving device, to notify the receiving device that the transmitting device has received the frequency locking request.

In an embodiment, the frequency locking request further carries information about a second preset range, and the current value of the emission current is determined based on the second preset range.

Therefore, in this embodiment, the frequency locking request may further carry a range of the current value of the emission current, so that the transmitting device can determine the current value of the emission current based on the frequency locking request.

In an embodiment, the receiving device is further configured to transmit a charging request to the transmitting device, where the charging request is used to indicate the transmitting device to supply charging power to the receiving device.

According to an eleventh aspect, this application provides a receiving device, where the receiving device includes a transceiver, a controller, a receiving module, a detector, and a rectifier, where the controller is configured to control short-circuiting of an input terminal of the rectifier;

the transceiver is configured to transmit a frequency locking request to a transmitting device, where the frequency locking request carries information about a first preset range, and the frequency locking request is used to request the transmitting device to generate an emission current whose frequency is within the first preset range;

the receiving module is configured to obtain an input current of the rectifier based on the emission current;

the detector is configured to detect a frequency of the input current; and when the detector detects that the frequency of the input current is within the first preset range, the transceiver is further configured to transmit frequency locking success information to the transmitting device, where the frequency locking success information is used to indicate the transmitting device to maintain the emission current.

In an embodiment, the detector is specifically configured to detect the frequency of the input current when a current value of the input current is within a third preset range.

In an embodiment, the transceiver is further configured to transmit at least one piece of indication information to the transmitting device when the current value of the input current is beyond the third preset range, where the at least one piece of indication information is used to indicate the transmitting device to adjust a current value of the emission current to change the input current.

In an embodiment, the controller is further configured to adjust a control frequency of the rectifier to the frequency of the input current.

In an embodiment, the transceiver is further configured to receive a frequency locking request response message returned by the transmitting device in response to the frequency locking request.

In an embodiment, the frequency locking request further carries information about a second preset range, and the second preset range is used by the transmitting device to determine the current value of the emission current.

In an embodiment, the transceiver is further configured to transmit a charging request to the transmitting device, where the charging request is used to indicate the transmitting device to supply charging power to the receiving device.

According to a twelfth aspect, this application provides a transmitting device, where the transmitting device includes a transceiver and a transmitting module, where the transceiver is configured to receive a frequency locking request transmitted by a receiving device, where the frequency locking request carries information about a first preset range;

the transmitting module is configured to generate an emission current based on the frequency locking request, where a frequency of the emission current is determined based on the first preset range, and the emission current is used by the receiving device to obtain an input current of a rectifier;

the transceiver is further configured to receive at least one piece of indication information transmitted by the receiving device; and after the transceiver receives each of the at least one piece of indication information, the transmitting module is further configured to adjust a current value of the emission current to change the input current.

In an embodiment, the at least one piece of indication information is transmitted after the receiving device determines that a current value of the input current is beyond a third preset range.

In an embodiment, the transceiver is further configured to transmit a frequency locking request response message to the receiving device in response to the frequency locking request.

In an embodiment, the frequency locking request further carries information about a second preset range; and the transmitting module is specifically configured to determine the current value of the emission current based on the second preset range.

In an embodiment, the transceiver is further configured to receive a charging request transmitted by the receiving device; and the transmitting module is further configured to supply charging power to the receiving device based on the charging request.

According to a thirteenth aspect, this application provides a frequency locking method, applied to a wireless charging system, where the wireless charging system includes a transmitting device and a receiving device, the transmitting device is configured to supply power to the receiving device, and the method includes:

the receiving device transmits a frequency locking request to the transmitting device, where the frequency locking request includes information about a first preset range;

the receiving device obtains an input current of a rectifier of the receiving device based on the emission current;

the receiving device detects a frequency of the input current; and when the receiving device detects that the frequency of the input current is within the first preset range, the receiving device transmits frequency locking success information to the transmitting device, where the frequency locking success information is used to indicate the transmitting device to maintain the emission current.

In an embodiment, that the receiving device detects a frequency of the input current may include: when an amplitude value of the input current is within a third preset range, the receiving device detects the frequency of the input current.

In an embodiment, the method may further include:

if the current value of the input current is beyond the third preset range, the receiving device transmits at least one piece of indication information to the transmitting device, where the at least one piece of indication information is used to indicate the transmitting device to adjust the emission current to change the input current.

In an embodiment, the method may further include:

the receiving device transmits a charging request to the transmitting device, where the charging request is used to indicate the transmitting device to supply charging power to the receiving device.

In an embodiment, after the receiving device detects the frequency of the input current, the method may further include: the receiving device adjusts a control frequency of the rectifier to the input frequency.

According to a fourteenth aspect, this application provides a frequency locking method, applied to a wireless charging system, where the wireless charging system includes a transmitting device and a receiving device, the transmitting device is configured to supply power to the receiving device, and the method includes:

the transmitting device receives a frequency locking request transmitted by the receiving device, where the frequency locking request includes information about a first preset range;

the transmitting device generates an emission current, where the emission current is used by the receiving device to obtain an input current of a rectifier, and a frequency of the emission current is determined based on the first preset range; and the transmitting device receives at least one piece of indication information transmitted by the receiving device, and after receiving each of the at least one piece of indication information by using a transceiver, adjusts a current value of the emission current to change the input current.

In an embodiment, the at least one piece of indication information is transmitted after the receiving device determines that a current value of the input current is beyond a third preset range.

In an embodiment, after the transmitting device receives the frequency locking request transmitted by the receiving device, the method further includes: the transmitting device transmits a frequency locking request response message to the receiving device in response to the frequency locking request.

In an embodiment, the frequency locking request further carries information about a second preset range; and the method may further include:

the transmitting device determines the current value of the emission current based on the second preset range. In an embodiment, after adjusting the current value of the emission current, the method may further include: the transmitting device receives a charging request transmitted by the receiving device; and supplies charging power to the receiving device based on the charging request.

According to a fifteenth aspect, this application provides a digital processing chip, where the chip includes a processor and a memory, the memory and the processor are interconnected by a cable, the memory stores an instruction, and the processor is configured to implement a controller-related function in any one of the first aspect, the third aspect, the sixth aspect, the seventh aspect, the eleventh aspect, or the twelfth aspect.

According to a sixteenth aspect, an embodiment of this application provides a computer-readable storage medium, including an instruction, where when the computer-readable storage medium is coupled to a processor, the processor is enabled to implement a controller-related function in any one of the first aspect, the third aspect, the sixth aspect, the seventh aspect, the eleventh aspect, or the twelfth aspect.

According to a seventeenth aspect, an embodiment of this application provides a computer program product including an instruction, where when the computer program product runs on a computer, the computer is enabled to perform a controller-related function in any one of the first aspect, the third aspect, the sixth aspect, the seventh aspect, the eleventh aspect, or the twelfth aspect.

DESCRIPTION OF EMBODIMENTS

This application provides a frequency locking method, a wireless charging system, a receiving device, and a transmitting device, to determine, through interaction between the receiving device and the transmitting device in a wireless charging scenario, whether a frequency locking procedure can be performed between the transmitting device and the receiving device. This improves system stability.

The frequency locking method provided by this application may be applied to various scenarios in which wireless charging can be implemented, for example, a vehicle to grid (V2G) scenario, and a scenario in which an electric vehicle is charged by using a charging station. The method may be specifically applied to a wireless charging system. The wireless charging system may include a receiving device and a transmitting device. The transmitting device may be configured to supply power to the receiving device, and the receiving device may receive the power supplied by the transmitting device.

The transmitting device may be various charging devices supplying power, including but not limited to a wireless charging station, a wireless charging parking space, a wireless charging road, and the like. In addition, the transmitting device may be disposed on the ground, or may be buried in the ground.

The receiving device may include various devices on which wireless charging can be performed, including but not limited to an electric vehicle, a hybrid electric vehicle, and the like.

Figure 1A:
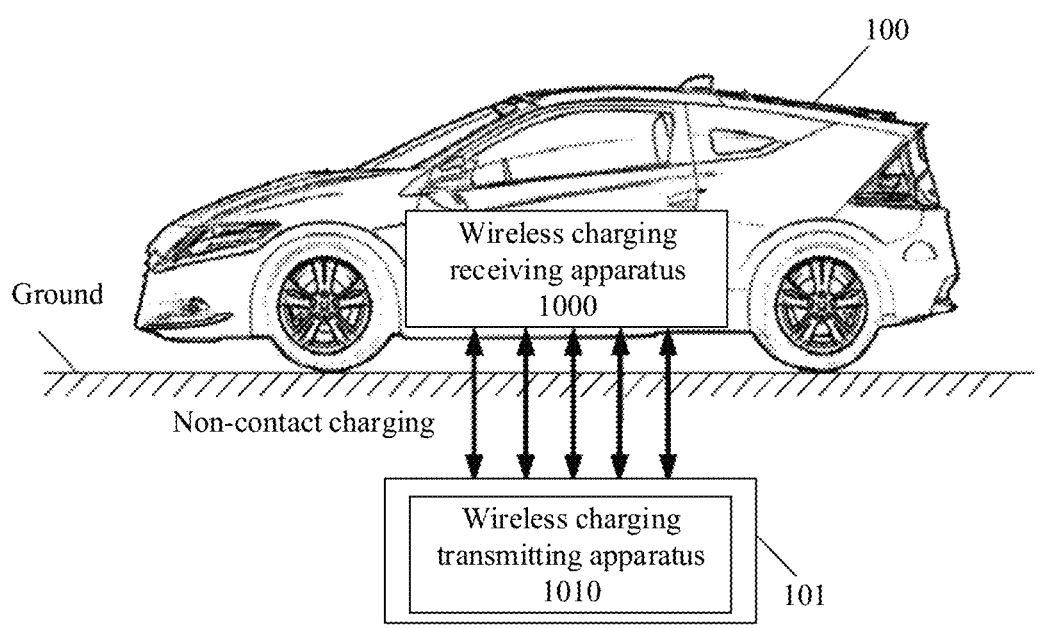
FIG. 1A is a schematic structural diagram of a wireless charging system according to this application.

For example, the following describes a wireless charging station buried in the ground and an electric vehicle. The wireless charging system provided in this application is shown in FIG. 1A. The wireless charging system includes a wireless charging station 101 and an electric vehicle 100.

The electric vehicle 100 may include a wireless charging receiving apparatus 1000, and the wireless charging station 101 may include a wireless charging transmitting apparatus 1010. Currently, a process of charging the electric vehicle by the wireless charging system is to perform non-contact charging through cooperation between the wireless charging receiving apparatus 1000 in the electric vehicle 100 and the wireless charging transmitting apparatus 1010 in the wireless charging station 101.

The wireless charging receiving apparatus 1000 may be specifically integrated with a bottom of the electric vehicle 100. When the electric vehicle 100 enters a wireless charging range of the wireless charging transmitting apparatus 1010, the electric vehicle 100 may be charged in a wireless charging manner. A receiving module and a rectifier of the wireless charging receiving apparatus 1000 may be integrated, or may be separated. When the receiving module and the rectifier are separated, the rectifier is usually placed in the vehicle. In FIG. 1A, the receiving module and the rectifier are integrated. A transmitting module and an inverter circuit of the wireless charging transmitting apparatus 1010 also have two manners: integrated or separated. In FIG. 1A, the transmitting module and the inverter circuit are integrated.

Optionally, non-contact charging may be wireless energy transfer performed between the wireless charging receiving apparatus 1000 and the wireless charging transmitting apparatus 1010 in a manner of electric field coupling or magnetic field coupling, which may be specifically a manner of electric field induction, magnetic field induction, magnetic resonance, or wireless radiation. This is not specifically limited in this application. Further, bidirectional charging may also be performed between the electric vehicle 100 and the wireless charging station 101. The wireless charging station 101 charges the electric vehicle 100 by using a power source, or the electric vehicle 100 is discharged to the power source.

In addition, in this application, data transmission may be performed between the transmitting device and the receiving device over a communications network. The communications network may specifically include but is not limited to one or a combination of the following: a 5th generation mobile communications technology (5G) system, a long term evolution (LTE) system, a global system for mobile communications (GSM) or code division multiple access (CDMA) network, a wideband code division multiple access (WCDMA) network, Bluetooth (bluetooth), wireless fidelity (Wi-Fi), the Zigbee protocol (Zigbee), a radio frequency identification (RFID) technology, a long range (Lora) wireless technology, a near field communication technology (NFC), or the like.

It should be noted that during charging, if the receiving device includes an uncontrollable rectifier, a frequency of the uncontrollable rectifier may be adaptively consistent with a frequency of the receiving device. However, when the receiving device includes a controllable rectifier, a frequency of the controllable rectifier cannot be adaptively consistent with a frequency of the transmitting device, and there may be a frequency difference between the receiving device and the transmitting device, causing oscillation of the wireless charging system. Therefore, this application provides a frequency locking method. Before a frequency adjustment is performed, it is determined, through interaction between the transmitting device and the receiving device, that the transmitting device supports a working frequency of the receiving device, to ensure frequency matching between the transmitting device and the receiving device and improve stability of the wireless charging system.

Figure 1B:
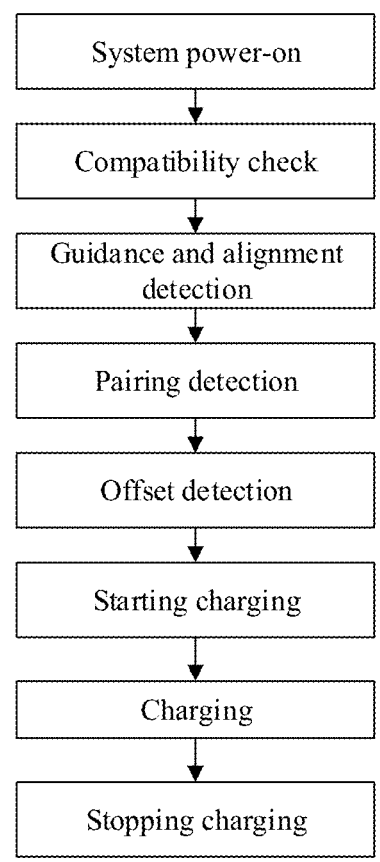
FIG. 1B is a schematic flowchart of charging according to this application.

FIG. 1B shows procedures that may be included in a process of charging the receiving device by using the transmitting device.

Specifically, procedures such as system power-on, compatibility check, guidance and alignment detection, pairing detection, offset detection, starting charging, charging, and stopping charging may be included. System power-on means that the transmitting device prepares for charging the receiving device. Compatibility check means checking whether the transmitting device can charge the receiving device. Guidance and alignment detection, pairing detection, and offset detection mean detecting an degree of alignment of coils of the receiving device and the transmitting device, and guiding alignment of coils of the receiving device and the transmitting device, to prepare for subsequent charging.

In this embodiment, a procedure for determining whether frequency locking is required is added in compatibility check, to improve stability of the wireless charging system.

Figure 2:
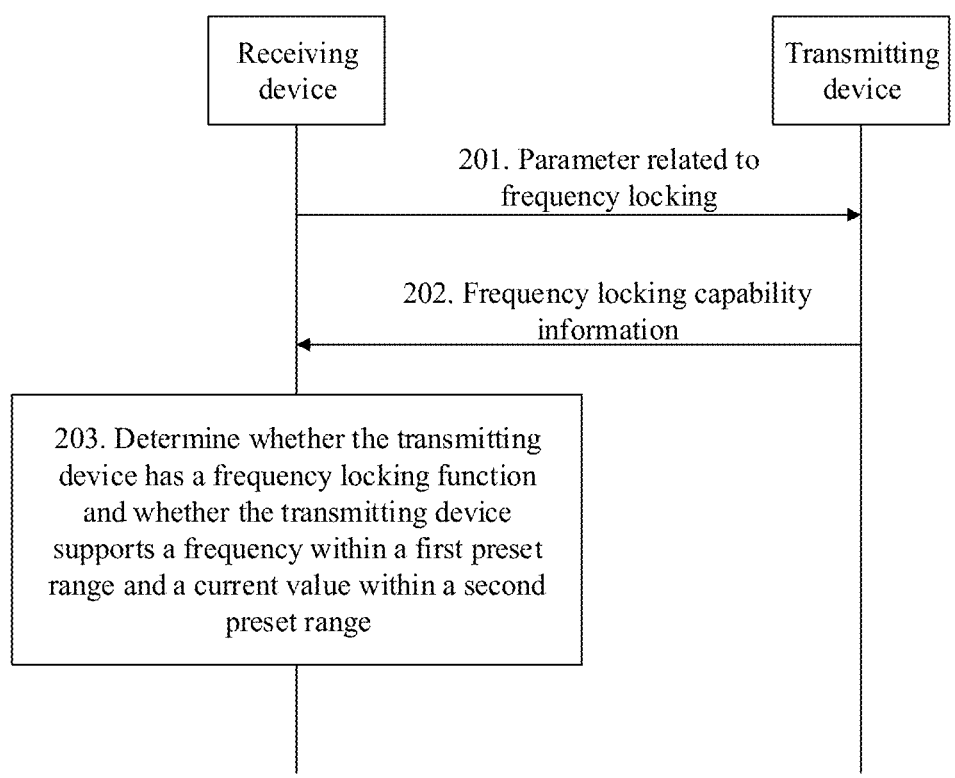
FIG. 2 is a schematic flowchart of a frequency locking method according to this application.

With reference to FIG. 2, the following describes an interaction procedure between a transmitting device and a receiving device in a wireless charging system according to this application.

201. A receiving device transmits a parameter related to frequency locking to a transmitting device.

The parameter related to frequency locking includes information about a first preset range and a second preset range. The first preset range is a working frequency range or a working frequency value of the receiving device. The second preset range is a current value range of an emission current generated by the transmitting device during frequency locking of the receiving device. The parameter related to frequency locking is used to query whether the transmitting device supports generation of an emission current whose frequency is within the first preset range and whose current value is within the second preset range, and also enable the transmitting device to learn a working frequency range of the transmitting device.

For example, if a frequency used by the receiving device for charging is f1 or f1 to f2, the parameter related to frequency locking includes frequency information of f1 or f1 to f2, and is used to query whether the transmitting device supports generation of an emission current whose frequency is f1 or is within a range of f1 to f2 and whose current value is I2. For another example, if the receiving device accurately detects that a current value of a frequency of an input current is 13 A to 15 A, and a default coupling factor between the receiving device and the transmitting device is 0.9, and a calculated current value range is 14.4 A to 16.7 A, that is, the second preset range is 14.4 A to 16.7 A, the parameter related to frequency locking further carries current value information of 14.4 A to 16.7 A, and is used to query whether the transmitting device supports generation of an emission current whose current value is 14.4 A to 16.7 A.

It should be noted that the current value mentioned in this application may be a valid value, an average value, or an instantaneous value of the current, and may be determined based on an actual application scenario. This is not limited in this application.

202. The transmitting device transmits frequency locking capability information to the receiving device.

After receiving the parameter related to frequency locking that is transmitted by the receiving device, the transmitting device returns the frequency locking capability information in response to the parameter related to frequency locking.

After receiving the parameter related to frequency locking, the transmitting device determines whether the transmitting device has a frequency locking function and determines whether the transmitting device supports a frequency within the first preset range and a current value within the second preset range, generates the frequency locking capability information based on a determining result, and transmits the frequency locking capability information to the receiving device. Alternatively, the transmitting device may only determine whether the transmitting device has a frequency locking function, and add, to the frequency locking capability information, a working frequency range and a current value range that are supported by the transmitting device, so that the receiving device obtains, based on the frequency locking capability information, the working frequency range and the current value range that are supported by the transmitting device, and further determines whether the transmitting device can be used for charging or whether frequency locking is required before charging.

For example, the transmitting device receives the parameter related to frequency locking that is transmitted by the receiving device, and determines that a working frequency of the receiving device is 83 kHz to 85.5 kHz. The transmitting device determines that its own working frequency is 85 kHz, that is, the working frequency of the receiving device is supported. In this case, the transmitting device returns the frequency locking capability information in response to the parameter related to frequency locking, and confirms that the transmitting device supports the working frequency of the receiving device. Alternatively, the transmitting device may further directly add its own working frequency 85 kHz to the frequency locking capability information, so that the receiving device learns the working frequency of the transmitting device.

For another example, if the parameter related to frequency locking carries a current value range of 14 A to 16 A, the transmitting device determines whether the transmitting device supports an emission current whose current value is within the range of 14 A to 16 A. If the transmitting device supports the emission current, the frequency locking capability information is further used to indicate that the transmitting device supports the emission current whose current value is within the range of 14 A to 16 A; or if the transmitting device does not support the emission current, the frequency locking capability information is further used to indicate that the transmitting device does not support the emission current whose current value is within the range of 14 A to 16 A. For another example, if the parameter related to frequency locking carries a current value range of 14 A to 16 A, and the transmitting device determines that the supported current value range is 13 A to 15 A, the frequency locking capability information carries range information of 13 A to 15 A, so that the receiving device determines, based on the current value range supported by the transmitting device, whether the transmitting device supports generation of an emission current whose current value is within the second preset range.

203. The receiving device determines whether the transmitting device has the frequency locking function and whether the transmitting device supports the frequency within the first preset range and the current value within the second preset range.

After receiving the frequency locking capability information transmitted by the transmitting device, the receiving device determines whether the transmitting device has the frequency locking function, and when determining that the transmitting device has the frequency locking function, determines whether the transmitting device supports the frequency within the first preset range and the current value within the second preset range.

The receiving device may determine whether the transmitting device can supply charging power to the receiving device, or determine, before being charged, whether frequency locking is required. Specifically, if the transmitting device supports the working frequency of the receiving device, and supports the frequency within the first preset range and the current value within the second preset range, the receiving device determines that the receiving device can be used for charging; or before the receiving device uses the transmitting device for charging, the receiving device may perform frequency locking through an interaction operation with the transmitting device.

In this embodiment, the receiving device may determine, by interacting with the transmitting device, whether the transmitting device can supply charging power to the receiving device, or determine, before being charged, whether frequency locking is required. Therefore, the receiving device may adjust, before being charged, a frequency of a rectifier to be consistent with the working frequency of the transmitting device, to avoid oscillation of a system. When the transmitting device does not support frequency locking, or the transmitting device does not support any frequency within the first preset range or any current value within the second preset range, the receiving device may select an available transmitting device in time for charging, to improve user experience.

In an embodiment, the parameter related to frequency locking in the foregoing operation 201 may be transmitted actively by the receiving device to the transmitting device.

In a scenario, the receiving device may obtain input data based on an operation of a user, and transmit the parameter related to frequency locking to the transmitting device based on the input data. For example, when the user drives an electric vehicle to a vicinity of a charging station, the user may select the charging station on a central control screen of the electric vehicle, and determine whether the charging station can provide charging. The electric vehicle may transmit a parameter related to frequency locking to the charging station based on the operation of the user, where the parameter related to frequency locking includes a working frequency for charging the electric vehicle and is used to query whether the charging station supports the working frequency for charging the electric vehicle.

In another scenario, the receiving device may obtain information about one or more transmitting devices, and actively transmit the parameter related to frequency locking to the transmitting device. For example, when the electric vehicle detects that a capacity of a battery group is lower than a threshold, the receiving device searches for a charging station within a preset range based on an offline map or an online map, transmits the parameter related to frequency locking to one or more charging stations within the preset range, and determines which of the one or more charging stations can provide charging for the electric vehicle.

Figure 3:
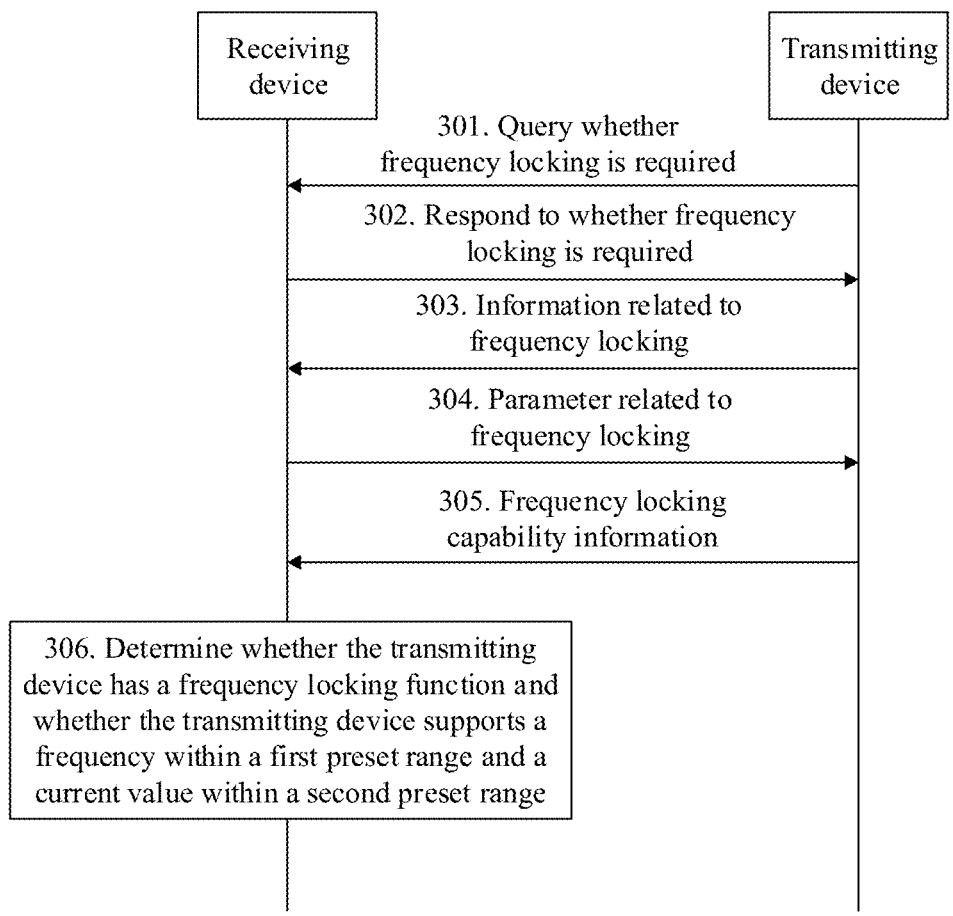
FIG. 3 is a schematic flowchart of another frequency locking method according to this application.

In another possible implementation, the parameter related to frequency locking may be transmitted to the transmitting device on request of the transmitting device. With reference to FIG. 3, the following describes a scenario in which a transmitting device initiates a frequency locking query.

301. A transmitting device queries whether a receiving device requires frequency locking.

The transmitting device may transmit a first query message to the receiving device, where the first query message is used to query whether the receiving device requires frequency locking.

For example, when a user drives an electric vehicle to a charging station, the charging station detects, by using a camera, a sensor, or the like, that the electric vehicle is entering the charging station. In this case, the charging station may transmit a first query message to the electric vehicle, to query whether the electric vehicle requires frequency locking.

302. The receiving device responds to the transmitting device whether frequency locking is required.

After receiving the first query message transmitted by the transmitting device, the receiving device determines whether frequency locking is required, and transmits a first response message to the transmitting device, to respond whether frequency locking is required.

Usually, when the receiving device includes a controllable rectifier, the receiving device requires frequency locking, that is, a frequency of the controllable rectifier needs to be adjusted, so that a working frequency of the receiving device keeps consistent with that of the transmitting device.

303. The transmitting device requests the receiving device for information related to frequency locking.

After receiving the first response message transmitted by the receiving device, the transmitting device determines, based on the first response message, whether the receiving device requires frequency locking. When determining that the receiving device requires frequency locking, the transmitting device transmits a second query message to the receiving device, to request the information related to frequency locking.

304. The receiving device transmits a parameter related to frequency locking to the transmitting device.

After receiving the second query message transmitted by the transmitting device, the receiving device obtains the parameter related to frequency locking of the receiving device, including a first preset range of a working frequency and a second preset range of an emission current within which a frequency of an input current can be accurately detected.

Specifically, for operation 304, refer to the foregoing operation 201. Details are not described again herein.

305. The transmitting device transmits frequency locking capability information to the receiving device.

306. The receiving device determines whether the transmitting device has a frequency locking function and whether the transmitting device supports a frequency within the first preset range and a current value within the second preset range.

It should be noted that for operations 305 and 306 in this embodiment, reference may be made to the foregoing operations 202 and 203. Details are not described again herein.

For example, when the user drives the electric vehicle to a charging station, the charging station monitors, by using a camera, a sensor, or the like, that the electric vehicle is entering the charging station. The electric vehicle and a charging management server or a ground transmit end of the charging station perform compatibility check, for example, compatibility check such as checking a device ID, a manufacturer ID, and a control mode. Compatibility check further includes checking whether frequency locking is required. Therefore, the charging station may transmit a first query message to the electric vehicle, to query whether the electric vehicle requires frequency locking. When the electric vehicle responds to the charging station that frequency locking is required, the charging station transmits a second query message to the electric vehicle, querying the electric vehicle for information related to frequency locking. After receiving the second query message, the electric vehicle returns a parameter related to frequency locking, including a working frequency of the electric vehicle and a current value range that the charging station needs to support. For example, if the working frequency of the electric vehicle is 85 kHz, when an input current Irec of a rectifier of the electric vehicle is 13 A, frequency locking detection can be implemented. Therefore, the electric vehicle queries whether the charging station can provide an 85 kHz emission current, where a current value of the emission current is Ip=15 A. The charging station responds to the electric vehicle whether an 85 kHz and 15 A emission current can be provided.

Therefore, in this embodiment, the transmitting device may initiate a query to the receiving device to query whether frequency locking is required. The receiving device may determine, by interacting with the transmitting device, whether the transmitting device can supply charging power to the receiving device, or determine, before being charged, whether frequency locking is required. Therefore, the receiving device may adjust, before being charged, the frequency of the rectifier to be consistent with the working frequency of the transmitting device, to avoid oscillation of a system. When the transmitting device does not support frequency locking, or the transmitting device does not support any frequency within the first preset range or any current value within the second preset range, the receiving device may select an available transmitting device in time for charging, to improve user experience.

After operation 203 or 305, the receiving device performs operations such as guidance and alignment detection, pairing detection, offset detection, and coupling factor detection. Before the receiving device is charged, frequency locking needs to be performed. Specifically, for a frequency locking procedure in this application, refer to related descriptions in the following operations 404 to 410, 501 to 511, or 601 to 611. Details are not described herein.

In addition, this application further provides a frequency locking method. With reference to the foregoing FIG. 1A to FIG. 3, the following describes in detail a frequency locking method provided by this application.

Figure 4:
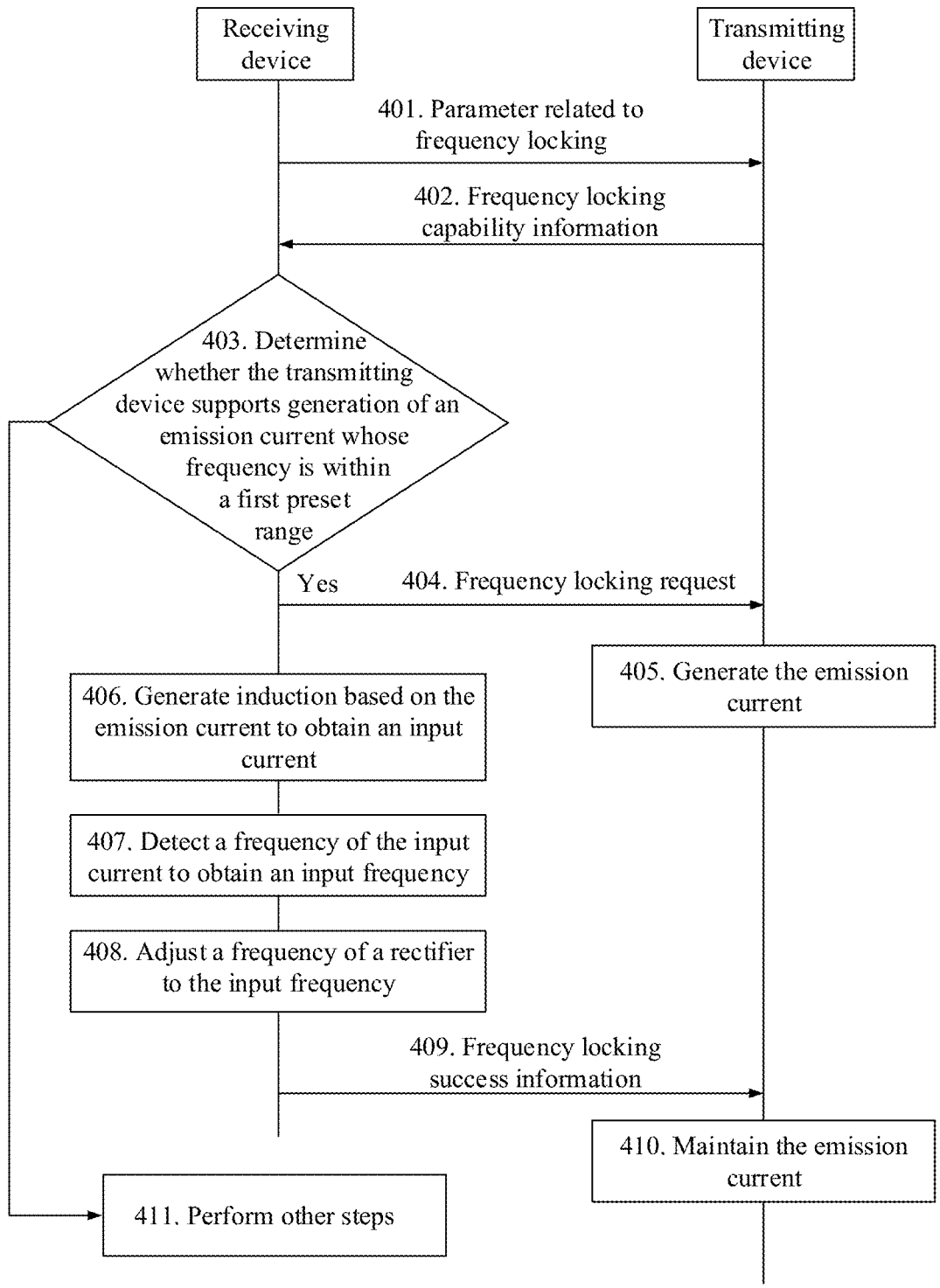
FIG. 4 is a schematic flowchart of another frequency locking method according to this application.

Refer to FIG. 4. The following describes a schematic flowchart of a frequency locking method provided by this application.

401. A receiving device transmits a parameter related to frequency locking to a transmitting device.

For the parameter related to frequency locking, refer to related descriptions in the foregoing operation 201. A difference lies in that the parameter related to frequency locking in this embodiment may include information about a first preset range only, or may include information about both a first preset range and a second preset range.

In addition, the parameter related to frequency locking may be actively transmitted by the receiving device to the transmitting device, or the parameter related to frequency locking may be transmitted in response to a query of the transmitting device. For details, refer to the foregoing FIG. 3. Details are not described again herein.

402. The transmitting device transmits frequency locking capability information to the receiving device.

For operation 402, refer to the foregoing operation 202. Details are not described again herein. A difference lies in that when the parameter related to frequency locking includes only the information about the first preset range, the frequency locking capability information may include only information about whether the transmitting device supports a frequency within the first preset range.

403. The receiving device determines whether the transmitting device supports generation of an emission current whose frequency is within the first preset range, and if yes, performs operation 404, or else, performs operation 411.

After the receiving device receives the frequency locking capability information returned by the transmitting device, the receiving device determines, based on the frequency locking capability information, whether the transmitting device supports generation of the emission current whose frequency is within the first preset range, and if yes, performs operation 404, or else, performs operation 411.

For example, the frequency locking capability information may carry an indication about whether the transmitting device supports a working frequency within the first preset range, and the receiving device may directly determine, based on the indication, whether the transmitting device supports generation of the emission current whose frequency is within the first preset range. For another example, the frequency locking capability information may carry information about a working frequency range of the transmitting device, and the receiving device may match the working frequency range of the transmitting device with the first preset range and determine whether the transmitting device supports generation of the information whose frequency is within the first preset range.

In an embodiment, if the frequency locking capability information further indicates whether the transmitting device supports generation of an emission current whose current value is within the second preset range, when the receiving device determines that the transmitting device supports generation of an emission current whose frequency is within the first preset range and whose current value is within the second preset range, the receiving device performs operation 404.

In an embodiment, if the receiving device determines that the transmitting device supports an emission current whose frequency is within the first preset range but does not support an emission current whose current value is within the second preset range, the receiving device may generate second prompt information and output the second prompt information. For example, the second prompt information is output by using a device such as a display screen or an indicator. The second prompt information is used to prompt that the transmitting device does not support an emission current whose current is beyond the second preset range. Then the receiving device receives input data of a user, and determines, based on the input data, whether to perform operation 404. For example, when a frequency of a charging station matches a frequency of a new energy vehicle, but the charging station does not support a current whose frequency can be accurately detected by the new energy vehicle, the new energy vehicle may output second prompt information on a display screen, so that a user selects whether to use the charging station for charging; and the new energy vehicle determines, based on the user's selection, whether to perform operation 404.

404. The receiving device transmits a frequency locking request to the transmitting device.

When the receiving device determines, based on the first returned information, that the transmitting device supports generation of the emission current whose frequency is within the first preset range, the receiving device transmits the frequency locking request to the transmitting device, where the frequency locking request is used to request the transmitting device to generate the emission current. Therefore, the receiving device can perform a subsequent operation such as a frequency adjustment only when its frequency matches that of the transmitting device, to ensure that the receiving device works at the frequency matching that of the transmitting device. In particular, when the receiving device and the transmitting device are from different manufacturers, confirming frequency matching between the receiving device and the transmitting device before the frequency adjustment can ensure stability of a wireless charging system, and can further enable the user to learn in time whether the transmitting device can charge the receiving device. This improves user experience.

In an embodiment, before operation 404, the receiving device further short-circuits an input terminal of a rectifier of the receiving device. This avoids oscillation caused by frequency inconsistency between the receiving device and the transmitting device. Specifically, in this embodiment, the rectifier of the receiving device includes one or more switching transistors, and turn-on of the switching transistor may be controlled, so that the input terminal of the rectifier is in a short-circuited state. For example, the input terminal of the rectifier is connected to an output terminal of a receiving module, and the rectifier includes four switching transistors that constitute four bridge arms, where two switches are turned on, so that the input terminal of the rectifier is short-circuited.

It should be noted that before operation 404, the receiving device may further perform guidance and alignment detection, pairing detection, offset detection, or the like, so that the receiving module of the receiving device can be successfully coupled to a transmitting module of the transmitting device. For details, refer to specifications related to wireless charging. This is not limited in this application. For example, after the user drives the electric vehicle to the charging station and determines, by performing the foregoing operations 401 to 403, that the charging station can provide charging for the electric vehicle, the user drives the electric vehicle close to the charging station and aligns a receiving module of the electric vehicle with a transmitting module of the charging station, so that the receiving module is coupled to the transmitting module. After it is determined that the receiving module is successfully coupled to the transmitting module, operation 404 is performed.

405. The transmitting device generates the emission current.

After the transmitting device receives the frequency locking request transmitted by the receiving device, the transmitting device generates the emission current based on the frequency locking request, where the frequency of the emission current is within the first preset range.

In an embodiment, when the receiving device transmits the frequency locking request or after the receiving device transmits the frequency locking request, the receiving device further transmits an initial current indication value to the transmitting device. After the transmitting device receives the initial current indication value, the transmitting device may generate an emission current whose frequency is within the first preset range and whose current value is the initial current indication value.

In an embodiment, after the transmitting device receives the frequency locking request and generates the emission current, the transmitting device further transmits a frequency locking start response message to the receiving device, where the frequency locking start response message carries the current value of the emission current, so that the receiving device obtains the current value of the emission current based on the frequency locking start response message and that the emission current can be subsequently further adjusted based on the current value of the emission current.

406. The receiving device generates induction based on the emission current to obtain an input current.

After the transmitting device generates the emission current, the receiving device may generate induction based on the emission current to obtain the input current.

Specifically, the receiving device includes a receiving coil, and the transmitting device includes a transmitting coil. When an emission current exists on the transmitting coil, the receiving coil of the receiving device may generate induction to obtain an input current, where a frequency of the input current is consistent with a frequency of the emission current.

407. The receiving device detects a frequency of the input current to obtain an input frequency.

The receiving device may generate induction based on the emission current on the transmitting coil by using the receiving coil, to obtain the input current; and after obtaining the input current through induction, detect the frequency of the input current to obtain the input frequency.

Specifically, the input current is a sine wave, a signal synchronous with the sine wave may be detected, and the frequency of the input current is detected by using the synchronous signal so that the input frequency is obtained. For example, after the receiving coil obtains an input current through induction in an alternating magnetic field generated by the transmitting coil, a waveform of the input current is a sine wave, a zero crossing point of the sine wave may be detected by using a zero crossing detection circuit so that a signal synchronous with the sine wave is obtained, and a frequency of the synchronous signal is detected so that an input frequency corresponding to the input current is obtained.

In an embodiment, to improve accuracy of the detected input frequency, before the receiving device detects the frequency of the input current, the receiving device further detects a current value of the input current. The receiving device detects the frequency of the input current only when the current value of the input current is within a third preset range. If the current value of the input current is beyond the third preset range, the receiving device may transmit at least one piece of indication information to the transmitting device, where the at least one piece of indication information is used to indicate the transmitting device to adjust the emission value of the emission current to change the current value of the input current. Specifically, for an operation of adjusting the current value of the emission current, refer to descriptions in the following operations 504 to 507 in FIG. 5. Details are not described herein. In this embodiment, the current value of the input current may be adjusted by adjusting the current value of the emission current, so that the current value of the input current is within a range within which the receiving device can accurately detect the frequency and that accuracy of the input frequency detected by the receiving device is improved.

408. The receiving device adjusts a frequency of the rectifier to the input frequency.

After the receiving device detects the input frequency corresponding to the input current, the receiving device adjusts the frequency of the rectifier to the input frequency.

Specifically, a controller of the receiving device may generate an adjustment signal, and transmit the adjustment signal to the rectifier. A frequency of the adjustment signal is the same as the input frequency, and the adjustment signal is used to control a frequency of turn-on and turn-off of the switching transistor of the rectifier, so that the frequency of the rectifier is controlled. For example, if a frequency generated by the transmitting device is 85.6 kHz, the receiving device may generate an adjustment signal, where a frequency of the adjustment signal is also 85.6 kHz, and the adjustment signal is used to control turn-on or turn-off of the switching transistor of the rectifier, so that the frequency of the rectifier is also adjusted to 85.6 kHz.

In addition, when the rectifier is in the short-circuited state, after the receiving device generates the adjustment signal and before the adjustment signal is transmitted to the rectifier, a part of controllable switching transistors are in an ON state. In this case, the part of switching transistors may be kept in the ON state, that is, the rectifier is kept in the short-circuited state. After the short-circuited state of the rectifier is terminated, that is, before the transmitting device is used for charging, the adjustment signal is transmitted to the rectifier, so that the frequency of the rectifier keeps consistent with the frequency of the adjustment signal. This avoids charging of the receiving device before the frequency of the wireless charging system is stabilized.

In an embodiment, after the receiving device adjusts the frequency of the rectifier to the input frequency, the receiving device may further transmit frequency locking success information to the transmitting device, where the frequency locking success information is used to notify the transmitting device that the working frequency of the receiving device already keeps consistent with the frequency of the transmitting device. Therefore, the transmitting device learns that the frequency of the receiving device keeps consistent with that of the transmitting device, and can perform a subsequent related operation, for example, supply charging power to the receiving device.

In an embodiment, when the frequency of the rectifier is adjusted to the input frequency, not only the frequency of the rectifier is adjusted to the input frequency, but also a phase of the rectifier is adjusted. Usually, to enable the switching transistor of the rectifier to implement soft switching, preset phases need to be maintained for an input voltage and an input current of the rectifier. For example, turn-on and turn-off delays of the switching transistor of the rectifier may be adjusted, so that a phase lag is maintained for the input voltage of the rectifier and that a phase difference is generated between the input voltage and the input current.

409. The receiving device transmits the frequency locking success information to the transmitting device.

After the receiving device adjusts the frequency of the rectifier to the input frequency, the receiving device transmits the frequency locking success information to the transmitting device. After the transmitting device receives the frequency locking success message, the transmitting device ends a frequency locking procedure, and maintains the current frequency of the emission current or the frequency and current value of the emission current.

410. The transmitting device maintains the emission current.

After the transmitting device receives the frequency locking success information transmitted by the receiving device, the transmitting device ends the frequency locking procedure, and maintains the current frequency of the emission current or the frequency and current value of the emission current.

In an embodiment, after the transmitting device receives the frequency locking success information, the transmitting device further returns a frequency locking end response message in response to the frequency locking success information, where the frequency locking end response message may carry the frequency and current value of the emission current maintained by the transmitting device. The receiving device may determine, based on the frequency locking end response message, the frequency and current value of the emission current maintained by the transmitting device, and further determine whether the frequency of the receiving device is consistent with the frequency of the transmitting device.

It should be noted that operation 410 in this embodiment of this application is an optional operation. In one case, after the transmitting device generates the emission current, if no information transmitted by the receiving device is received, the transmitting device may continue to maintain the emission current, and the receiving device does not need to transmit the frequency locking success information.

In an embodiment, after the receiving device adjusts the frequency of the rectifier to the input frequency, the receiving device may further transmit a charging request to the transmitting device, where the charging request is used to indicate the transmitting device to supply charging power to the receiving device.

In an embodiment, after the transmitting device receives the charging request, the transmitting device generates an emission current whose current value is a default value, to supply power to the receiving device.

Optionally, if the rectifier is short-circuited before the receiving device transmits the charging request to the transmitting device, short-circuiting of the rectifier is terminated before the receiving device is charged, so that the receiving device can be charged normally.

411. The receiving device performs other operations.

After the receiving device determines that the transmitting device does not support the working frequency of the receiving device, the receiving device may perform other operations, for example, remind the user to replace the transmitting device or search for an available transmitting device.

In an embodiment, if the transmitting device does not support generation of the emission current whose frequency is within the first preset range, the receiving device may generate first prompt information. The first prompt information is used to indicate that the frequency of the transmitting device does not match the frequency of the receiving device, to remind the user to replace the transmitting device in time for charging. Therefore, when the frequency of the transmitting device does not match the working frequency of the receiving device, the user can be reminded in time to replace the transmitting device with an available transmitting device. This avoids procedures such as guidance and alignment detection and pairing detection added because the user is unable to learn the frequency of the transmitting device, avoids waste of time of the user, and improves user experience.

For example, charging frequencies of charging stations manufactured by different manufacturers may be different. When the user drives the new energy vehicle to the charging station, the new energy vehicle may transmit a parameter related to frequency locking to the charging station, to query whether the charging station supports a charging frequency of the new energy vehicle. If the charging station supports the charging frequency of the new energy vehicle, the user can drive the new energy vehicle to the charging station, align the transmitting module with the receiving module, and perform a subsequent frequency adjustment and charging. If the charging station does not support the charging frequency of the new energy vehicle, the charging station cannot charge the new energy vehicle driven by the user, the user may reselect a charging station, and there is no need to align the transmitting module with the receiving module and then determine that charging cannot be performed. This saves time spent by the user on meaningless operations, enables the user to select an available charging station in time, and improves user experience.

Therefore, in this embodiment, before being charged, the receiving device interacts with the transmitting device to determine whether the transmitting device supports the working frequency of the receiving device; and the receiving device adjusts the working frequency of the receiving device to be consistent with that of the transmitting device only when the transmitting device supports the working frequency of the receiving device. This can avoid oscillation of the wireless charging system caused by a frequency difference between working frequencies of the receiving device and the transmitting device, ensure stable charging of the receiving device, and improve stability of the wireless charging system. When the transmitting device does not support the working frequency of the receiving device, there is no need to perform subsequent operations of a frequency adjustment and charging. Therefore, oscillation of the wireless charging system caused by a frequency difference between the working frequencies of the receiving device and the transmitting device can be avoided. In addition, the user can replace the transmitting device in time and avoid subsequent meaningless operation procedures. This improves user experience.

With reference to the foregoing FIG. 1A to FIG. 4, the following describes a frequency locking method provided by this application.

Figure 5:
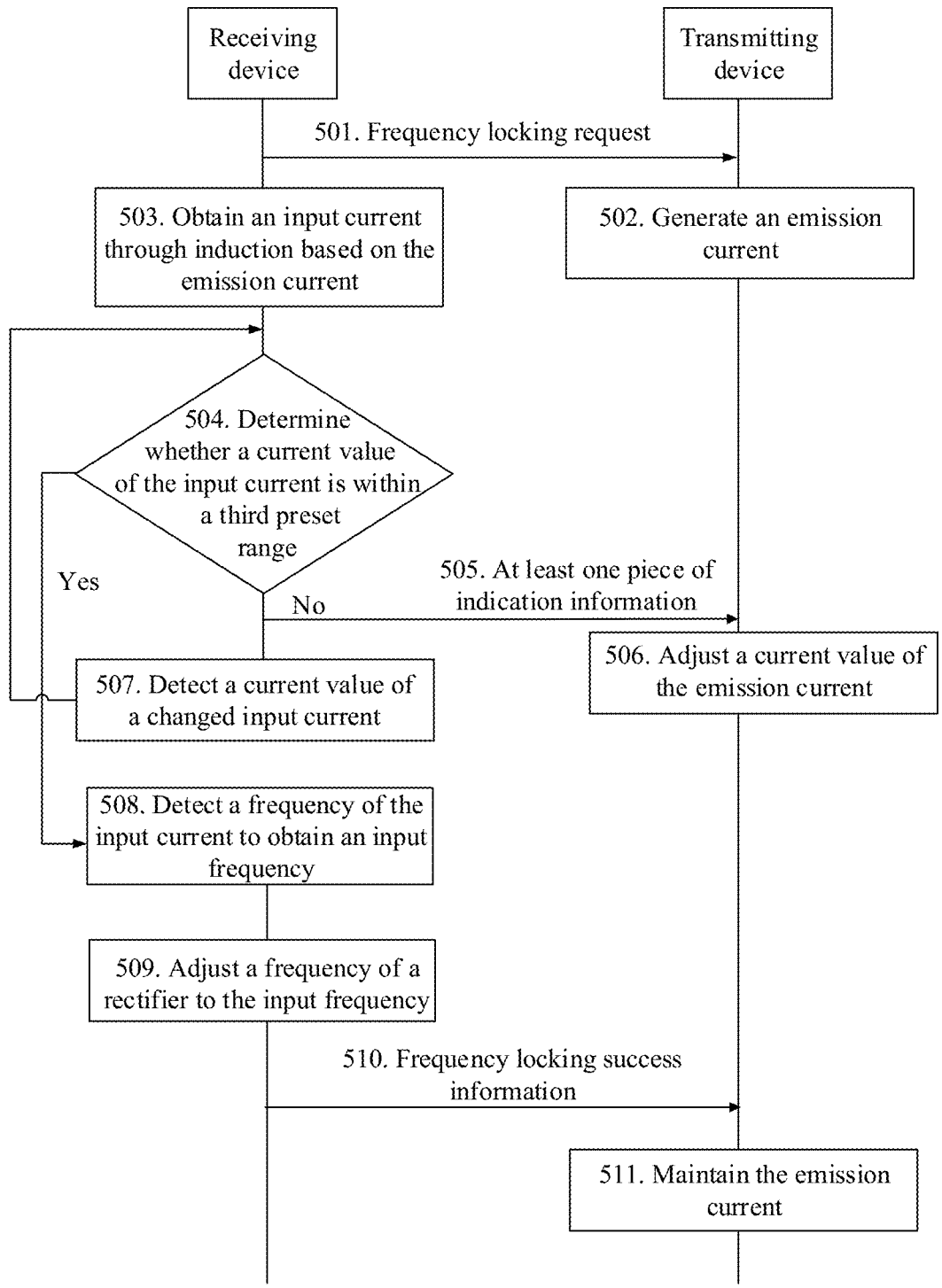
FIG. 5 is a schematic flowchart of another frequency locking method according to this application.

Refer to FIG. 5. The following describes a schematic flowchart of a frequency locking method provided by this application.

501. A receiving device transmits a frequency locking request to a transmitting device.

502. The transmitting device generates an emission current.

503. The receiving device obtains an input current through induction based on the emission current.

Operations 501 to 503 are similar to the foregoing operations 404 to 406. Details are not described again herein.

In addition, before operation 501, the receiving device may transmit a parameter related to frequency locking to the transmitting device. For details, refer to related descriptions in the foregoing operations 401 to 403. Details are not described again herein.

It should also be noted that the receiving device may alternatively obtain the input current through continuous induction based on the emission current, that is, may obtain the input current through continuous induction based on the emission current in the following operations 504 to 511. This is not described again subsequently.

504. The receiving device determines whether a current value of the input current is within a third preset range, and if no, performs operation 505, or if yes, performs operation 508.

After the receiving device detects the current value of the input current, the receiving device determines whether the current value of the input current is within the third preset range, and if yes, performs operation 508, or if no, performs operation 505.

505. The receiving device transmits at least one piece of indication information to the transmitting device.

After the receiving device determines that the current value of the input current is beyond the third preset range, the receiving device may transmit the at least one piece of indication information to the transmitting device, where the at least one piece of indication information is used to indicate the transmitting device to adjust a current value of the emission current.

Specifically, any one of the at least one piece of indication information may include a current indication value or an adjustment value or the like. When a piece of indication information includes a current indication value, the indication information may be used to indicate that the transmitting device is to adjust the current value of the emission current to the current indication value. When a piece of indication information includes an adjustment value, the indication information is used to indicate that the transmitting device is to increase or decrease the current value of the transmitting device by the adjustment value. Correspondingly, the indication information may further include an increase indication or a decrease indication, used to indicate that an operation corresponding to the adjustment value is increase or decrease.

In an embodiment, after the receiving device detects the current value of the input current, the receiving device may calculate a coupling factor between the receiving device and the transmitting device by using a preset formula, to calculate the current value of the emission current based on the coupling factor when the current value of the input current is within the third preset range; and determine the current indication value or the adjustment value, and transmit the current indication value or the adjustment value to the transmitting device. For example, the preset formula may be $$k = \frac{Irec}{Ip}\sqrt{\frac{Ls}{Lp}},$$

where Irec is the input current, Ip is the emission current, Lp is self-inductance of a transmitting coil, and Ls is self-inductance of a receiving coil. Therefore, after k is calculated, k and a value within the third preset range are substituted into the preset formula, and a range of the emission current can be calculated.

506. The transmitting device adjusts the current value of the emission current.

After the transmitting device receives the at least one piece of indication information, the transmitting device adjusts the current value of the emission current based on the at least one piece of indication information to the change the current value of the input current.

Usually, due to a distance, an offset, or the like, the current value of the input current of the receiving device may be caused to be different from the current value of the emission current of the transmitting device, and the current value of the input current may be less than the current value of the transmitting device. However, when the current value of the input current is beyond the third preset range, accuracy of a frequency of the input current detected by the receiving device is also lower. Therefore, the current value of the emission current needs to be adjusted, so that the current value of the input current is changed and that the current value of the input current is within the third preset range. In this way, accuracy of the frequency of the input current detected by the receiving device is improved. For example, if the current value of the input current detected by the receiving device is lower than the third preset range, the receiving device may transmit the at least one piece of indication information to the transmitting device to gradually increase the current value of the emission current and further increase the current value of the input current, so that the current value of the input current is increased to fall within the third preset range.

In an embodiment, after the transmitting device receives each piece of indication information and adjusts the emission current, the transmitting device may return a response message in response to the received indication information, where the response message may carry a current value of the emission current adjusted by the transmitting device, to notify the receiving device of the adjusted current value. If a current value of an input current changed by the adjusted emission current is still beyond the third preset range, the receiving device may generate a next piece of indication information based on the current value of the emission current carried in the response message, so that the current value of the emission current is adjusted again.

507. The receiving device detects the current value of the changed input current.

After the transmitting device adjusts the current value of the emission current, the receiving device detects the current value of the changed input current. In addition, after detecting the changed input current, the receiving device may continue to determine whether the current value of the input current is within the third preset range, that is, perform operation 504, until the current value of the input current is within the third preset range, and then perform operation 508.

For an implementation of operation 507, refer to the foregoing operation 403. Details are not described again herein.

508. The receiving device detects the frequency of the input current to obtain an input frequency.

After the receiving device determines that the current value of the input current or the current value of the changed input current is within the third preset range, the receiving device detects the frequency of the input current to obtain the input frequency.

509. The receiving device adjusts a frequency of a rectifier to the input frequency.

After the receiving device detects the input frequency of the input current, the frequency of the rectifier is also adjusted to the input frequency, so that a working frequency of the receiving device keeps consistent with a frequency of the transmitting device.

510. The receiving device transmits frequency locking success information to the transmitting device.

511. The transmitting device maintains the emission current.

For operations 510 and 511, refer to the foregoing operations 409 and 410. Details are not described again herein.

In this embodiment, before the receiving device adjusts the frequency of the rectifier, the current value of the input current is changed by adjusting the current value of the emission current, so that the current value of the input current is within the third preset range, that is, the current value of the input current is within the third preset range within which the receiving device can accurately detect the frequency. Therefore, the receiving device can accurately detect the frequency of the input current, and adjust the frequency of the rectifier of the receiving device more accurately. This can avoid oscillation of a wireless charging system caused by a frequency difference between working frequencies of the receiving device and the transmitting device, ensure stable charging of the receiving device, and improve stability of the wireless charging system.

The foregoing describes operations performed by the transmitting device and the receiving device in the wireless charging system provided by this application. The following illustrates operations performed by a transmitting device and a receiving device in a scenario.

Figure 6:
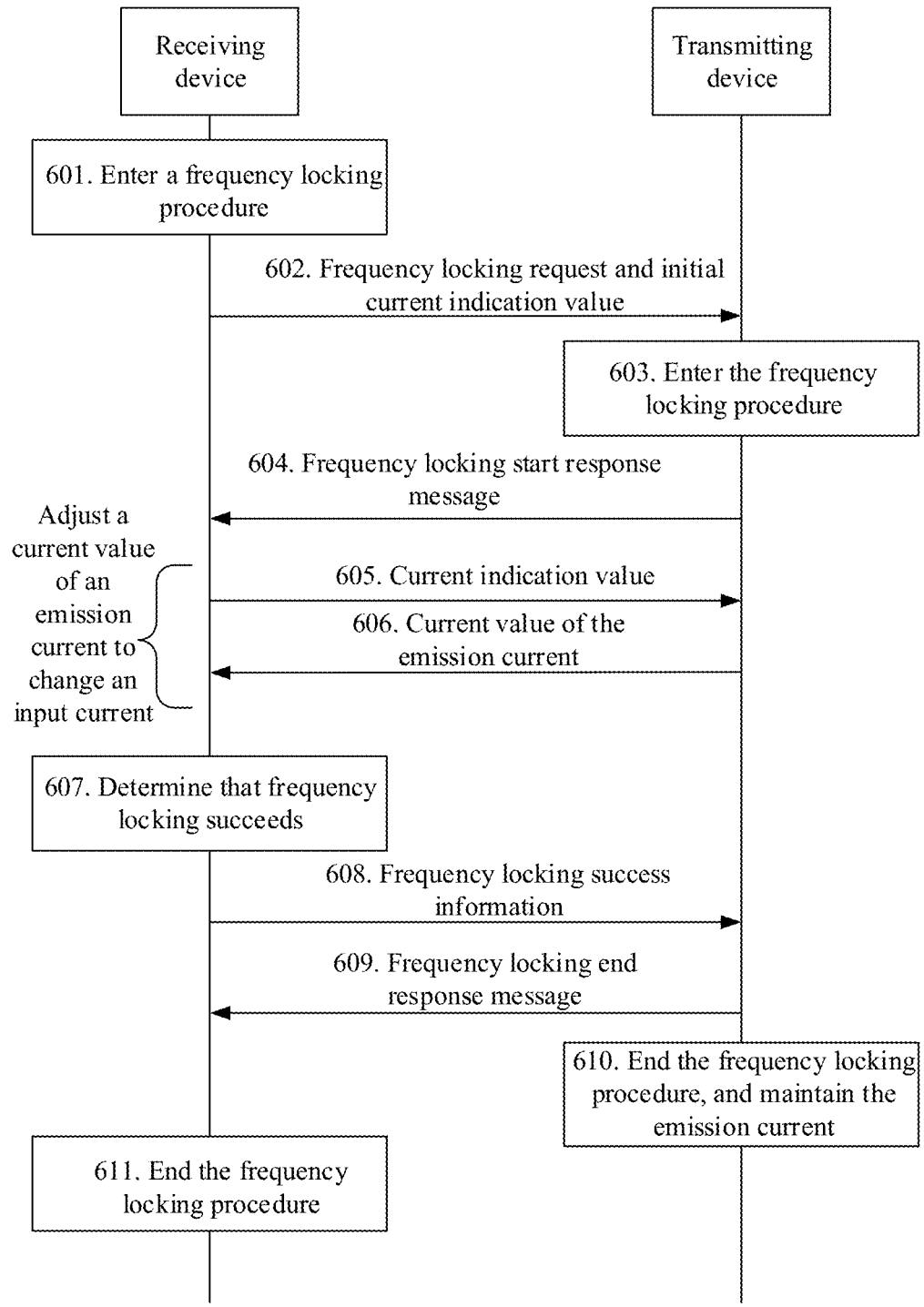
FIG. 6 is a schematic flowchart of another frequency locking method according to this application.

Refer to FIG. 6. A frequency locking procedure in a wireless charging system provided by an embodiment of this application includes the following operations. It should be noted that for operations 601 to 611 in this embodiment, reference may be made to the foregoing operations 404 to 410 or 501 to 511. In this embodiment, a complete frequency locking procedure is described only by using a scenario. Details are not described herein.

601. A receiving device enters a frequency locking procedure.

Operation 601 is performed after the receiving device performs an operation such as guidance and alignment detection, pairing detection, offset detection, or coupling factor detection after the foregoing operation 203 or 306.

It may be understood that the receiving device enters a procedure for adjusting a working frequency thereof to be consistent with that of a transmitting device.

602. The receiving device transmits a frequency locking request and an initial current indication value to the transmitting device.

After the receiving device enters the frequency locking procedure, the receiving device transmits the frequency locking request and the initial current indication value to the transmitting device. The frequency locking request is used to request the transmitting device to generate an emission current, where a current value of the emission current is the initial current indication value.

Certainly, the receiving device may alternatively not transmit the initial current indication value to the transmitting device, and the transmitting device generates an emission current based on a second preset range carried in a parameter related to frequency locking or based on a default current value.

603. The transmitting device enters the frequency locking procedure.

After the transmitting device receives the frequency locking request transmitted by the receiving device, the transmitting device may enter the frequency locking procedure, and generate an emission current whose frequency is within a first preset range, where a current value of the emission current may be the initial current indication value.

604. The transmitting device transmits a frequency locking start response message to the receiving device.

The transmitting device transmits the frequency locking start response message to the receiving device in response to the frequency locking request.

The frequency locking start response message may be used to notify the receiving device that the transmitting device has entered the frequency locking procedure. The frequency locking start response message may further carry the current value of the emission current, so that the receiving device learns the current value of the emission current based on the frequency locking start response message and performs a subsequent adjustment.

605. The receiving device transmits a current indication value to the transmitting device.

The receiving device may perform electromagnetic induction on the emission current generated by the transmitting device, to obtain an input current. When a current value of the input current is beyond a third preset range, that is, when the current value of the input current is beyond a range within which the receiving device can accurately detect an input frequency, the receiving device may transmit the current indication value to the transmitting device, so that the current value of the emission current is adjusted and that the current value of the input current is changed.

606. The transmitting device transmits the current value of the emission current to the receiving device.

After the transmitting device receives the current indication value transmitted by the receiving device, the transmitting device adjusts the current value of the emission current to the current indication value, and transmits the actual current value of the emission current to the receiving device. Therefore, the receiving device determines an adjustment amplitude of the input current based on the actual current value of the emission current. In this way, the emission current is adjusted more accurately.

607. The receiving device determines that frequency locking succeeds.

Operations 605 and 606 may be performed repeatedly to change the input current by adjusting the current value of the emission current, until the current value of the input current is within the third preset range. Then the receiving device may determine that frequency locking succeeds.

608. The receiving device transmits frequency locking success information to the transmitting device.

After the receiving device determines that frequency locking succeeds, the receiving device transmits the frequency locking success information to the transmitting device, where the frequency locking success information is used to notify the transmitting device that frequency locking has succeeded.

609. The transmitting device ends the frequency locking procedure, and maintains the emission current.

After the transmitting device receives the frequency locking success information transmitted by the receiving device, the transmitting device maintains the current value and frequency of the emission current.

610. The transmitting device transmits a frequency locking end response message to the receiving device.

After the transmitting device receives the frequency locking success information and maintains the emission current, the transmitting device transmits the frequency locking end response message to the receiving device. The frequency locking end response message may include the current value and frequency of the emission current maintained by the transmitting device.

611. The receiving device ends the frequency locking procedure.

After the receiving device receives the frequency locking end response message, the receiving device may monitor, in a period of time, whether the input current is normal. If a case of an excessively great change of the current value or a frequency change of the input current or the like does not occur, the receiving device ends the frequency locking procedure.

After the receiving device ends the frequency locking procedure, the receiving device is charged by the transmitting device.

Therefore, in this embodiment, the current value of the input current may be changed by adjusting the current value of the emission current. In this way, the current value of the input current is adjusted to be within the range within which the receiving device can accurately detect the input frequency, and accuracy of the input frequency detected by the receiving device is improved.

The foregoing describes the procedure of one frequency locking method provided by this application. With reference to the frequency locking method described above, the following describes in detail a procedure of another frequency locking method provided by this application.

Figure 7:
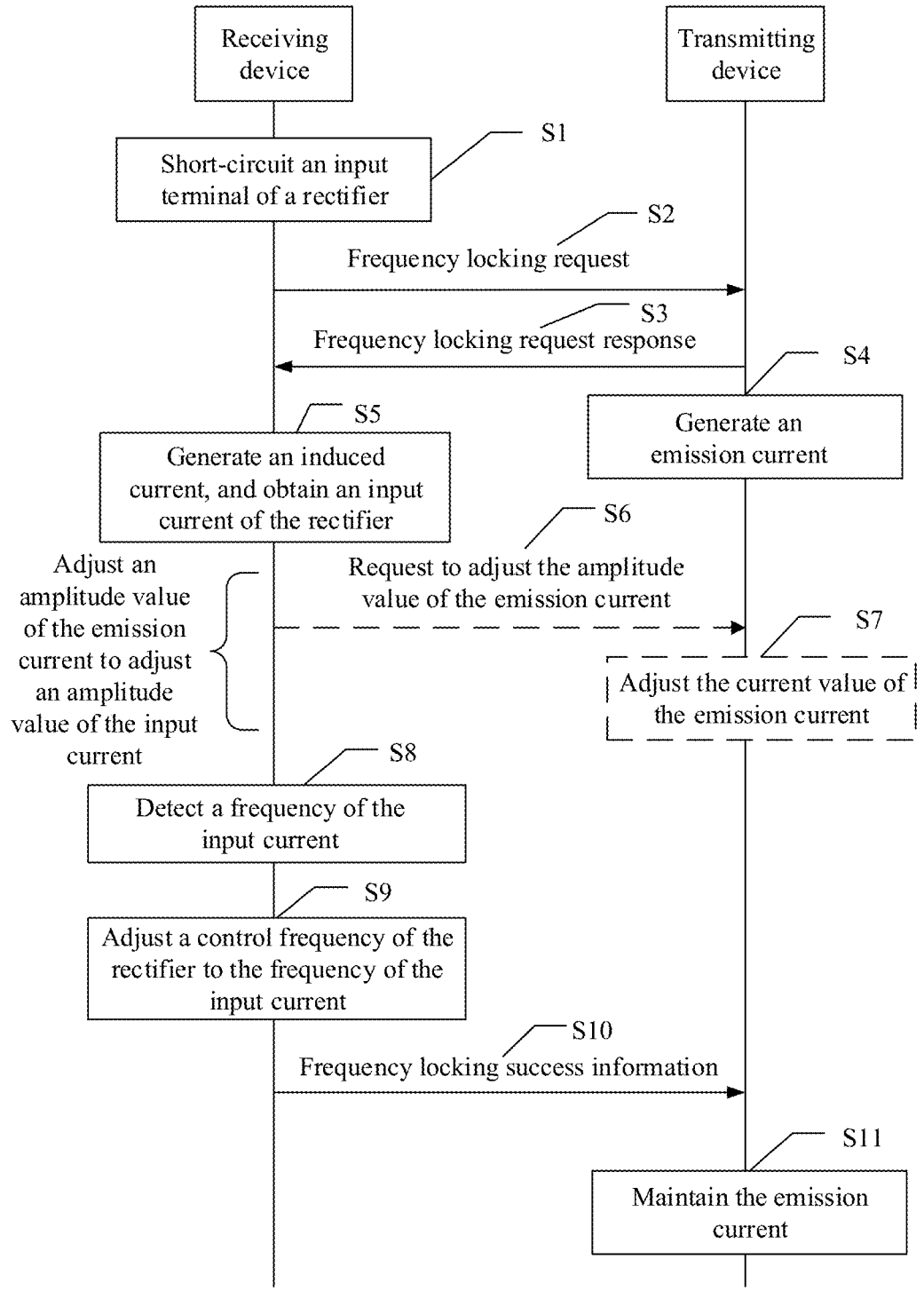
FIG. 7 is a schematic flowchart of another frequency locking method according to this application.

FIG. 7 is a schematic flowchart of another frequency locking method according to this application.

S1. A receiving device short-circuits an input terminal of a rectifier.

The receiving device may include the rectifier, and the rectifier is configured to convert an alternating current signal into a direct current signal required by a load. Before the receiving device performs frequency locking, the receiving device may short-circuit the input terminal of the rectifier, that is, set the rectifier to a short-circuited state, to avoid oscillation of the rectifier caused by frequency inconsistency between a transmitting device and the receiving device.

Optionally, the rectifier may be a controllable rectifier including a controllable switch. Therefore, the controllable switch of the rectifier needs to be adjusted to adjust a frequency of the rectifier, so that the frequency of the rectifier keeps consistent with a frequency of an emission current of a transmitting coil. Specifically, in this embodiment, the rectifier of the receiving device includes one or more switching transistors, and turn-on of the switching transistor may be controlled, so that the input terminal of the rectifier is in the short-circuited state. For example, the input terminal of the rectifier is connected to an output terminal of a receiving module, and the rectifier includes four switching transistors that constitute two bridge arms, where two lower transistors are turned on or two upper transistors are turned on, so that the input terminal of the rectifier is short-circuited. Usually, after the input terminal of the rectifier is short-circuited, an input voltage of the rectifier is 0, but a current value of an input current of the rectifier is still detected.

It should be noted that before operation S1, the receiving device may further perform guidance and alignment detection, pairing detection, offset detection, or the like, so that the receiving module of the receiving device can be successfully coupled to a transmitting module of the transmitting device. For example, when a user drives an electric vehicle to a charging station, the user drives the electric vehicle close to the charging station and aligns a receiving module of the electric vehicle with a transmitting module of the charging station, so that the receiving module is coupled to the transmitting module. After it is determined that the receiving module is successfully coupled to the transmitting module, operation S1 is performed.

S2. The receiving device transmits a frequency locking request to the transmitting device.

After the receiving device short-circuits the input terminal of the rectifier, the receiving device transmits the frequency locking request to the transmitting device, requesting the transmitting device to enter a frequency locking procedure and generate an emission current.

Specifically, the frequency locking request may carry information about a first preset range, and the first preset range is a working frequency range for charging the receiving device, so that the transmitting device can determine a frequency of the emission current based on the first preset range. For example, the first preset range may be a nominal frequency 85.5 kHz, and an error does not exceed ±50 Hz.

In an embodiment, the frequency locking request may further carry information about a second preset range, and the second preset range is used by the transmitting device to determine a current value of the emission current.

S3. The transmitting device returns a frequency locking request response.

After the transmitting device receives the frequency locking request, the transmitting device may return a frequency locking request response message to the receiving device in response to the frequency locking request, to notify the receiving device that the transmitting device has received the frequency locking request, so that the receiving device learns that the transmitting device has received the frequency locking request.

In addition, in a possible scenario, if the transmitting device does not support any frequency within the first preset range, the transmitting device may notify the receiving device by using the frequency locking request response message, that the transmitting device does not support any frequency within the first preset range. Therefore, there is no need to perform a subsequent operation, and the receiving device can reselect an available transmitting device.

In an embodiment, when the receiving device transmits the frequency locking request or after the receiving device transmits the frequency locking request, the receiving device further transmits an initial current indication value to the transmitting device. After the transmitting device receives the initial current indication value, the transmitting device may generate an emission current whose frequency is within the first preset range and whose current value is the initial current indication value.

S4. The transmitting device generates the emission current.

After the transmitting device receives the frequency locking request, the transmitting device may generate the emission current on the transmitting coil, where the emission current may also be referred to as a current of the transmitting coil.

The frequency of the emission current may be determined based on the first preset range. For example, if the transmitting device determines that a frequency within the first preset range is supported, the transmitting device may generate an emission current whose frequency is within the first preset range.

S5. The receiving device generates an induced current, and obtains an input current of the rectifier.

After the transmitting device generates the emission current, the receiving device may generate induction based on the emission current to obtain the induced current, and obtain the input current of the rectifier based on the induced current.

Specifically, the receiving device includes a receiving coil, and the transmitting device includes the transmitting coil. When the emission current exists on the transmitting coil, the receiving coil of the receiving device may generate induction to obtain the induced current, and transmit the induced current to the rectifier to obtain the input current of the rectifier, where a frequency of the input current is consistent with the frequency of the emission current. For example, the receiving device may further include a compensation circuit, and the input current of the rectifier may be obtained when the induced current passes through the compensation circuit.

S6. The receiving device requests the transmitting device to adjust the current value of the emission current.

The receiving device may transmit at least one piece of indication information to the transmitting device, where the at least one piece of indication information is used to indicate the transmitting device to adjust the emission value of the emission current to change the current value of the input current.

Optionally, the at least one piece of indication information may be transmitted when the receiving device determines that the current value of the input current is beyond a third preset range. When the current value of the input current is beyond the third preset range, the receiving device may request the transmitting device to adjust the current value of the emission current, for example, increase or decrease the current value of the emission current, to change the current value of the input current.

Specifically, any one of the at least one piece of indication information may include one or more of an adjustment indication, a current indication value or an adjustment value. When a piece of indication information includes a current indication value, the indication information may be used to indicate that the transmitting device is to adjust the current value of the emission current to the current indication value. When a piece of indication information includes an adjustment value, the indication information is used to indicate that the transmitting device is to increase or decrease the current value of the transmitting device by the adjustment value. Correspondingly, the indication information may further include an increase indication or a decrease indication, used to indicate that an operation corresponding to the adjustment value is increase or decrease. When a piece of indication information includes an adjustment indication, the adjustment indication is used to indicate that the transmitting device is to increase or decrease the current value of the emission current. A specific amount by which the current value is increased or decreased may be carried in the indication information, or the current value may be increased by a default value or the like, or an amount by which the current value is increased or decreased may be determined based on an actual application scenario.

It may be understood that after the rectifier of the receiving device is short-circuited, the transmitting device generates the current of the transmitting coil; the receiving device induces the current, and requests the transmitting device to gradually increase the emission current of the transmitting coil, until the receiving device can detect the frequency of the input current of the rectifier; then the current of the transmitting coil stays unchanged; a frequency detection circuit of the receiving device detects the frequency of the input current of the rectifier; and then a control frequency of the rectifier is adjusted to the frequency of the input current of the rectifier.

In an embodiment, after the receiving device detects the current value of the input current, the receiving device may calculate a coupling factor between the receiving device and the transmitting device by using a preset formula, to calculate the current value of the emission current based on the coupling factor when the current value of the input current is within the third preset range; and determine the current indication value or the adjustment value, and transmit the current indication value or the adjustment value to the transmitting device. For example, the preset formula may be $$k = \frac{Irec}{Ip}\sqrt{\frac{Ls}{Lp}},$$

where Irec is the input current, Ip is the emission current, Lp is self-inductance of the transmitting coil, and Ls is self-inductance of the receiving coil. Therefore, after k is calculated, k and a value within the third preset range are substituted into the preset formula, and a range of the emission current can be calculated.

S7. The transmitting device adjusts the current value of the emission current.

After the transmitting device receives each of the at least one piece of indication information, the transmitting device adjusts the current value of the emission current based on each piece of indication information to change the current value of the input current, until the current value of the input current is within the third preset range.

The third preset range is a range within which the receiving device can accurately detect the frequency of the input current. For example, if the current value of the input current is lower than the third preset range, the detected frequency of the input current may be inaccurate, but if the current value of the input current is higher than the third preset range, higher power consumption may be generated. Therefore, the current value of the input current may be controlled within the third preset range, so that power consumption is also reduced while the frequency of the input current can be accurately detected.

It should be noted that operations S6 and S7 are optional operations. When it is determined in operation S5 that the current value of the input current is within the third preset range, operations S6 and S7 do not need to be performed.

Certainly, the receiving device may also directly detect the frequency of the input current, without requesting the transmitting device to adjust the emission current. Operations S6 and S7 are optional operations, and may be adjusted based on an actual application scenario.

It may be understood that when the current value of the input current detected by the receiving device is relatively small, the receiving device may request the transmitting device to adjust the current value of the emission current. The transmitting device gradually increases the current value of the emission current, until the receiving device can detect the frequency of the input current. For example, the transmitting device may first generate a relatively small current Ip to excite the transmitting coil, where a frequency f of Ip is a working frequency of the transmitting device; the receiving coil of the receiving device generates an induced current, and obtains a corresponding input current of the rectifier; and the receiving device may request the transmitting device to increase a current value of the emission current to change a current value of the input current, until the receiving device can detect a frequency of the input current.

S8. The receiving device detects the frequency of the input current.

After obtaining the input current, if the current value of the input current is within the third preset range, the receiving device may detect the frequency of the input current to obtain the frequency of the input current, that is, the foregoing input frequency.

Specifically, the frequency of the input current may be detected in a plurality of manners, for example, zero crossing detection or a difference method, which may be adjusted based on an actual application scenario. This is not limited in this application. For ease of understanding, for example, one detection manner is illustrated, where the input current is a sine wave, a signal synchronous with the sine wave may be detected, and the frequency of the input current is detected by using the synchronous signal so that the input frequency is obtained. For example, after the receiving coil obtains an input current through induction in an alternating magnetic field generated by the transmitting coil, a waveform of the input current is a sine wave, a zero crossing point of the sine wave may be detected by using a zero crossing detection circuit so that a signal synchronous with the sine wave is obtained, and a frequency of the synchronous signal is detected so that an input frequency corresponding to the input current is obtained.

S9. The receiving device adjusts the control frequency of the rectifier to the frequency of the input current.

After the receiving device detects the input frequency corresponding to the input current, if the input frequency is within the frequency range prescribed in the frequency locking request, the receiving device adjusts the control frequency of the rectifier to the input frequency.

Specifically, a controller of the receiving device may generate an adjustment signal, and transmit the adjustment signal to the rectifier. A frequency of the adjustment signal is the same as the input frequency, and the adjustment signal is used to control a frequency of turn-on and turn-off of the switching transistor of the rectifier, so that the control frequency of the rectifier is controlled. For example, if a frequency generated by the transmitting device is 85.52 kHz, the receiving device may generate an adjustment signal, where a frequency of the adjustment signal is also 85.52 kHz, and the adjustment signal is used to control turn-on or turn-off of the switching transistor of the rectifier, so that the control frequency of the rectifier is also adjusted to 85.52 kHz.

In addition, when the rectifier is in the short-circuited state, after the receiving device generates the adjustment signal and before the adjustment signal is transmitted to the rectifier, a part of controllable switching transistors are in an ON state. In this case, the part of switching transistors may be kept in the ON state, that is, the rectifier is kept in the short-circuited state. After the short-circuited state of the rectifier is terminated, that is, before the transmitting device is used for charging, the adjustment signal is transmitted to the rectifier, so that the control frequency of the rectifier keeps consistent with the frequency of the adjustment signal. This avoids charging of the receiving device before the frequency of a wireless charging system is stabilized.

In an embodiment, after the receiving device adjusts the frequency of the rectifier to the input frequency, the receiving device may further transmit frequency locking success information to the transmitting device, where the frequency locking success information is used to notify the transmitting device that a working frequency of the receiving device already keeps consistent with the frequency of the transmitting device. Therefore, the transmitting device learns that the frequency of the receiving device keeps consistent with that of the transmitting device, and can perform a subsequent related operation, for example, supply charging power to the receiving device.

In an embodiment, when the frequency of the rectifier is adjusted to the input frequency, not only the frequency of the rectifier is adjusted to the input frequency, but also a phase of the rectifier is adjusted. Usually, to enable the switching transistor of the rectifier to implement soft switching, preset phases need to be maintained for an input voltage and an input current of the rectifier. For example, turn-on and turn-off delays of the switching transistor of the rectifier may be adjusted, so that a phase lag is maintained for the input voltage of the rectifier and that a phase difference is generated between the input voltage and the input current.

It should be understood that in this embodiment, the control frequency of the rectifier may also be referred to as the frequency of the rectifier, a working frequency of the rectifier, or the like.

S10. The receiving device transmits a frequency locking success message to the transmitting device.

After the receiving device adjusts the frequency of the rectifier to the input frequency, the receiving device transmits the frequency locking success information to the transmitting device. After the transmitting device receives the frequency locking success message, the transmitting device ends the frequency locking procedure, and maintains the current frequency of the emission current or the frequency and current value of the emission current.

S11. The transmitting device maintains the emission current.

After the transmitting device receives the frequency locking success information transmitted by the receiving device, the transmitting device ends the frequency locking procedure, and maintains the current frequency of the emission current or the frequency and current value of the emission current, until another charging procedure is performed or another indication is received or the like.

In an embodiment, after the transmitting device receives the frequency locking success information, the transmitting device further returns a frequency locking end response message in response to the frequency locking success information, where the frequency locking end response message may carry the frequency and current value of the emission current maintained by the transmitting device. The receiving device may determine, based on the frequency locking end response message, the frequency and current value of the emission current maintained by the transmitting device, and further determine whether the frequency of the receiving device is consistent with the frequency of the transmitting device.

It should be noted that operation S10 in this embodiment of this application is an optional operation. In one case, after the transmitting device generates the emission current, if no information transmitted by the receiving device is received, the transmitting device may continue to maintain the emission current, and the receiving device does not need to transmit the frequency locking success information.

Therefore, when the current value of the input current is beyond the third preset range, the receiving device cannot detect the frequency of the input current, or when a frequency error of the input current is relatively large, the frequency of the input current needs to be adjusted to be within an appropriate range. Therefore, indication information may be transmitted to the transmitting device to adjust the current value of the input current, so that the detected frequency of the input current is more accurate.

In an embodiment, after the receiving device transmits the frequency locking success message to the transmitting device, the receiving device may further terminate short-circuiting of the input terminal of the rectifier, and transmit a charging request to the transmitting device, requesting the transmitting device to supply charging power to the receiving device. After the transmitting device receives the charging request, the transmitting device may supply charging power to the receiving device by using the transmitting coil, so that the receiving device can be charged by the transmitting device.

It should be understood that in some different implementation scenarios, the transmitting device and the receiving device may be different devices. For example, in some wireless charging scenarios, the transmitting device may include a transmit end, a ground device, or the like, the receiving device may include a receive end, a vehicular device, or the like, and the ground device may supply charging power to the vehicular device. The following illustrates a procedure of a frequency locking method according to this application by using an example in which a transmitting device is a ground device and a receiving device is a vehicular device. A rectifier of the vehicular device is set to a short-circuited state; after the rectifier enters the short-circuited state, a frequency locking request is transmitted to the ground device, and the ground device responds to the frequency locking request, where the frequency locking request includes a current of an emission current (a nominal frequency is 85.5 kHz, and an error does not exceed ±50 Hz); the ground device excites a transmitting coil with a relatively small current Ip, where a frequency f of Ip is a working frequency of the ground device; a receiving coil generates an induced current, a corresponding input current of the rectifier is generated, and a frequency of the input current of the rectifier is detected; if an amplitude value of the input current of the rectifier is small and the frequency thereof cannot be accurately detected, the vehicular device requests to increase the current of the transmitting coil; the ground device gradually increases the current of the transmitting coil, until the frequency of the input current of the rectifier can be detected, and then the ground device keeps the current of the transmitting coil unchanged; the vehicular device detects that the frequency of the input current of the rectifier is within a frequency range prescribed in the frequency locking request, and adjusts a control frequency of a switching transistor of the rectifier to the detected frequency; the vehicular device transmits frequency locking success information; and before another charging procedure is started, the ground device keeps the current of the transmitting coil unchanged, to ensure that the vehicular device is always kept in a frequency-locked state.

It should be noted that operations of the frequency locking method shown in each of the foregoing FIG. 2 to FIG. 7 may be combined into different embodiments in different combination manners, or a method procedure corresponding to each figure is used as an independent embodiment. The operations may be adjusted based on an actual application scenario. Only procedures of some frequency locking methods provided by this application are illustrated, but this is not limited.

Operations performed by the transmitting device and the receiving device in the wireless charging system provided by this application are described in detail above. With reference to the methods in the foregoing FIG. 2 to FIG. 7, the following describes in detail a receiving device and a transmitting device provided by this application. The receiving device mentioned hereinafter is configured to perform the operations performed by the receiving device in the foregoing FIG. 2 to FIG. 6. The transmitting device mentioned hereinafter is configured to perform the operations performed by the transmitting device in the foregoing FIG. 2 to FIG. 7.

Figure 8A:
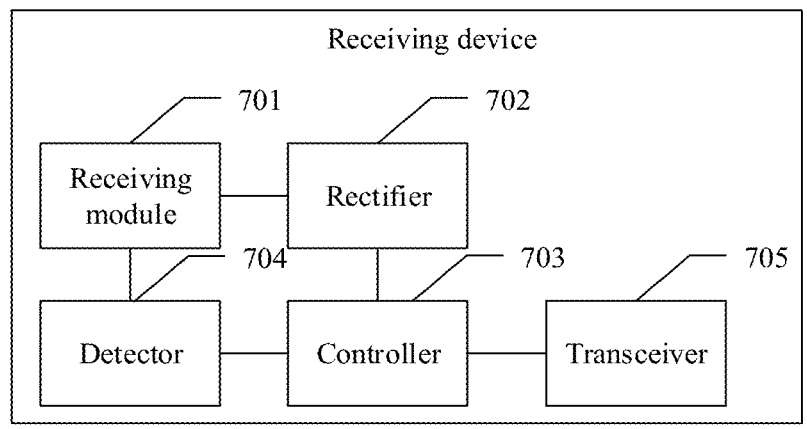
FIG. 8A is a schematic structural diagram of a receiving device according to this application.

First, FIG. 8A is a schematic structural diagram of a receiving device according to this application.

The receiving device may include a transceiver 705 and a controller 703.

The transceiver 705 and the controller 703 are interconnected by a cable.

The transceiver 705 may be configured to perform the foregoing operations 201 and 202, 301 to 305, 602, 604 to 606, or 608 or 609. The controller 703 may be configured to perform the foregoing operation 203 or 306.

The following describes operations of the controller 703 and the transceiver 705 in detail.

The transceiver 705 is configured to transmit a parameter related to frequency locking to a transmitting device, where the parameter related to frequency locking includes information about a first preset range and a second preset range, the first preset range is a working frequency range of the receiving device, and the second preset range is a current value range of an emission current during frequency locking of the receiving device;

the transceiver 705 is further configured to receive frequency locking capability information transmitted by the transmitting device; and the controller 703 is configured to determine, based on the frequency locking capability information, whether the transmitting device has a frequency locking function and whether the transmitting device supports a frequency within the first preset range and a current value within the second preset range.

In an embodiment, the transceiver 705 is further configured to receive a first query message transmitted by the transmitting device;

the controller 703 is further configured to determine, based on the first query message, whether frequency locking is required, and generate a first response message based on a determining result, where frequency locking adjusts a working frequency of the receiving device to be the same as a frequency of the transmitting device; and the transceiver 705 is further configured to transmit the first response message to the transmitting device, and receive a second query message transmitted by the transmitting device, where the second query message is used to request the parameter related to frequency locking.

In an embodiment, the receiving device may further include a receiving module 701 and a detector 704, where after the controller 703 determines that the transmitting device has the frequency locking function and that the transmitting device supports the frequency within the first preset range and the current value within the third preset range, the transceiver 705 is further configured to transmit a frequency locking request to the transmitting device, where the frequency locking request is used to request the transmitting device to start a frequency locking procedure;

the receiving module 701 is configured to obtain an input current through induction based on an emission current, where the emission current is generated by the transmitting device based on the frequency locking request, and a frequency of the emission current is within the first preset range;

the detector 704 is configured to detect the input current to obtain an input frequency; and the controller 703 is further configured to generate an adjustment signal, where the adjustment signal is used to adjust a frequency of a rectifier 702 to the input frequency.

In an embodiment,
the controller 703 is further configured to determine whether a current value of the input current is within a third preset range;
the transceiver 705 is further configured to transmit at least one piece of indication information to the transmitting device when the current value of the input current is beyond the third preset range, where the at least one piece of indication information is used to indicate the transmitting device to adjust a current value of the emission current to change the input current; and
the detector 704 is configured to detect a changed input current, and when a current value of the changed input current is within the third preset range, detect the changed input current to obtain an input frequency.

In an embodiment,
after the controller 703 generates the adjustment signal, the transceiver 705 is further configured to transmit frequency locking success information to the transmitting device, where the frequency locking success information is used to indicate the transmitting device to end the frequency locking procedure and maintain the emission current.

In this embodiment, after the receiving device completes frequency locking, the receiving device transmits the frequency locking success information to the transmitting device, so that the transmitting device ends the frequency locking procedure and that the transmitting device maintains the emission current.

In an embodiment,
the transceiver 705 is further configured to receive a frequency locking end response message transmitted by the transmitting device in response to the frequency locking success information; and
the controller 703 is further configured to determine, based on the frequency locking end response message, that the transmitting device has ended the frequency locking procedure, and obtain the current value of the emission current maintained by the transmitting device.

In an embodiment,
the transceiver 705 is configured to transmit the frequency locking request to the transmitting device after the controller 703 generates the adjustment signal; and
after transmitting the frequency locking success information to the transmitting device, the transceiver 705 is further configured to transmit a charging request to the transmitting device, and terminate short-circuiting of an input terminal of the rectifier 702, where the charging request is used to indicate the transmitting device to supply charging power to the receiving device.

In an embodiment,
the controller 703 is further configured to generate a first control signal, where the first control signal is used to adjust a phase of an input voltage of the rectifier 702, so that a difference between the phase of the input voltage of the rectifier 702 and a phase of the input current is adjusted to a preset value, where the preset value is a phase difference when a switch of the rectifier 702 works in a soft switching state.

In this embodiment, the difference between the phase of the input voltage of the rectifier 702 and the phase of the input current is adjusted to the preset value, so that the switch of the rectifier 702 works in the soft switching state. In this way, a switching loss of the rectifier 702 is reduced.

Figure 8B:
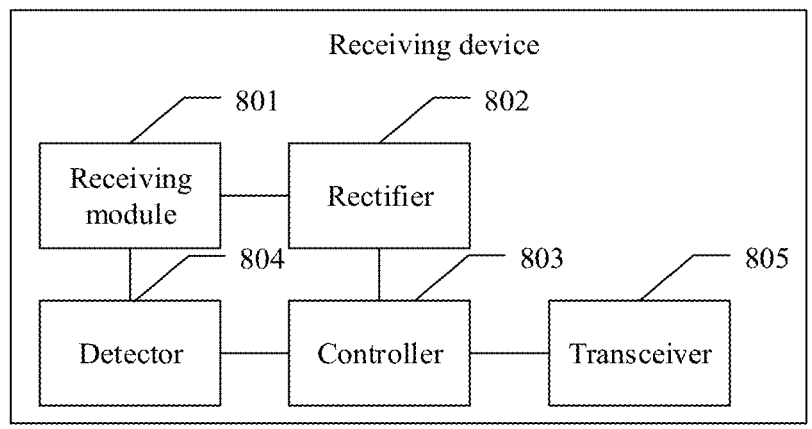
FIG. 8B is a schematic structural diagram of another receiving device according to this application.

This application further provides another receiving device. With reference to FIG. 8B, the following describes another receiving device provided by this application.

The receiving device may include a receiving module 801, a rectifier 802, a detector 804, a transceiver 805, and a controller 803.

An input terminal of the receiving module 801 is coupled to a transmitting module of a transmitting device, an output terminal of the receiving module 801 is connected to an input terminal of the rectifier, the output terminal of the receiving module is further connected to an input terminal of the detector, an output terminal of the detector is connected to the controller, an output terminal of the rectifier is connected to a load or a filter or the like, the rectifier is further connected to the controller, and the controller is further connected to the transceiver.

The transceiver 805 is configured to perform operations such as operations 401 and 402, 404, or 409 in the foregoing FIG. 4.

The controller 803 is configured to perform operations such as operation 403, 408, or 411 in the foregoing FIG. 4.

The receiving module 801 is configured to perform operation 406 in the foregoing FIG. 4.

The detector 804 is configured to perform operation 407 in the foregoing FIG. 4.

The following describes in detail operations performed by each module.

The transceiver 805 is configured to transmit a parameter related to frequency locking to the transmitting device, and receive frequency locking capability information transmitted by the transmitting device, where the parameter related to frequency locking includes information about a first preset range;
the controller 803 is configured to determine, based on the frequency locking capability information, whether the transmitting device supports generation of an emission current whose frequency is within the first preset range;
when the controller 803 determines that the transmitting device supports generation of the emission current whose frequency is within the first preset range, the transceiver 805 is further configured to transmit a frequency locking request to the transmitting device, so that the transmitting device generates the emission current based on the frequency locking request;
the receiving module 801 is configured to obtain an input current through induction based on the emission current;
the detector 804 is configured to detect a frequency of the input current to obtain an input frequency; and
the controller 803 is further configured to adjust a frequency of the rectifier 802 of the receiving device to the input frequency.

In an embodiment,
the transceiver 805 is further configured to transmit at least one piece of indication information to the transmitting device when a current value of the input current is beyond a third preset range, where the at least one piece of indication information is used to indicate the transmitting device to adjust a current value of the emission current to change the input current; and
the detector 804 is configured to detect a current value of a changed input current, and when the current value of the changed input current is within the third preset range, detect a frequency of the changed input current to obtain an input frequency.

This application further provides another receiving device, where a structure of the receiving device is similar to that in FIG. 8B. Based on the foregoing FIG. 8B, the following describes another receiving device provided by this application.

The transceiver 805 is configured to perform operations such as operation 501, 505, or 510 in the foregoing FIG. 4.

The controller 803 is configured to perform operations such as operation 504 or 509 in the foregoing FIG. 4.

The receiving module 801 is configured to perform operation 503 in the foregoing FIG. 4.

The detector 804 is configured to perform operation 507 or 508 in the foregoing FIG. 4.

The transceiver 805 is configured to transmit a parameter related to frequency locking to the transmitting device, and receive frequency locking capability information transmitted by the transmitting device, where the parameter related to frequency locking includes information about a first preset range;

the controller 803 is configured to determine, based on the frequency locking capability information, whether the transmitting device supports generation of an emission current whose frequency is within the first preset range;

when the controller 803 determines that the transmitting device supports generation of the emission current whose frequency is within the first preset range, the transceiver 805 is further configured to transmit a frequency locking request to the transmitting device, so that the transmitting device generates the emission current based on the frequency locking request;

the receiving module 801 is configured to receive electromagnetic energy generated by the transmitting module based on the emission current, and output an input current;

the detector 804 is configured to detect a frequency of the input current to obtain an input frequency; and the controller 803 is further configured to generate an adjustment signal, where the adjustment signal is used to adjust a frequency of the frequency detector 802 to the input frequency.

The following describes some embodiments.

In an embodiment, any one of at least one piece of indication information includes a second current indication value or an adjustment value, where the second current indication value is used to indicate that the transmitting device is to adjust the emission current to the second current indication value, and the adjustment value is used to indicate that the transmitting device is to increase or decrease the emission current by the adjustment value.

In an embodiment, before transmitting the frequency locking request to the transmitting device, the transceiver 805 is further configured to transmit an initial current indication value to the transmitting device, so that the transmitting device transmits a parameter related to frequency locking, where the parameter related to frequency locking includes the information about the first preset range of a working frequency of the receiving device;

the transceiver 805 is further configured to receive the frequency locking capability information transmitted by the transmitting device;

the controller 803 is further configured to determine, based on the frequency locking capability information, that the transmitting device supports generation of the emission current whose frequency is within the first preset range; and the transceiver 805 is configured to transmit the frequency locking request to the transmitting device when it is determined that the transmitting device supports generation of the emission current whose frequency is within the first preset range, where the frequency locking request is used to indicate the transmitting device to generate the emission current whose frequency is within the first preset range.

In an embodiment, any one of the at least one piece of indication information includes a current value indication value or an adjustment value. The current indication value is used to indicate that the transmitting device is to adjust the emission current to the current indication value. The adjustment value is used to indicate that the current value of the emission current is to be increased or decreased by the adjustment value.

In an embodiment, the transceiver 805 is further configured to receive a query message transmitted by the transmitting device; and the transceiver 805 is configured to return, in response to the query message, the parameter related to frequency locking; or the transceiver 805 is configured to actively transmit the parameter related to frequency locking to the transmitting device, for example, may transmit the parameter related to frequency locking to the transmitting device through an operation of a user, or may transmit the parameter related to frequency locking to the transmitting device after the transmitting device is detected within a preset range.

In an embodiment, before the transceiver 805 transmits the frequency locking request to the transmitting device, the controller 803 is further configured to generate a short-circuit signal, and transmit the short-circuit signal to the rectifier 802, so that the rectifier 802 is short-circuited, to avoid a frequency difference between the frequency of the rectifier 802 and a frequency of the transmitting device before the frequency adjustment is completed and avoid oscillation of a wireless charging system.

In an embodiment, after the controller 803 adjusts the frequency of the rectifier 802 to the input frequency based on the adjustment signal, the receiving device further cancels short-circuiting of the rectifier 802, so that the receiving device can convert an alternating input current into a direct current by using the rectifier 802.

In an embodiment, the parameter related to frequency locking further includes information about a second preset range;

the controller 803 is further configured to determine, based on the frequency locking capability information, whether the transmitting device supports generation of an emission current whose current value is within the second preset range; and the transceiver 805 is configured to transmit the frequency locking request to the transmitting device when the controller 803 determines that the transmitting device supports generation of an emission current whose frequency is within the first preset range and whose current value is within the second preset range, where the frequency locking request is used to indicate the transmitting device to generate the emission current whose frequency is within the first preset range and whose current value is within the second preset range.

In an embodiment, the transceiver 805 is further configured to receive a query message transmitted by the transmitting device, where the query message is used to request the parameter related to frequency locking; and the transceiver 805 is configured to return, in response to the query message, the parameter related to frequency locking to the transmitting device.

In an embodiment, after the frequency of the rectifier 802 is adjusted to the input frequency, the transceiver 805 is further configured to transmit frequency locking success information to the transmitting device, where the frequency locking success information is used to indicate the transmitting device to maintain the emission current.

In an embodiment, after the frequency of the rectifier 802 is adjusted to the input frequency, the transceiver 805 is further configured to transmit a charging request to the transmitting device, where the charging request is used to indicate the transmitting device to supply charging power to the receiving device.

In an embodiment, the transceiver 805 is further configured to transmit a charging current indication value to the transmitting device, where the charging indication value is used to indicate that the transmitting device is to generate an emission current whose current value is the charging indication value. Usually, the current value adjusted for charging is adjusted to the charging current indication value, and the charging current indication value is not less than a rated current value for charging the receiving device and is not greater than a maximum current value of the receiving device, so that the receiving device can be successfully charged based on the emission current.

This application further provides another receiving device, where a structure of the receiving device is similar to that in FIG. 8B. Based on the foregoing FIG. 8B, the following describes another receiving device provided by this application.

The receiving device may include a transceiver 805, a controller 803, a receiving module 801, a detector 804, and a rectifier 802, where the controller 803 is configured to control short-circuiting of an input terminal of the rectifier 802;

the transceiver 805 is configured to transmit a frequency locking request to a transmitting device, where the frequency locking request carries information about a first preset range, and the frequency locking request is used to request the transmitting device to generate an emission current whose frequency is within the first preset range;

the receiving module 801 is configured to obtain an input current of the rectifier 802 based on the emission current;

the detector 804 is configured to detect a frequency of the input current; and when the detector 804 detects that the frequency of the input current is within the first preset range, the transceiver 805 is further configured to transmit frequency locking success information to the transmitting device, where the frequency locking success information is used to indicate the transmitting device to maintain the emission current.

In an embodiment, the detector 804 is configured to detect the frequency of the input current when a current value of the input current is within a third preset range.

In an embodiment, the transceiver 805 is further configured to transmit at least one piece of indication information to the transmitting device when the current value of the input current is beyond the third preset range, where the at least one piece of indication information is used to indicate the transmitting device to adjust a current value of the emission current to change the input current.

In an embodiment, the controller 803 is further configured to adjust a control frequency of the rectifier 802 to be consistent with the frequency of the input current.

In an embodiment, the transceiver 805 is further configured to receive a frequency locking request response message returned by the transmitting device in response to the frequency locking request.

In an embodiment, the frequency locking request further carries information about a second preset range, and the second preset range is used by the transmitting device to determine the current value of the emission current.

In an embodiment, after transmitting the frequency locking success message to the transmitting device, the transceiver 805 is further configured to transmit a charging request to the transmitting device, where the charging request is used to indicate the transmitting device to supply charging power to the receiving device.

Figure 9A:
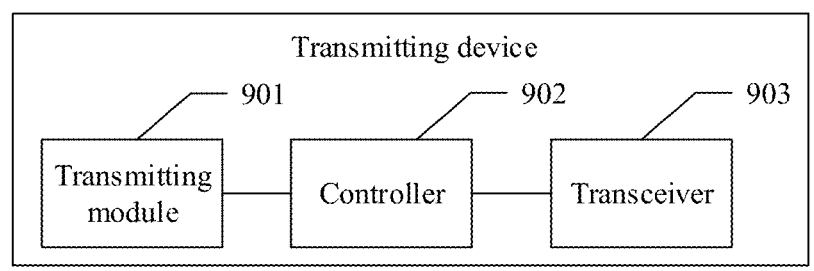
FIG. 9A is a schematic structural diagram of a transmitting device according to this application.

FIG. 9A is a schematic structural diagram of a transmitting device according to this application.

The transmitting device includes a transmitting module 901, a transceiver 903, and a controller 902, where the transmitting module 901 is connected to the controller 902, and the transceiver 903 is also connected to the controller 902;

the transceiver 903 is configured to receive a parameter related to frequency locking, where the parameter related to frequency locking is transmitted by a receiving device and includes information about a first preset range and a second preset range, the first preset range is a working frequency range of the receiving device, and the second preset range is a current value range of an emission current during frequency locking of the receiving device;

the controller 902 is configured to obtain whether the transmitting device has a frequency locking function, and when the transmitting device has the frequency locking function, determine whether the transmitting device supports a frequency within the first preset range and a current value within the second preset range, and generate frequency locking capability information; and the transceiver 903 is further configured to transmit the frequency locking capability information to the receiving device, so that the receiving device determines, based on the frequency locking capability information, whether the transmitting device has the frequency locking function and whether the transmitting device supports the frequency within the first preset range and the current value within the second preset range, and after determining that the transmitting device has the frequency locking function and before being charged by the transmitting device, adjusts a frequency of a rectifier to be the same as a frequency of the transmitting device.

In an embodiment, the transceiver 903 is further configured to transmit a first query message to the receiving device, where the first query message is used to query whether the receiving device requires frequency locking;

the transceiver 903 is further configured to receive a first response message returned in response to the first query message;

the controller 902 is further configured to determine, based on the first response message, whether the receiving device requires frequency locking; and when the receiving device requires frequency locking, the transceiver 903 is further configured to transmit a second query message to the receiving device, where the second query message is used to request the receiving device for the parameter related to frequency locking.

In an embodiment, the transmitting device further includes a transmitting module 901, where the transceiver 903 is further configured to receive a frequency locking request transmitted by the receiving device, where the frequency locking request is used to request to start a frequency locking procedure; and the controller 902 is configured to generate a second control signal based on the frequency locking request, where the second control signal is used to control the transmitting module 901 to generate an emission current, and a frequency of the emission current is within the first preset range, so that the receiving device obtains an input current through induction based on the emission current, detects the input current to obtain an input frequency, and adjusts a frequency of a rectifier to the input frequency.

In an embodiment, after the frequency locking request transmitted by the receiving device is received and the emission current is generated, the transceiver 903 further transmits a frequency locking start response message to the receiving device, where the frequency locking start response message is used to notify the receiving device that the transmitting device has started the frequency locking procedure. The frequency locking start response message may further carry the frequency and a current value of the emission current, so that the receiving device learns the frequency and current value of the emission current based on the frequency locking start response message.

In an embodiment, the transceiver 903 is further configured to receive at least one piece of indication information transmitted by the receiving device, where the at least one piece of indication information is transmitted by the receiving device when a current value of the input current is beyond a third preset range; and the controller 902 is further configured to generate, based on the at least one piece of indication information, at least one piece of second control information corresponding to the at least one piece of indication information on a one-to-one basis, where the at least one piece of second control information is used to adjust the current value of the emission current generated by the transmitting module 901 to change the input current.

In an embodiment, the transceiver 903 is further configured to receive frequency locking success information transmitted by the receiving device, where the frequency locking success information is transmitted after the receiving device adjusts the frequency of the rectifier to the input frequency; and the controller 902 is further configured to end the frequency locking procedure based on the frequency locking success information, and maintain the emission current.

In an embodiment, the transceiver 903 is further configured to transmit a frequency locking end response message to the receiving device in response to the frequency locking success information, so that the receiving device determines, based on the frequency locking end response message, that the transmitting device has ended the frequency locking procedure, and obtains the current value of the emission current maintained by the transmitting device.

In an embodiment, the transceiver 903 is further configured to receive a charging request transmitted by the receiving device;

the controller 902 is configured to generate a second control signal based on the charging request; and the transmitting module 901 is configured to supply charging power to the receiving device based on the second control signal.

This application further provides another transmitting device, which is similar to the transmitting device in the foregoing FIG. 9A. With reference to the foregoing FIG. 9A, the following describes another transmitting device provided by this application.

The transceiver 903 is configured to receive a parameter related to frequency locking, where the parameter related to frequency locking is transmitted by a receiving device and includes information about a first preset range;

the controller 902 is configured to generate frequency locking capability information, where the frequency locking capability information is used to indicate whether generation of an emission current whose frequency is within the first preset range is supported;

the transceiver 903 is further configured to transmit the frequency locking capability information to the receiving device;

the transceiver 903 is further configured to receive a frequency locking request transmitted by the receiving device, where the frequency locking request is transmitted when the receiving device determines that the transmitting device supports generation of the emission current whose frequency is within the first preset range; and the transmitting module 901 is configured to generate the emission current based on the frequency locking request, so that the receiving device obtains an input current based on the emission current and adjusts a frequency of a rectifier of the receiving device based on an input frequency of the input current.

In an embodiment, after the frequency locking request transmitted by the receiving device is received and the emission current is generated, the transceiver 903 further transmits a frequency locking start response message to the receiving device, so that the receiving device learns, based on the frequency locking start response message, that the transmitting device has started a frequency locking procedure, and the frequency and a current value of the emission current.

In an embodiment, the transceiver 903 is further configured to receive at least one piece of indication information, where the at least one piece of indication information is transmitted by the receiving device when a current value of the input current is beyond a third preset range; and the controller 902 is configured to generate a second control signal, and use the control signal to adjust the emission current generated by the transmitting module 901, to change the input current, so that a current value of the input current is within the third preset range.

In an embodiment, any one of the at least one piece of indication information includes a current value indication value or an adjustment value. The current indication value is used to indicate that the transmitting device is to adjust the current value of the emission current to the current indication value. The adjustment value is used to indicate that the current value of the emission current is to be increased or decreased by the adjustment value.

In an embodiment,
the transceiver 903 is further configured to transmit a query message to the receiving device, where the query message is used to request the parameter related to frequency locking of the receiving device, so that the receiving device returns, in response to the query message, the parameter related to frequency locking after the receiving device receives the query message. This embodiment provides a manner of obtaining the parameter related to frequency locking.

In an embodiment, the parameter related to frequency locking further includes information about a second preset range; and
the frequency locking capability information is further used to indicate whether generation of an emission current whose current value is within the second preset range is supported, so that the receiving device determines, based on the frequency locking capability information, whether the transmitting device supports generation of an emission current whose frequency is within the first preset range and whose current value is within the second preset range, and that the receiving device determines, based on the frequency locking capability information, whether the transmitting device can be used to charge the receiving device. This improves stability of the wireless charging system and user experience.

In an embodiment,
the transceiver 903 is further configured to receive frequency locking success information, where the frequency locking success information is transmitted after the receiving device adjusts the frequency of the rectifier of the receiving device to the input frequency; and
the controller 902 is further configured to generate a third control signal based on the frequency locking success information, and use the third control signal to control the transmitting module 901 to maintain the emission current.

In an embodiment,
after the frequency of the rectifier of the receiving device is adjusted to the input frequency, the transceiver 903 is further configured to receive a charging request transmitted by the receiving device; and
the controller 902 is further configured to supply charging power to the receiving device based on the charging request.

Figure 9B:
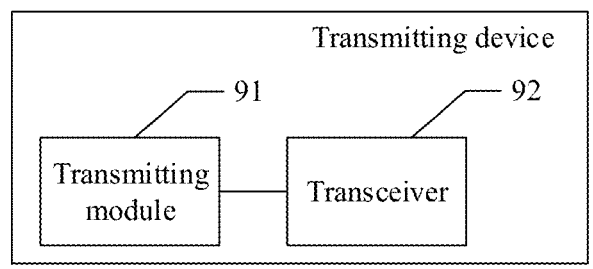
FIG. 9B is a schematic structural diagram of another transmitting device according to this application.

This application further provides another transmitting device, where a structure of the transmitting device is shown in FIG. 9B. The transmitting device may include a transceiver 92 and a transmitting module 91, where
the transceiver 92 is configured to receive a frequency locking request transmitted by a receiving device, where the frequency locking request carries information about a first preset range;
the transmitting module 91 is configured to generate an emission current based on the frequency locking request, where a frequency of the emission current is determined based on the first preset range, and the emission current is used by the receiving device to obtain an input current of a rectifier;
the transceiver 92 is further configured to receive at least one piece of indication information transmitted by the receiving device; and after the transceiver receives each of the at least one piece of indication information, the transmitting module 91 is further configured to adjust a current value of the emission current to change the input current.

In an embodiment, the at least one piece of indication information is transmitted after the receiving device determines that a current value of the input current is beyond a third preset range.

In an embodiment, the transceiver 92 is further configured to transmit a frequency locking request response message to the receiving device in response to the frequency locking request.

In an embodiment, the frequency locking request further carries information about a second preset range; and
the transmitting module 91 is configured to determine the current value of the emission current based on the second preset range.

In an embodiment, the transceiver 92 is further configured to receive a charging request transmitted by the receiving device; and
the transmitting module 91 is further configured to supply charging power to the receiving device based on the charging request.

Figure 10:
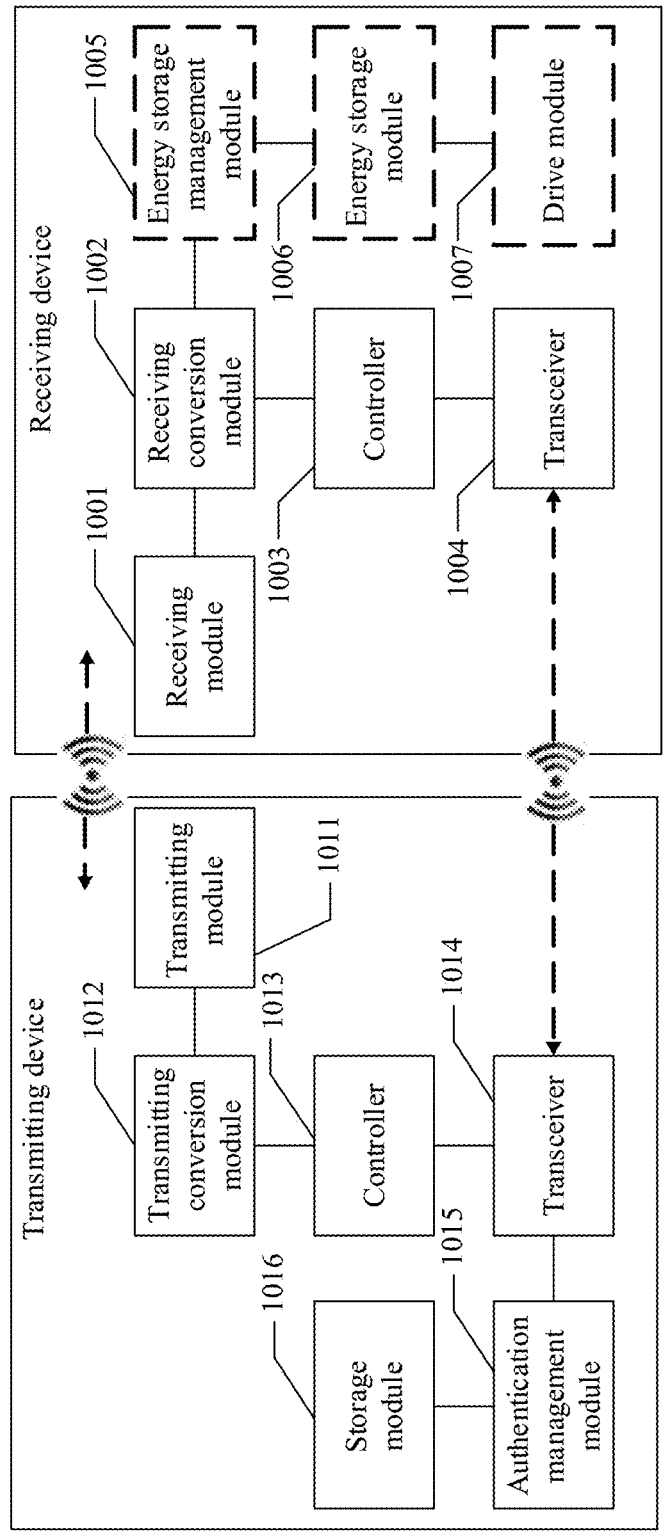
FIG. 10 is a schematic structural diagram of another wireless charging system according to this application.

More specifically, based on the receiving device or transmitting device provided in the foregoing FIG. 8A to FIG. 9B, a structure of a wireless charging system provided by this application may be shown in FIG. 10.

The wireless charging system includes a transmitting device and a receiving device.

The receiving device includes a receiving module 1001, a receiving conversion module 1002, a controller 1003, a transceiver 1004, an energy storage management module 1005, an energy storage module 1006, a drive module 1007, and the like. The energy storage management module 1005, the energy storage module 1006, and the drive module 1007 are optional modules.

The transmitting device includes a transmitting module 1011, a transmitting conversion module 1012, a controller 1013, a transceiver 1014, an authentication management module 1015, a storage module 1016, and the like.

For the receiving module 1001, the controller 100, and the transceiver 1004, refer to related descriptions of the receiving module, the controller, and the transceiver in the foregoing FIG. 8A or FIG. 8B. Details are not described again herein. For the transmitting module, the controller, and the transceiver, refer to related descriptions in the foregoing FIG. 9A. Details are not described again herein.

The receiving conversion module 1002 is configured to convert a high-frequency resonant current and a high-frequency resonant voltage received by the receiving module into a direct current voltage and a direct current required by the energy storage module. The receiving conversion module generally includes a rectifier (not shown in FIG. 10) and a direct current conversion unit (not shown in FIG. 10). The rectifier converts a high-frequency resonant current and a high-frequency resonant voltage received by a power receiving coil into a direct current voltage and a direct current. The direct current conversion unit provides the direct current voltage for a post-stage charging circuit, to implement charging in a constant mode.

The receiving conversion module 1002 may be connected to the energy storage management module 1005 and the energy storage module 1006, and use energy received by the receiving conversion module 1002 to charge the energy storage module.

The energy storage module 1006 is configured to store power.

The energy storage management module 1005 is configured to manage the direct current obtained by the receiving conversion module through conversion, and determine whether the direct current can be transmitted to the energy storage module. For example, after the power stored by the energy storage module exceeds a preset value, inputting to the energy storage module may be interrupted.

The drive module 1007 is configured to drive, by using the power stored by the energy storage module, the receiving device to perform another operation. For example, when the receiving device is an electric vehicle, driving of the electric vehicle may be implemented by using the drive module 1007.

The transmitting conversion module may be connected to a power source, and is configured to obtain energy from the power source, and convert an alternating current or direct current power supply into a high-frequency alternating current. When the power source is an alternating current power input, the transmitting conversion module includes a power factor calibration unit and an inverter. When the power source is a direct current power input, the transmitting conversion module includes an inverter and a voltage conversion unit. The power factor calibration unit can ensure that a phase of an input current of the wireless charging system is consistent with a voltage phase of a grid, reduce harmonic wave components of the system, and increase a power factor value, to reduce grid pollution caused by the wireless charging system and improve reliability. The power factor calibration unit may further increase or decrease an output voltage of the power factor calibration unit based on a post-stage requirement. The inverter may convert the voltage output by the power factor calibration unit into a high-frequency alternating current voltage, and output the high-frequency alternating current voltage to the transmitting module. The high-frequency alternating current voltage can greatly improve transmission efficiency and increase a transmission distance. It should be noted that the power source may be a power source in the transmitting device, or may be an external power source externally connected to the transmitting device. This is not limited in this application.

The authentication management module is configured to authenticate interaction between a wireless charging transmitting apparatus and an electric vehicle in the wireless charging system, and manage rights.

The storage module is configured to store charging process data, interaction authentication data (for example, interaction authentication information), and rights management data (for example, rights management information) of the transmitting device, where the interaction authentication data and the rights management data may be factory settings or may be set by a user. This is not limited in this embodiment of this application.

The transmitting module and the receiving module may be selectively combined randomly. Common combination forms include S-S, P-P, S-P, P-S, LCL-LCL, and LCL-P, and are not limited in this embodiment of this application. In addition, to implement a bidirectional charging function of the wireless charging system, the transmitting device and the receiving device in the wireless charging system may further include both a receiving module and a transmitting module, which may be independent or integrated.

Figure 11:
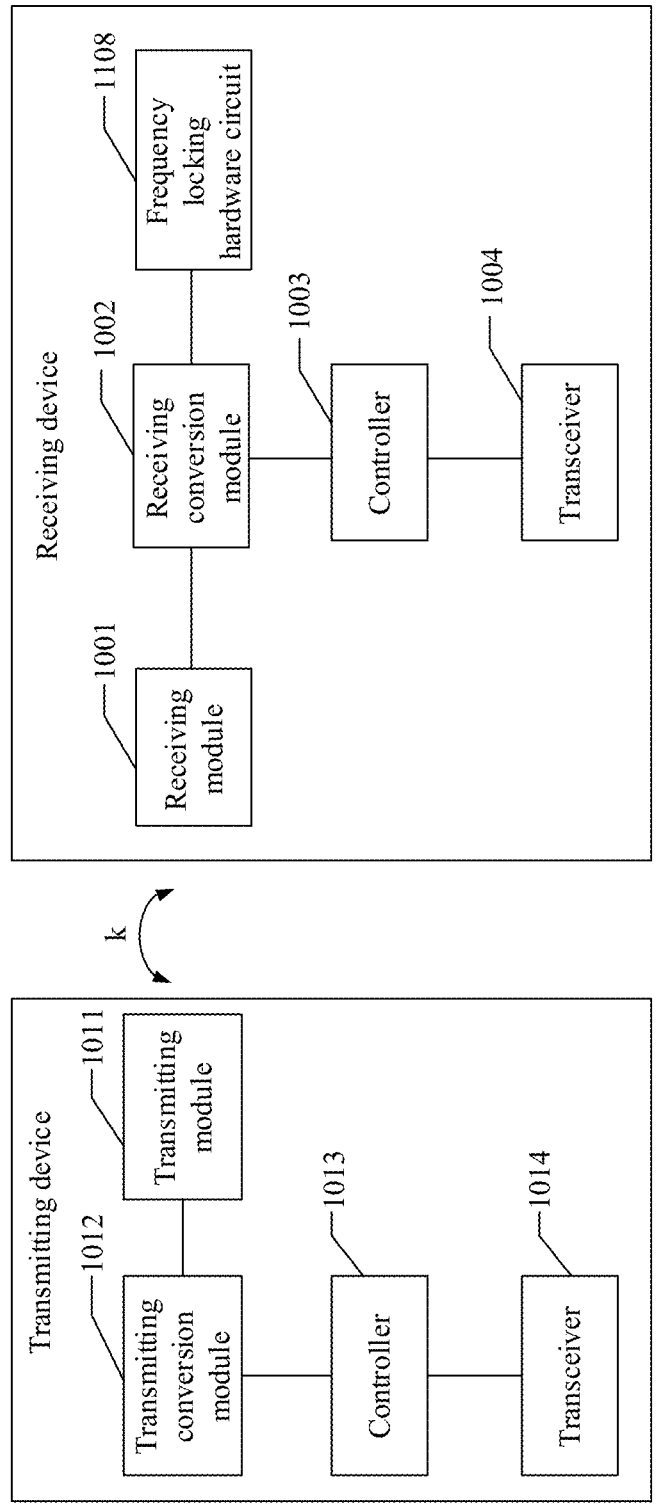
FIG. 11 is a schematic structural diagram of another wireless charging system according to this application.

Further, the structure of the wireless charging system provided by this application may alternatively be shown in FIG. 11.

A transmitting device includes a transmitting conversion circuit 1012, a transmitting module 1011, a controller 1013, and a transceiver 1014. Refer to descriptions in the foregoing FIG. 10. Details are not described again herein.

For a receiving module 1001, a receiving conversion module 1002, a controller 1003, and a transceiver 1004 of a receiving device, refer to descriptions in the foregoing FIG. 10. Details are not described again herein.

A difference lies in that the receiving device further includes a frequency locking hardware circuit 1108, where the frequency locking hardware circuit 1108 includes the foregoing detector 705 or detector 804. The frequency locking hardware circuit may be a circuit configured to implement sampling, filtering, zero-crossing detection, phase locked loop, or the like required by frequency locking, and may further generate a zero-crossing signal synchronous with an input current. The frequency locking hardware circuit is configured to detect a frequency of the input current.

The transmitting module may include a transmitting coil, the receiving module may include a receiving coil, and k is a coupling factor between the transmitting coil and the receiving coil. The coupling factor $$k = \frac{Irec}{Ip}\sqrt{\frac{Ls}{Lp}},$$

where Irec is an input current, Ip is an emission current, Lp is self-inductance of the transmitting coil, and Ls is self-inductance of the receiving coil.

The coupling factor is related to a distance between the transmitting coil and the receiving coil, a degree of alignment, and the like. For example, assuming that an electric vehicle is used as a load device, a gap between a chassis and the ground varies depending on different types of vehicles. In addition, because a power receiving coil may be mounted in a position at a front end, a middle part, or a rear end of a vehicle, a distance between a transmitting coil and a receiving coil varies accordingly, and a coupling factor between the coils also varies. Given a same transmitting coil and a same receiving coil, a coupling factor is large if a distance between the coils is short, or a coupling factor is small if a distance between the coils is long. For example, a gap from the ground is defined in the Chinese standard *Electric Vehicle Wireless Power Transfer Systems, Part 3: Specific Requirements*, as shown in Table 1. The gap from the ground is classified into a plurality of types: Z1, Z2, Z3, Z4, and the like.

TABLE 1

| Type | Gap from the ground (mm) |
|---|---|
| Z1 | 100 to 150 |
| Z2 | 140 to 210 |
| Z3 | 170 to 250 |
| Z4 | ≥250 |

It is relatively difficult to align the transmitting coil and the receiving coil in wireless charging. Therefore, there may be an offset range in a horizontal direction. An allowed offset range is defined in the standard, as shown in Table 2. MF-WPT1, MF-WPT2, and MF-WPT3 are common wireless charging systems.

TABLE 2

| Class | MF-WPT1 | MF-WPT2 | MF-WPT3 |
|---|---|---|---|
| X direction (mm) | ±75 | ±75 | ±75 |
| Y direction (mm) | ±100 | ±100 | ±100 |

In addition, there are a plurality of power classes for a power transmitting apparatus and a power receiving apparatus, for example, 3.7 kW, 7.7 kW, 11.1 kW, and 22 kW defined in the related standard, as shown in Table 3. If a power transmitting apparatus can provide 10 kW power, but maximum power that a power receiving apparatus on a vehicle can receive is 6.6 kW, the power transmitting apparatus needs to perform charging control based on a requirement of the power receiving apparatus. MF-WPT4, MF-WPT5, MF-WPT6, and MF-WPT7 are common wireless charging systems.

TABLE 3

| Power range (kW) | Type |
|---|---|
| P ≤ 3.7 | MF-WPT1 |
| 3.7 < P ≤ 7.7 | MF-WPT2 |
| 7.7 < P ≤ 11.1 | MF-WPT3 |
| 11.1 < P ≤ 22 | MF-WPT4 |
| 22 < P ≤ 33 | MF-WPT5 |
| 33 < P ≤ 66 | MF-WPT6 |
| P > 66 k | MF-WPT7 |

MF-WPT3, MF-WPT4, MF-WPT5, MF-WPT6, and MF-WPT7 systems are not applicable to a single-phase power input.

The following describes in more detail a receiving device and a transmitting device provided by this application.

Figure 12:
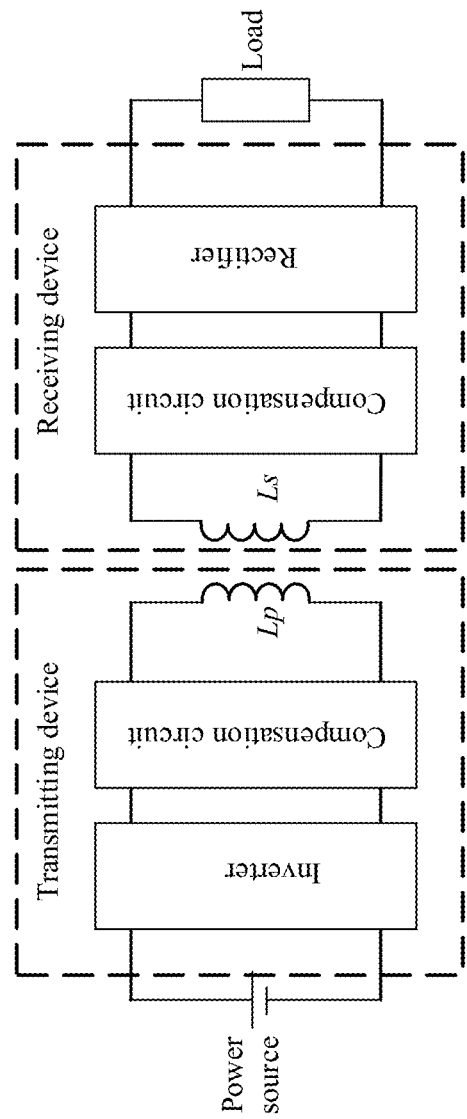
FIG. 12 is a schematic structural diagram of another wireless charging system according to this application.

First, FIG. 12 is a schematic structural diagram of a wireless charging system including a receiving device and a transmitting device.

The transmitting device may include an inverter, a transmitting module, and the like. The transmitting module includes a transmitting coil and a compensation circuit. The receiving device may include a receiving module, a rectifier, and the like. The receiving module includes a receiving coil and a compensation circuit.

The inverter of the transmitting device is configured to convert a direct current into an alternating current, and the compensation circuit of the transmitting device is configured to form a resonant circuit with the transmitting coil, so that the transmitting coil emits electromagnetic energy.

The receiving module of the receiving device is configured to receive the electromagnetic energy emitted by the transmitting module and output an alternating current. The compensation circuit of the receiving device is configured to form a resonant circuit with the receiving coil, and output an alternating current. The rectifier is configured to rectify the alternating current output by the compensation circuit into a direct current.

When the rectifier includes one or more controllable switching transistors, the switching transistor of the rectifier needs to be driven by a controller, so that a frequency of the rectifier keeps consistent with a frequency of a transmit end.

Figure 13A:
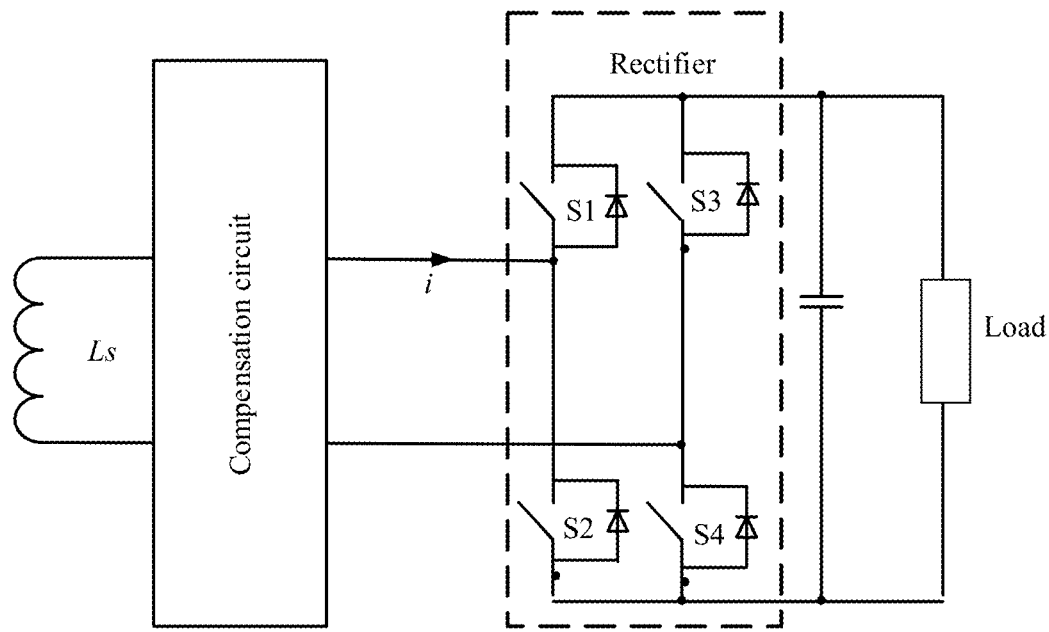
FIG. 13A is a schematic structural diagram of a rectifier in a receiving device according to this application.
Figure 13B:
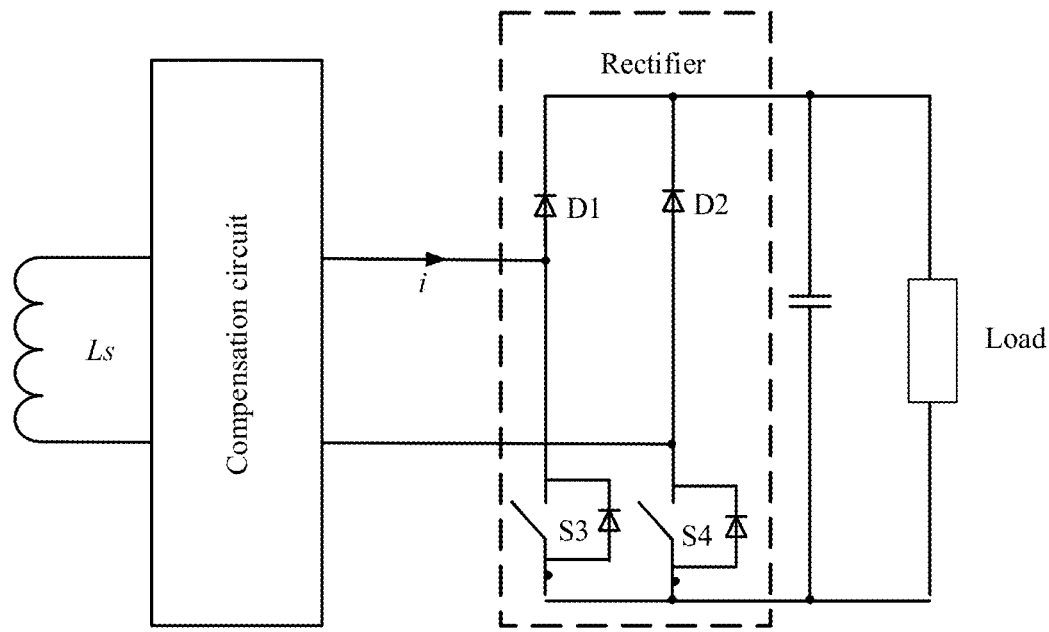
FIG. 13B is another schematic structural diagram of a rectifier in a receiving device according to this application.
Figure 13C:
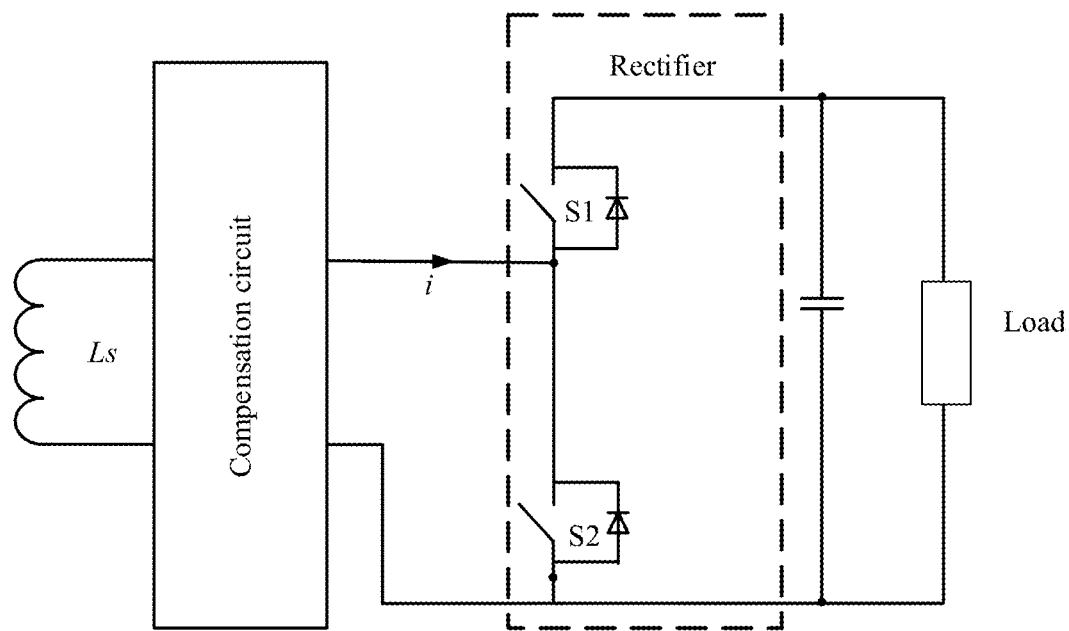
FIG. 13C is another schematic structural diagram of a rectifier in a receiving device according to this application.
Figure 13D:
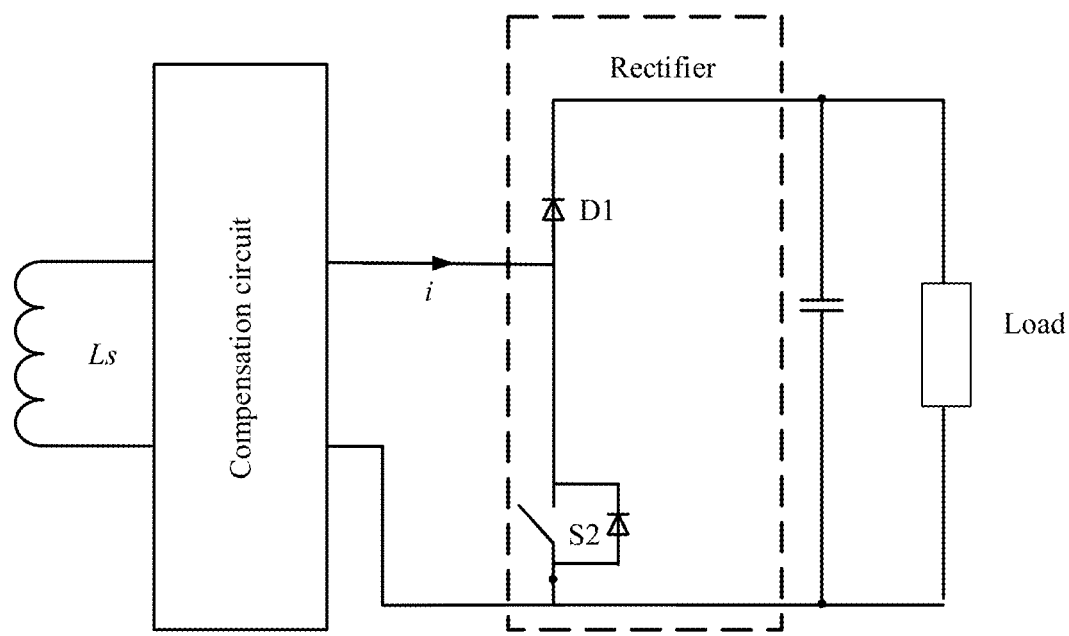
FIG. 13D is another schematic structural diagram of a rectifier in a receiving device according to this application.

The rectifier of the receiving device provided by this application has a plurality of structures. For example, structures of some rectifiers are described. First, as shown in FIG. 13A, the rectifier may include four switching transistors (S1, S2, S3, and S4). By controlling the four switching transistors, a frequency of a bridge arm of the rectifier is controlled. For example, as shown in FIG. 13B, the rectifier includes only two switches (S2 and S4), or as shown in FIG. 13C, the rectifier includes only two switches (S1 and S2), and by controlling the two switches to be turned on or turned off, a frequency of a bridge arm of the rectifier is controlled. For another example, as shown in FIG. 13D, the rectifier includes only one switching transistor (S2), and the switching transistor may be directly used to control the frequency of the rectifier.

As can be learned from the foregoing structure of the receiving device, the rectifier in the receiving device includes a controllable switching transistor, switching of the switching transistor needs to be controlled to control the frequency of the rectifier, and the frequency of the rectifier cannot be adaptively adjusted based on an input current.

Figure 14:
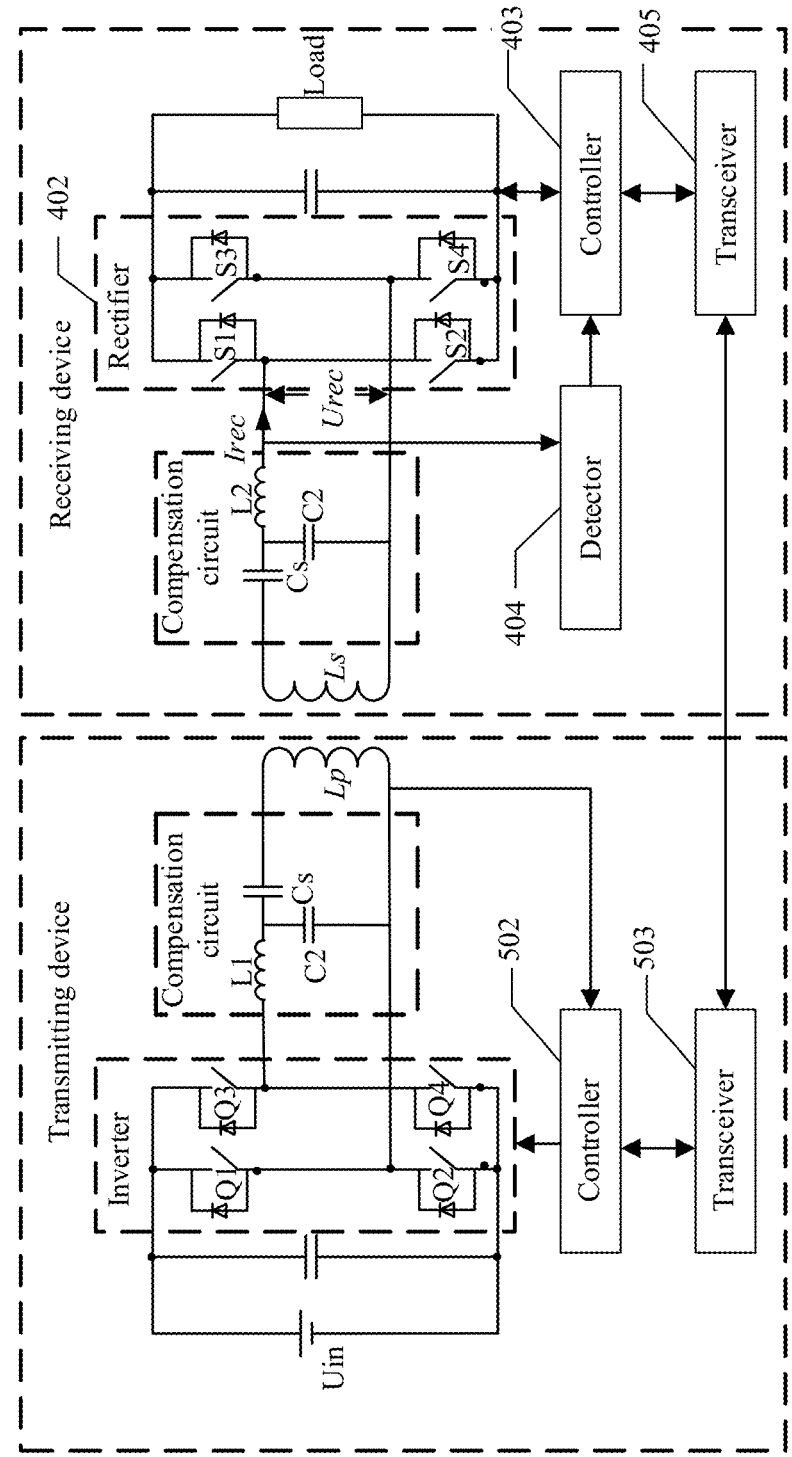
FIG. 14 is a schematic structural diagram of another wireless charging system according to this application.

More specifically, for a structure of a wireless charging system provided by this application, refer to FIG. 14. The wireless charging system includes a transmitting device and a receiving device. With reference to FIG. 14, the following describes in more detail operations performed by each module of the transmitting device and the receiving device in a frequency locking method according to this application.

A structure of a rectifier is described by using the structure shown in the foregoing FIG. 13A as an example. The rectifier may also be replaced with a rectifier of another structure, for example, the rectifier shown in FIG. 13B, FIG. 13C, or FIG. 13D.

It should be noted that a transceiver 705, a controller 703, and a detector 704 may also be replaced with a transceiver 805, a controller 803, and a detector 804.

For example, the following describes different scenarios separately with reference to the embodiments corresponding to the foregoing FIG. 2 to FIG. 6.

Scenario 1

The receiving device actively transmits, by using the transceiver 705, a parameter related to frequency locking to the transceiver 903 of the transmitting device.

The controller 703 of the transmitting device determines whether the transmitting device has a frequency locking function, and transmits frequency locking capability information to the transceiver 705 by using the transceiver 903, where the frequency locking capability information is transmitted by the transceiver 705 to the controller 703.

The controller 703 determines, based on the frequency locking capability information, whether the transmitting device has the frequency locking function and whether the transmitting device supports a frequency within a first preset range and a current value within a second preset range.

Therefore, in this embodiment, the controller 703 determines, based on the frequency locking capability information, whether the transmitting device can supply charging power to the receiving device, or determines, before the receiving device is charged, whether frequency locking is required. Therefore, the receiving device may adjust, before being charged, a frequency of the rectifier to be consistent with a working frequency of the transmitting device, to avoid oscillation of the system.

Scenario 2

The controller 902 transmits a first query message to the transceiver 705 by using the transceiver 903, to query whether the receiving device requires frequency locking.

When the controller 703 determines that the receiving device requires frequency locking, the controller 703 transmits a first response message to the transceiver 903 by using the transceiver 705.

When the controller 902 determines, based on the first response message, that the receiving device requires frequency locking, the controller 902 may transmit a second query message to the transceiver 705, where the second query message is used to request a parameter related to frequency locking of the receiving device. For a subsequent procedure, refer to the foregoing scenario 1.

Therefore, in this embodiment, the transmitting device may initiate a query, and a manner of interaction between the receiving device and the transmitting device is provided.

Scenario 3

First, the controller 703 obtains a parameter related to frequency locking, and then transmits the parameter related to frequency locking to the transceiver 705. The transceiver 705 transmits the parameter related to frequency locking to the transceiver 903 of the receiving device. After receiving the parameter related to frequency locking, the transceiver 903 transmits the parameter related to frequency locking to the controller 902. The parameter related to frequency locking carries information about a first preset range.

After obtaining the parameter related to frequency locking, the controller 902 determines whether generation of an emission current whose frequency is within the first preset range is supported, then generates frequency locking capability information based on a determining result, and transmits the frequency locking capability information to the transceiver 705 by using the transceiver 903. The transceiver 705 transmits the frequency locking capability information to the controller 703.

After obtaining the frequency locking capability information, the controller 703 parses the frequency locking capability information, and determines, based on the frequency locking capability information, whether the transmitting device supports generation of the emission current whose frequency is within the first preset range.

If the transmitting device does not support generation of the emission current whose frequency is within the first preset range, it indicates that the transmitting device cannot charge the receiving device. Optionally, the controller may generate first prompt information. If the receiving device is further provided with or connected to an output device (for example, a display or an indicator device), the first prompt information may be output by using the output device, to remind a user that the transmitting device cannot charge the receiving device and remind the user to replace the transmitting device with an available transmitting device in time.

If the transmitting device supports generation of the emission current whose frequency is within the first preset range, it indicates that the transmitting device can charge the receiving device. Then the controller 703 generates a drive signal, and controls short-circuiting of the rectifier 402. Specifically, S1 and S3 may be controlled to be turned on, or S2 and S4 may be controlled to be turned on. Then the controller 703 generates a frequency locking request, and transmits the frequency locking request to the transceiver 903 by using the transceiver 705. The transceiver 903 transmits the frequency locking request to the controller 902.

After receiving the frequency locking request, the controller 902 generates a drive signal, and transmits the drive signal to the inverter. The drive signal may drive a switching transistor of the inverter, to further drive the inverter to convert a direct current into an alternating current, and the alternating current is transmitted through the compensation network to the transmitting coil. Optionally, the controller 902 further generates a frequency locking start response message, where the frequency locking start response message includes a current value of the emission current Ip, so that the receiving device learns the current value of the emission current of the transmitting device.

After the emission current exists on the transmitting coil, the receiving coil generates an input current through induction on an alternating magnetic field generated by the transmitting coil, and the compensation circuit may compensate for the input current to obtain a compensated input current Irec.

The detector 704 detects a frequency of the input current Irec, and transmits the detected input frequency to the controller 703.

The detector 704 may include a zero crossing detection circuit and a current detector. The zero crossing detection circuit is configured to detect the frequency of the input current, and the current detector is configured to detect a current value of the input current.

The controller 703 generates an adjustment signal based on the input frequency, where a frequency of the adjustment signal is the input frequency, and the adjustment signal is transmitted to the rectifier. Therefore, the adjustment signal whose frequency is the input frequency is transmitted to the rectifier. Therefore, turn-on and turn-off of the switching transistor of the rectifier can be changed, and the turn-on and turn-off of the switching transistor directly determine a working frequency of the rectifier, so that the frequency of the rectifier is also the input frequency.

Optionally, after the controller 703 adjusts the frequency of the rectifier based on the adjustment signal, frequency locking success information may be generated. The transceiver 705 transmits the frequency locking success information to the transceiver 903, and the transceiver 903 transmits the frequency locking success information to the controller 902.

After obtaining the frequency locking success information, the controller 902 may generate a third control signal, and control the inverter by using the third control signal, so that the inverter maintains the current frequency and current value and that the transmitting module maintains the emission current.

Therefore, in this embodiment, the receiving device determines, by interacting with the receiving device, whether the transmitting device supports a working frequency of the receiving device. The frequency locking request is transmitted to the transmitting device only when the transmitting device supports the working frequency of the receiving device, so that the input current is obtained based on the alternating magnetic field generated by the emission current of the transmitting device. Therefore, a difference between frequencies of the receiving device and the transmitting device caused by mismatch of the frequencies of the receiving device and the transmitting device can be avoided, and stability of the wireless charging system is improved.

Figure 15:
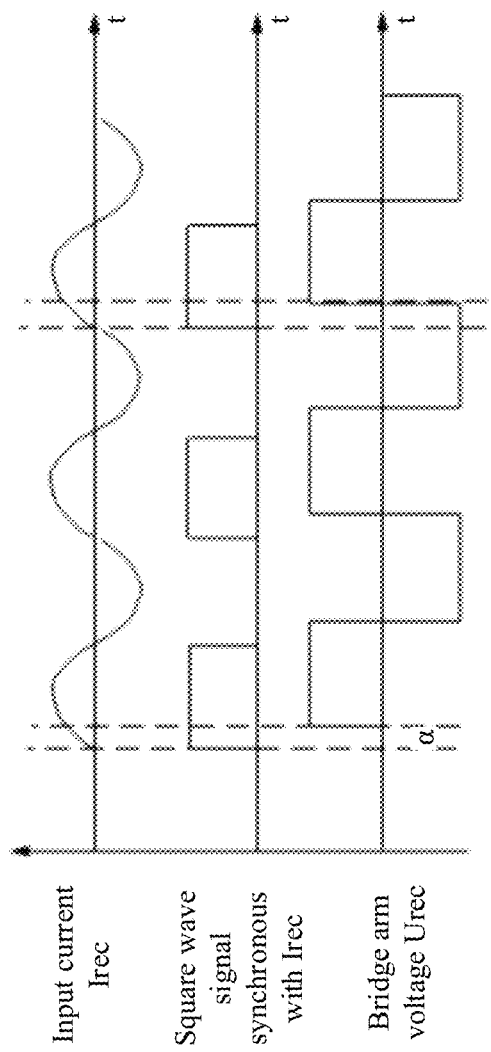
FIG. 15 is a schematic diagram of phases of an input current and an input voltage of a receiving device according to this application.

In addition, not only the frequency of the rectifier is adjusted, but also a phase difference between an input voltage Urec and the input current Irec of the rectifier is adjusted. The input voltage Urec is the same as a voltage of the bridge arm of the rectifier, so that soft switching of the switching transistor of the rectifier is implemented. For example, a phase difference a between the input voltage Urec and the input current Irec of the rectifier may be generated by controlling occasions of turn-on and switching of the switching transistors S1, S2, S3, and S4. As shown in FIG. 15, the input current Irec of the rectifier is an alternating current, and there is a synchronous square wave signal corresponding to the input current. Turn-on and switching of the switching transistors S1, S2, S3, and S4 may be delayed, so that a phase of the input voltage Urec of the rectifier lags behind a phase of the input current Irec, and a phase difference a is generated. In this way, soft switching of the switching transistors is implemented.

Scenario 4

Operations performed by the transmitting device and the receiving device are similar. A difference lies in that the controller 703 does not need to transmit a frequency locking parameter to the transmitting device by using the transceiver 705, and before the controller 703 generates an adjustment signal based on the input frequency and adjusts the frequency of the rectifier, the controller 703 further determines the current value of the input current Irec by using the current detector. If the value of Irec is beyond a range of [Irec_min, Irec_max], the controller generates one or more pieces of indication information, and transmits the indication information to the transceiver 903 by using the transceiver 705, and the transceiver 903 transmits the indication information to the controller 902, so that the controller 902 generates one or more drive signals (that is, second control signals) for adjusting the emission current Ip, to change the current value of the input current Irec, until the current value of the input current Irec is within the range of [Irec_min, Irec_max]. For example, the drive signal is used to control turn-on or turn-off of the switching transistor of the inverter, so that a phase difference is generated between two bridge arms of the inverter. For example, Q1 and Q2 form a bridge arm 1, and Q3 and Q4 form a bridge arm 2; by controlling turn-off and turn-on of the switches Q1, Q3, Q2, and Q4, a phase difference between the bridge arm 1 and the bridge arm 2 is adjusted. For example, the phase difference between the bridge arm 1 and the bridge arm 2 is increased, so that the current value of the emission current is increased, or the phase difference between the bridge arm 1 and the bridge arm 2 is decreased, so that the current value of the emission current is decreased, until the current value of the input current Irec is within the range of [Irec_min, Irec_max].

Usually, when the current value of the input current Irec is lower than Irec_min, the detector detects the frequency of the input circuit by using the zero crossing detection circuit, and accuracy of detection by the zero crossing detection circuit is relatively low. However, when the current value of the input current Irec is higher than Irec_max, a large emission current of the transmitting module is required, and energy consumption is excessively high. Therefore, to improve accuracy of frequency detection and reduce energy consumption, the current value of the input current is changed by adjusting the current value of the emission current, so that the current value of the input current is within the third preset range. In this way, energy consumption is reduced while the frequency of the input current can be accurately detected.

An embodiment of this application further provides a digital processing chip. The digital processing chip integrates a circuit configured to implement a function of the controller 703, the controller 803, or the controller 902, and one or more interfaces. When the digital processing chip integrates a memory, the digital processing chip may implement operations of the method in any one or more of the foregoing embodiments. When the digital processing chip does not integrate a memory, the digital processing chip may be connected to an external memory by using an interface. The digital processing chip implements actions performed by the transmitting device or the receiving device in the foregoing embodiment based on program code stored in the external memory.

This application provides a system-on-a-chip, where the system-on-a-chip includes a processor, configured to support a receiving device or a transmitting device in implementing a function of the controller in the foregoing method, for example, processing data and/or information in the foregoing method. In a possible design, the system-on-a-chip further includes a memory, where the memory is configured to store program instructions and data. The system-on-a-chip may include a chip, or may include a chip and another discrete component.

In another possible design, when the system-on-a-chip is a chip in user equipment or an access network or the like, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that a chip in the receiving device or the transmitting device or the like performs the operations performed by the receiving device or the transmitting device in any one of the foregoing embodiments in FIG. 2 to FIG. 6. Optionally, the storage unit may be a storage unit in the chip, for example, a register or a cache; or the storage unit may be a storage unit out of the chip in the receiving device or the transmitting device or the like, for example, a read-only memory (ROM) or other types of static storage devices capable of storing static information and instructions, or a random access memory (RAM), or the like.

An embodiment of this application further provides a computer-readable storage medium. The computer-readable storage medium stores a computer program, and when the computer program is executed by a computer, the method procedure performed by the controller of the receiving device or the transmitting device in any one of the foregoing method embodiments is implemented. Correspondingly, the computer may be the foregoing receiving device or transmitting device.

It should be understood that the controller or the processor mentioned in the foregoing embodiment of this application may be a central processing unit (CPU), or may be one or a combination of another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should also be understood that in the foregoing embodiments of this application, there may be one or more processors or controllers in the receiving device, the transmitting device, the system-on-a-chip, or the like, which may be adjusted based on an actual application scenario. This is merely for illustration purposes and is not limited. There may be one or more memories in the embodiments of this application, which may be adjusted based on an actual application scenario. This is merely for illustration purposes and is not limited.

It should also be understood that the memory, the readable storage medium, or the like mentioned in the receiving device, the transmitting device, or the like in the foregoing embodiments of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

Persons of ordinary skill in the art may understand that all or a part of the operations performed by the transmitting device, the controller of the transmitting device, the receiving device, or the controller of the receiving device in the foregoing embodiments may be implemented by hardware or related hardware instructed by a program. The program may be stored in a computer-readable storage medium. The foregoing storage medium may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

When software is used to implement the embodiments, the method operations in the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The terms used in the embodiments of this application are merely for the purpose of illustrating specific embodiments, and are not intended to limit the present invention. The terms "a", "said", and "the" of singular forms used in the embodiments of this application are also intended to include plural forms, unless otherwise specified in the context clearly. It should also be understood that in the descriptions of this application, unless otherwise specified, the character "I" indicates an "or" relationship between associated objects. For example, A/B may represent A or B. The term "and/or" in this application is only an association relationship for describing associated objects and represents that three relationships may exist. For example, A and/or B may represent the following three cases: Only A exists, both A and B exist, and only B exists, where A and B may be in a singular or plural form.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A wireless charging system, comprising:
a transmitting device; and
a receiving device;
wherein the receiving device comprises a rectifier, and is configured to:
   short-circuit an input terminal of the rectifier;
   transmit a frequency locking request to the transmitting device, wherein the frequency locking request carries information about a first preset range;
   obtain an input current of the rectifier based on an emission current generated by the transmitting device based on the frequency locking request, wherein a frequency of the emission current is within the first preset range;
   transmit frequency locking success information to the transmitting device when a frequency of the input current is detected to be within the first preset range; and
wherein the transmitting device is configured to:
   transmit a frequency locking request response message to the receiving device in response to the frequency locking request; and
   maintain the emission current based on the frequency locking success information.

2. The wireless charging system according to claim 1, wherein the frequency locking request further carries information about a second preset range, and a current value of the emission current is determined based on the second preset range.

3. The wireless charging system according to claim 2, wherein
the receiving device is configured to detect the frequency of the input current when a current value of the input current is within a third preset range.

4. The wireless charging system according to claim 3, wherein
the receiving device is further configured to transmit at least one piece of indication information to the transmitting device when the current value of the input current is beyond the third preset range, wherein the at least one piece of indication information requests the transmitting device to adjust a current value of the emission current; and
wherein after receiving each of the at least one piece of indication information, the transmitting device is configured to adjust the current value of the emission current to change the input current.

5. The wireless charging system according to claim 1, wherein
the receiving device is further configured to adjust a control frequency of the rectifier to the frequency of the input current.

6. The wireless charging system according to claim 1, wherein
after transmitting the frequency locking success information to the transmitting device, the receiving device is further configured to transmit a charging request to the transmitting device, wherein the charging request indicates the transmitting device to supply charging power to the receiving device.

7. A receiving device, comprises:
a transceiver;
a controller;
a detector; and
a rectifier;
wherein the controller is configured to control short-circuiting of an input terminal of the rectifier;
wherein the transceiver is configured to transmit a frequency locking request to a transmitting device, wherein the frequency locking request carries information about a first preset range, and wherein the frequency locking request requests the transmitting device to generate an emission current whose frequency is within the first preset range;
wherein the transceiver is further configured to receive a frequency locking request response information that is sent by the transmitting device in response to the frequency locking request;
wherein the detector is configured to detect a frequency of an input current that is obtained based on the emission current; and
wherein when the detector detects that the frequency of the input current is within the first preset range, the transceiver is further configured to transmit frequency locking success information to the transmitting device, wherein the frequency locking success information indicates the transmitting device to maintain the emission current.

8. The receiving device according to claim 7, wherein the frequency locking request further carries information about a second preset range, and a current value of the emission current is determined based on the second preset range.

9. The receiving device according to claim 8, wherein
the detector is configured to detect the frequency of the input current when a current value of the input current is within a third preset range.

10. The receiving device according to claim 9, wherein
the transceiver is further configured to transmit at least one piece of indication information to the transmitting device when the current value of the input current is beyond the third preset range, wherein the at least one piece of indication information indicates the transmitting device to adjust a current value of the emission current to change the input current.

11. The receiving device according to claim 7, wherein
the controller is further configured to adjust a control frequency of the rectifier to the frequency of the input current.

12. A transmitting device, comprising:
a transceiver; and
a transmitting module;
wherein the transceiver is configured to:
receive a frequency locking request transmitted by a receiving device, wherein the frequency locking request carries information about a first preset range;
transmit a frequency locking request response message to the receiving device in response to the frequency locking request; and
receive at least one piece of indication information transmitted by the receiving device; and
wherein the transmitting module is configured to:
generate an emission current based on the frequency locking request, wherein a frequency of the emission current is determined based on the first preset range, and where the emission current is used by the receiving device to obtain an input current of a rectifier, and
adjust a current value of the emission current to change the input current after the transceiver receives the at least one piece of indication information transmitted by the receiving device.

13. A frequency locking method, comprising:
transmitting, by a receiving device of a wireless charging system, a frequency locking request to a transmitting device of the wireless charging system, wherein the frequency locking request comprises information about a first preset range, wherein the transmitting device is configured to supply power to the receiving device;
receiving, by the receiving device of the wireless charging system, a frequency locking request response information that is sent by the transmitting device in response to the frequency locking request;
obtaining, by the receiving device, an input current of a rectifier of the receiving device based on an emission current;
detecting, by the receiving device, a frequency of the input current; and
when the receiving device detects that the frequency of the input current is within the first preset range, transmitting, by the receiving device, frequency locking success information to the transmitting device, wherein the frequency locking success information indicates the transmitting device to maintain the emission current.

14. The method according to claim 13, wherein the frequency locking request further carries information about a second preset range, and a current value of the emission current is determined based on the second preset range.

15. The method according to claim 14, wherein the detecting, by the receiving device, the frequency of the input current comprises:

when an amplitude value of the input current is within a third preset range, detecting, by the receiving device, the frequency of the input current.

16. The method according to claim 14, wherein after the obtaining, by the receiving device, the input current of the rectifier of the receiving device based on the emission current, the method further comprises:

when a current value of the input current is beyond a third preset range, transmitting, by the receiving device, at least one piece of indication information to the transmitting device, wherein the at least one piece of indication information indicates the transmitting device to adjust the emission current to change the input current.

17. The method according to claim 16, wherein after the transmitting, by the receiving device, the frequency locking success information to the transmitting device, the method further comprises:

transmitting, by the receiving device, a charging request to the transmitting device, wherein the charging request indicates the transmitting device to supply charging power to the receiving device.

18. A frequency locking method, comprising:

receiving, by a transmitting device of a wireless charging system, a frequency locking request transmitted by a receiving device of the wireless charging system, wherein the frequency locking request comprises information about a first preset range, wherein the transmitting device is configured to supply power to the receiving device;

generating, by the transmitting device, an emission current, wherein the emission current is used by the receiving device to obtain an input current of a rectifier, and wherein a frequency of the emission current is determined based on the first preset range; and receiving, by the transmitting device, at least one piece of indication information transmitted by the receiving device, and after receiving each of the at least one piece of indication information, adjusting a current value of the emission current to change the input current;

wherein after the receiving, by the transmitting device, the frequency locking request transmitted by the receiving device, the method further comprises:

transmitting, by the transmitting device, a frequency locking request response message to the receiving device in response to the frequency locking request.

19. The method according to claim 18, wherein the frequency locking request further carries information about a second preset range, and a current value of the emission current is determined based on the second preset range.

20. The method according to claim 19, wherein the at least one piece of indication information is transmitted after the receiving device determines that a current value of the input current is beyond a third preset range.

* * * * *